United States Patent
Ueno et al.

(10) Patent No.: US 10,341,642 B2
(45) Date of Patent: Jul. 2, 2019

(54) DISPLAY DEVICE, CONTROL METHOD, AND CONTROL PROGRAM FOR STEREOSCOPICALLY DISPLAYING OBJECTS

(71) Applicant: KYOCERA Corporation, Kyoto-shi, Kyoto (JP)

(72) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 613 days.

(21) Appl. No.: 14/431,194

(22) PCT Filed: Sep. 26, 2013

(86) PCT No.: PCT/JP2013/076046
§ 371 (c)(1),
(2) Date: Mar. 25, 2015

(87) PCT Pub. No.: WO2014/050957
PCT Pub. Date: Apr. 3, 2014

(65) Prior Publication Data
US 2015/0312559 A1    Oct. 29, 2015

(30) Foreign Application Priority Data

Sep. 27, 2012  (JP) .................................. 2012-214954
Sep. 27, 2012  (JP) .................................. 2012-215079
(Continued)

(51) Int. Cl.
*H04N 13/344*    (2018.01)
*G02B 27/01*    (2006.01)
(Continued)

(52) U.S. Cl.
CPC ......... *H04N 13/344* (2018.05); *G02B 27/017* (2013.01); *G06F 3/011* (2013.01);
(Continued)

(58) Field of Classification Search
CPC ............. H04N 13/044; H04N 13/0014; H04N 13/004; H04N 13/0275; H04N 13/0239;
(Continued)

(56) References Cited

U.S. PATENT DOCUMENTS 6,346,929 B1   2/2002   Fukushima et al.
8,520,024 B2   8/2013   Guthrie et al.
(Continued)

FOREIGN PATENT DOCUMENTS

AU   2011205223 B1   9/2012
CN   100557553 C    11/2009
(Continued)

OTHER PUBLICATIONS

Office Action in JP Application No. 2016-102795, dated Aug. 1, 2017, for which an explanation of relevance is attached.
(Continued)

*Primary Examiner* — Stephen G Sherman
(74) *Attorney, Agent, or Firm* — Hauptman Ham, LLP

(57) ABSTRACT

According to one of aspects, a display device includes: a display unit configured to three-dimensionally display a predetermined object, by displaying images respectively corresponding to both eyes of a user by being worn; a detection unit configured to detect displacement of a predetermined body in a display space of the object; and a control unit configured to perform an operation associated with the object, according to the displacement of the predetermined body detected by the detection unit.

19 Claims, 55 Drawing Sheets

(30) Foreign Application Priority Data

Sep. 27, 2012 (JP) ................................. 2012-215080
Sep. 27, 2012 (JP) ................................. 2012-215081

(51) Int. Cl.

| | | |
|---|---|---|
| *G06F 3/01* | (2006.01) | |
| *G06T 19/00* | (2011.01) | |
| *H04N 13/207* | (2018.01) | |
| *H04N 13/317* | (2018.01) | |
| *H04N 13/351* | (2018.01) | |
| *G06F 3/0481* | (2013.01) | |
| *G06F 3/0346* | (2013.01) | |
| *H04N 13/275* | (2018.01) | |
| *H04N 13/156* | (2018.01) | |
| *H04N 13/117* | (2018.01) | |
| *H04N 13/239* | (2018.01) | |

(52) U.S. Cl.
CPC .............. *G06F 3/012* (2013.01); *G06F 3/017* (2013.01); *G06F 3/0346* (2013.01); *G06F 3/04815* (2013.01); *G06T 19/00* (2013.01); *G06T 19/006* (2013.01); *H04N 13/117* (2018.05); *H04N 13/156* (2018.05); *H04N 13/207* (2018.05); *H04N 13/239* (2018.05); *H04N 13/275* (2018.05); *H04N 13/317* (2018.05); *H04N 13/351* (2018.05); *G02B 2027/0134* (2013.01); *G02B 2027/0178* (2013.01); *G02B 2027/0187* (2013.01); *G06T 2210/21* (2013.01); *H04N 2213/001* (2013.01)

(58) Field of Classification Search
CPC ........... H04N 13/0447; H04N 13/0415; H04N 13/0207; H04N 2213/001; H04N 13/344; H04N 13/207; H04N 13/117; H04N 13/156; H04N 13/317; H04N 13/239; H04N 13/351; H04N 13/275; G06F 3/011; G06F 3/0346; G06F 3/012; G06F 3/04815; G06F 3/017; G06T 19/006; G06T 19/00; G06T 2210/21; G02B 27/017; G02B 2027/0178; G02B 2027/0134; G02B 2027/0187
See application file for complete search history.

(56) References Cited

U.S. PATENT DOCUMENTS

| | | | |
|---|---|---|---|
| 2003/0184525 A1* | 10/2003 | Tsai | G06F 3/04845 345/173 |
| 2006/0227151 A1 | 10/2006 | Bannai | |
| 2007/0006091 A1 | 1/2007 | Sakagawa et al. | |
| 2007/0258658 A1 | 11/2007 | Kobayashi et al. | |
| 2008/0005702 A1 | 1/2008 | Skourup et al. | |
| 2010/0053151 A1* | 3/2010 | Marti | G06F 3/011 345/419 |
| 2010/0245237 A1* | 9/2010 | Nakamura | A63F 13/02 345/156 |
| 2011/0140994 A1 | 6/2011 | Noma | |
| 2011/0205243 A1 | 8/2011 | Matsuda | |
| 2011/0221656 A1* | 9/2011 | Haddick | G02B 27/017 345/8 |
| 2012/0180003 A1 | 7/2012 | Sawayanagi et al. | |
| 2012/0206452 A1* | 8/2012 | Geisner | G02B 27/017 345/419 |
| 2013/0097553 A1 | 4/2013 | Suzuki et al. | |
| 2013/0156266 A1 | 6/2013 | Horii | |
| 2013/0342572 A1* | 12/2013 | Poulos | G02B 27/017 345/633 |
| 2014/0267028 A1 | 9/2014 | Matsuda | |
| 2016/0124503 A1 | 5/2016 | Sako et al. | |

FOREIGN PATENT DOCUMENTS

| | | |
|---|---|---|
| CN | 101743567 A | 6/2010 |
| JP | 7-200162 A | 8/1995 |
| JP | 08-6708 A | 1/1996 |
| JP | 11-237867 A | 8/1999 |
| JP | 11-312033 A | 11/1999 |
| JP | 11-316855 A | 11/1999 |
| JP | 2001-154781 A | 6/2001 |
| JP | 2002-42172 A | 2/2002 |
| JP | 2002-92496 A | 3/2002 |
| JP | 2003-30469 A | 1/2003 |
| JP | 2003-241639 A | 8/2003 |
| JP | 2003-256876 A | 9/2003 |
| JP | 2003-296379 A | 10/2003 |
| JP | 2005-157610 A | 6/2005 |
| JP | 2005-165776 A | 6/2005 |
| JP | 2005-174021 A | 6/2005 |
| JP | 2006-293604 A | 10/2006 |
| JP | 2007-42055 A | 2/2007 |
| JP | 2007-299326 A | 11/2007 |
| JP | 2008-65169 A | 3/2008 |
| JP | 2008-508601 A | 3/2008 |
| JP | 2009-294372 A | 12/2009 |
| JP | 2010-528354 A | 8/2010 |
| JP | 2011-86049 A | 4/2011 |
| JP | 2011-95547 A | 5/2011 |
| JP | 2011-118615 A | 6/2011 |
| JP | 2011-175439 A | 9/2011 |
| JP | 2011-198150 A | 10/2011 |
| JP | 2011-229679 A | 11/2011 |
| JP | 2012-3404 A | 1/2012 |
| JP | 2012-48656 A | 3/2012 |
| JP | 2012-79177 A | 4/2012 |
| JP | 2012-108842 A | 6/2012 |
| JP | 2012-143963 A | 8/2012 |
| WO | 2006/020305 A2 | 2/2006 |
| WO | 2012/105175 A1 | 8/2012 |

OTHER PUBLICATIONS

Office Action in EP Application No. 13842569.9, dated Aug. 4, 2017.
Volkert Buchmann et al., "FingARtips—Gesture Based Direct Manipulation in Augmented Reality", Computer graphics and interactive techniques in Australasia and South East Asia, Jun. 15, 2004, pp. 212-221, XP058115332, ACM, 2 Penn Plaza, Suite 701 New York NY 10121-0701 USA.
Mathias Kolsch et al, "Touching the Visualized Invisible: Wearable AR with a Multimodal Interface", Internet Citation, Jan. 1, 2015. pp. 1-24, XP002679519, Retrieved from the Internet: URL:hhttp://www.cs.ucsb.edu/~holl/pubs/kolsch-2004-mmj.pdf.
Extended European Search Report in EP Application No. 13842569.9, dated Apr. 20, 2016.
Office Action dated Sep. 15, 2015, corresponding to Japanese patent application No. 2012-215081, for which an explanation of relevance is attached.
Office Action in CN Application No. 201380050460.9, dated Feb. 25, 2016, for which an explanation of relevance is attached.
International Search Report dated Dec. 17, 2013 in corresponding International Application No. PCT/JP2013/076046.
Koichi Hirota et al. "A method of representing soft virtual object—using tow fingers," The Virtual Reality Society of Japan Dai 4 Kai Taikai Ronbunshu, Sep. 29, 1999 (Sep. 29, 1999), pp. 89 to 92.
Office Action in JP Application No. 2012-215081, dated Dec. 20, 2016, for which an explanation of relevance is attached.
Office Action in JP Application No. 2012-215079, dated Mar. 7, 2017, for which an explanation of relevance is attached.
Office Action in JP Application No. 2012-215080, dated Mar. 7, 2017, for which an explanation of relevance is attached.
Office Action in JP Application No. 2012-215079, dated Jul. 26, 2016, for which an explanation of relevance is attached.
Office Action in JP Application No. 2012-215080, dated Jul. 26, 2016, for which an explanation of relevance is attached.

(56) References Cited

OTHER PUBLICATIONS

Office Action in JP Application No. 2017-075791, dated Jan. 30, 2018, for which an explanation of relevance is attached., 3pp.

\* cited by examiner

| TYPE | | FULCRUM | OBSTACLE | SPEED OF PRESSING | CHANGE |
|---|---|---|---|---|---|
| RIGID BODY | | ABSENT | ABSENT | * | MOVED IN DIRECTION OF PRESSING ACCORDING TO AMOUNT OF PRESSING |
| | | | FIXED OBSTACLE | * | MOVED IN DIRECTION OF PRESSING ACCORDING TO AMOUNT OF PRESSING NOT MOVED AFTER COMING IN CONTACT WITH OBSTACLE |
| | | | ANOTHER RIGID BODY | SLOW | MOVED IN DIRECTION OF PRESSING ACCORDING TO AMOUNT OF PRESSING MOVED TOGETHER WITH ANOTHER RIGID BODY AFTER COMING IN CONTACT WITH ANOTHER RIGID BODY |
| | | | | FAST | MOVED IN DIRECTION OF PRESSING ACCORDING TO AMOUNT OF PRESSING MOVED SUCH THAT ANOTHER RIGID BODY IS FLICKED WHEN COMING IN CONTACT WITH ANOTHER RIGID BODY |
| | | | ANOTHER RIGID BODY (CAPABLE OF BEING PASSED THROUGH) | * | MOVED IN DIRECTION OF PRESSING ACCORDING TO AMOUNT OF PRESSING MOVED TO PASS THROUGH ANOTHER RIGID BODY WHEN COMING IN CONTACT WITH ANOTHER RIGID BODY |
| | | PRESENT | ABSENT | * | ROTATED AROUND FULCRUM |

FIG.10

| TYPE | MATERIAL | AMOUNT OF CHANGE | SPEED OF PRESSING | CHANGE |
|---|---|---|---|---|
| ELASTIC BODY | RUBBER BASE | NO LIMITATION | SLOW | DEFORMED IN DIRECTION OF PRESSING ACCORDING TO AMOUNT OF PRESSING RETURNED TO ORIGINAL SHAPE WHEN BEING RELEASED |
| | | | FAST | DEFORMED IN DIRECTION OF PRESSING ACCORDING TO AMOUNT OF PRESSING AFTER THAT, MOVED WHILE RETURNING TO ORIGINAL SHAPE |
| | METAL BASE | LIMITED | * | DEFORMED IN DIRECTION OF PRESSING ACCORDING TO AMOUNT OF PRESSING UP TO DEFORMABLE RANGE AFTER THAT, MOVED WHILE RETURNING TO ORIGINAL SHAPE |
| | | LIMITED | * | WHEN BEING PRESSED IN DEFORMABLE DIRECTION, DEFORMED IN DIRECTION OF PRESSING ACCORDING TO AMOUNT OF PRESSING UP TO DEFORMABLE RANGE WHEN BEING RELEASED, REPEATEDLY RETURNED TO ORIGINAL SHAPE AND DEFORMED (VIBRATE) WHEN BEING PRESSED IN DIRECTION OTHER THAN DEFORMABLE DIRECTION, MOVED SIMILARLY TO RIGID BODY |

| TYPE | SPEED OF PRESSING | CHANGE |
|---|---|---|
| GAS | SLOW | INTERRUPTED BY BODY (HANG AROUND) |
| | MEDIUM | SCATTERED |
| | FAST | CAUSE WHIRL BY TURBULENCE AT REAR SIDE IN MOVING DIRECTION OF BODY |

| TYPE | BONDING OF ELEMENTS | CHANGE |
|---|---|---|
| AG-GREGA-TION | NOT BONDED | ENTIRE SHAPE AS AGGREGATION IS DEFORMED SUCH THAT PRESSED PORTION IS RECESSED |
| | BONDED | ENTIRE SHAPE AS AGGREGATION IS DEFORMED SUCH THAT PRESSED PORTION IS RECESSED ELEMENTS OTHER THAN PRESSED PORTION ARE PULLED BY ELEMENTS IN PRESSED PORTION AND MOVED |
| | NOT BONDED (ATTRACTIVE FORCE OR REPULSIVE FORCE IS WORKING BETWEEN THREE-DIMENSIONAL OBJECT AND BODY) | WHEN ATTRACTIVE FORCE ACTS, ELEMENTS ARE ATTRACTED BY BODY WHEN ENTERING WITHIN PREDETERMINED DISTANCE TO BODY WITHOUT BEING IN CONTACT WITH BODY WHEN REPULSIVE FORCE ACTS, ELEMENTS ARE MOVED AWAY FROM BODY WHEN ENTERING WITHIN PREDETERMINED DISTANCE TO BODY WITHOUT BEING IN CONTACT WITH BODY |

FIG.30
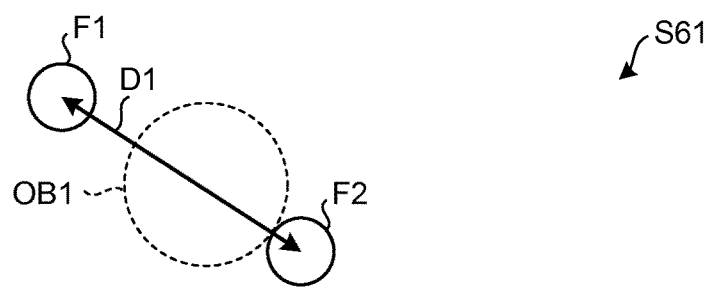
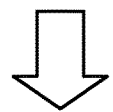
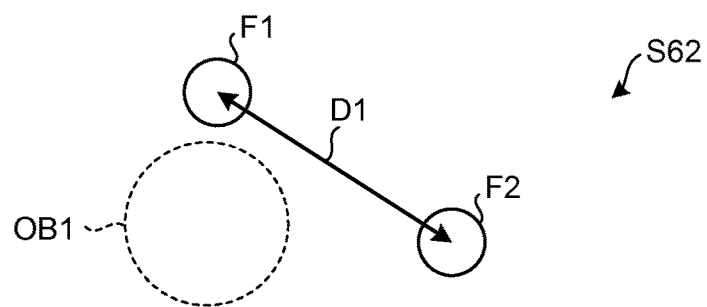
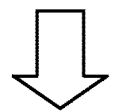
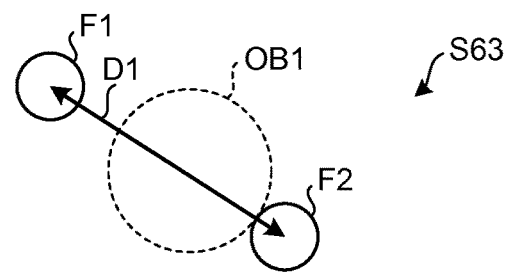

FIG.31
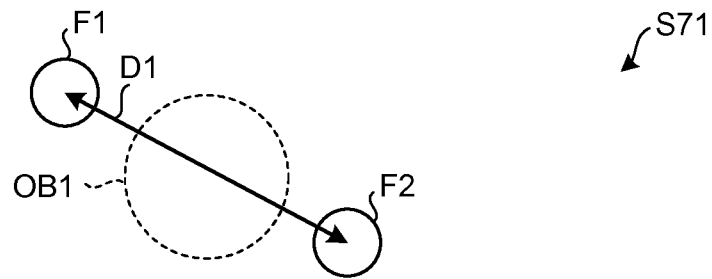
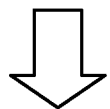
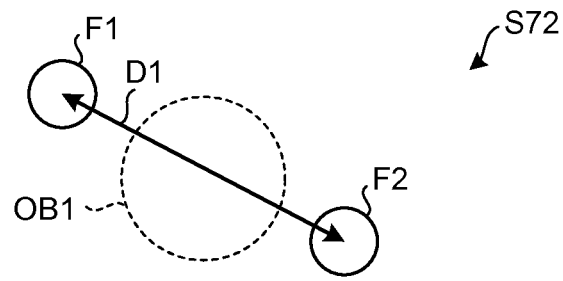
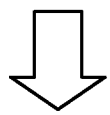
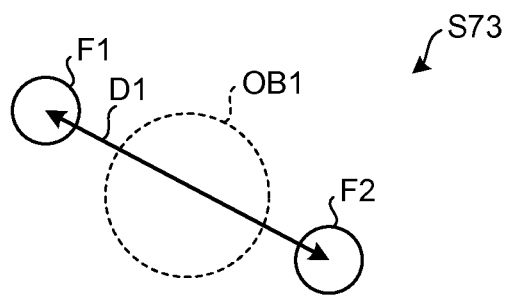

FIG.32
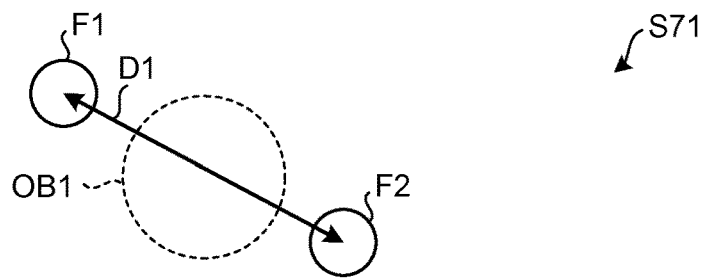
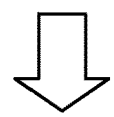
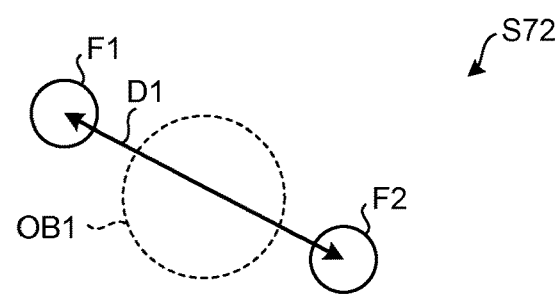
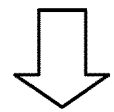
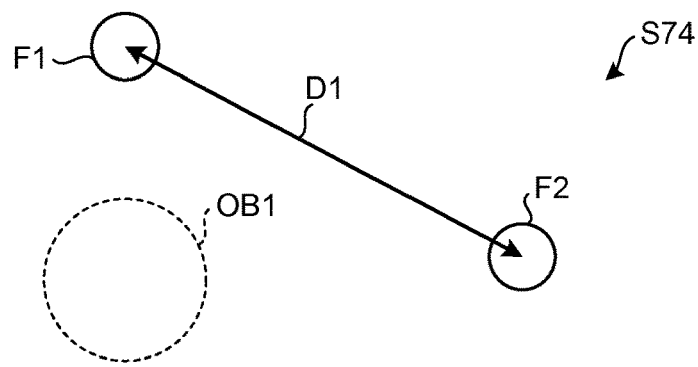

FIG.35
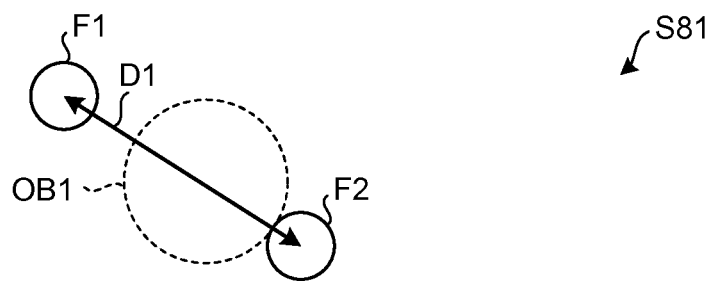
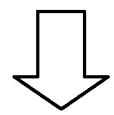
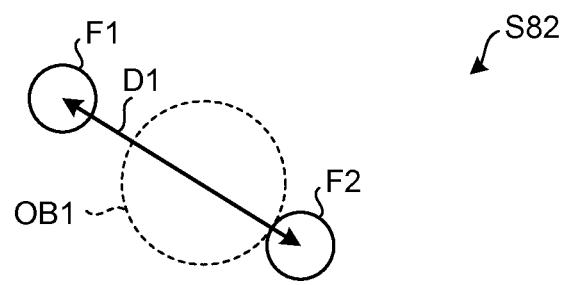
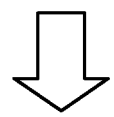
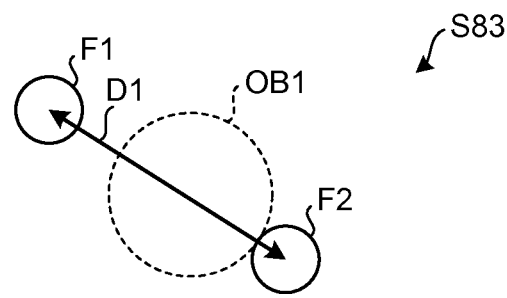

FIG.44
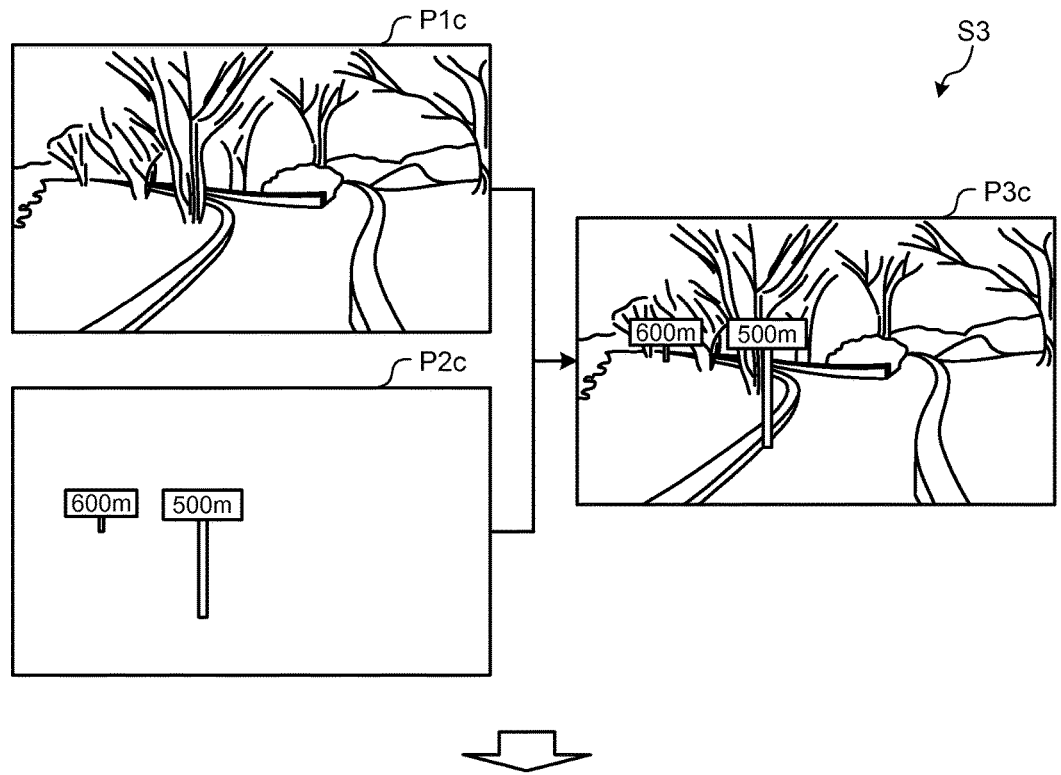
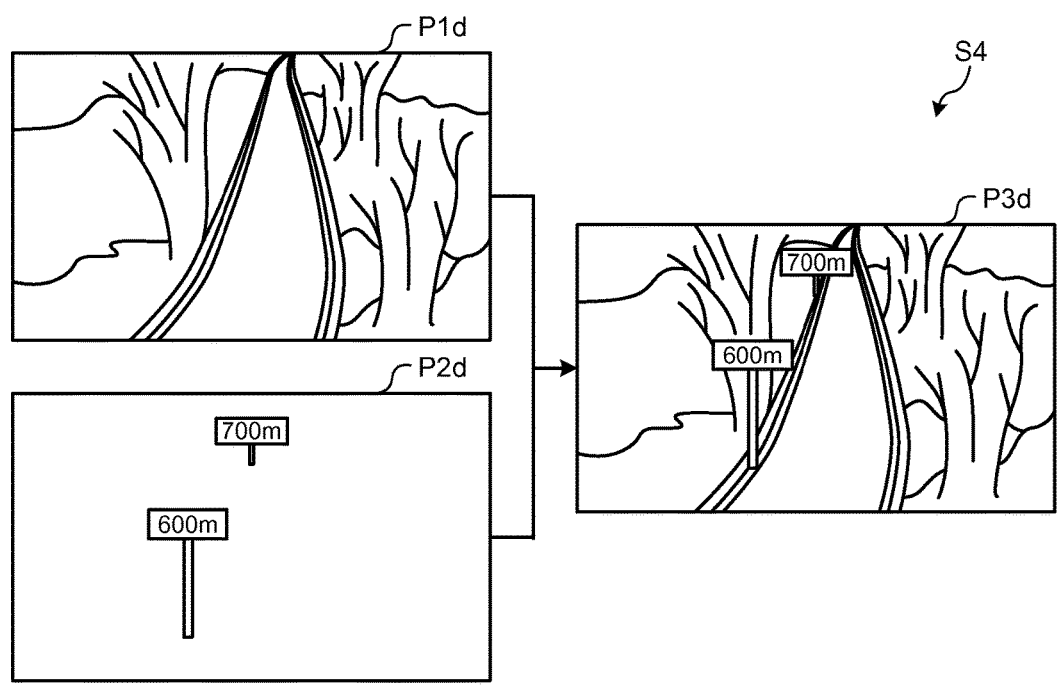

FIG.52
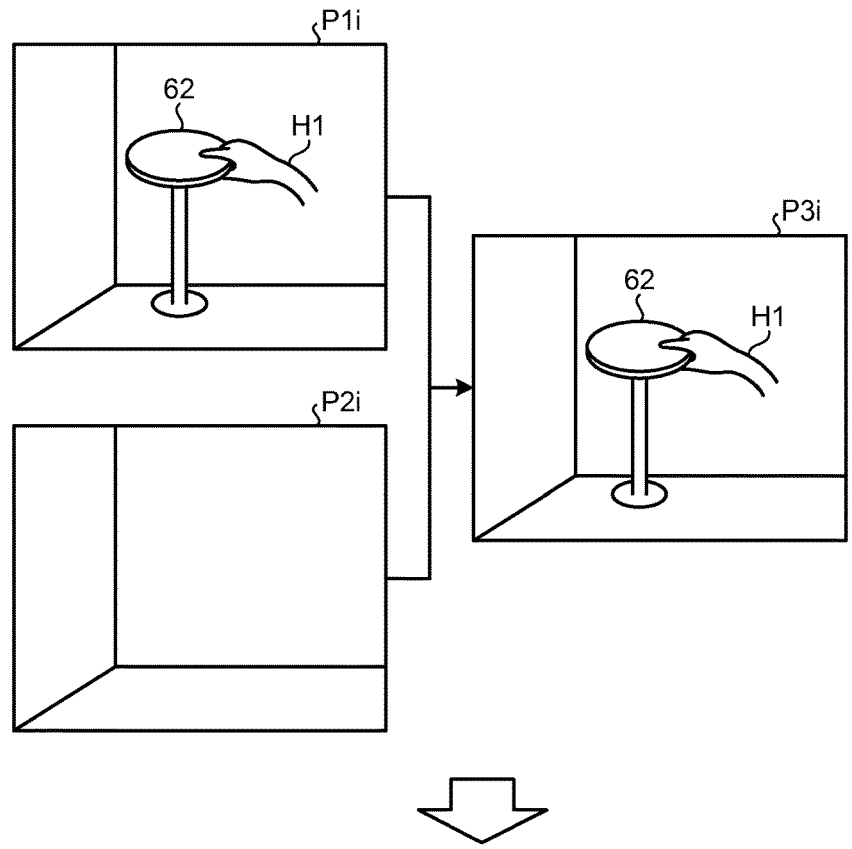
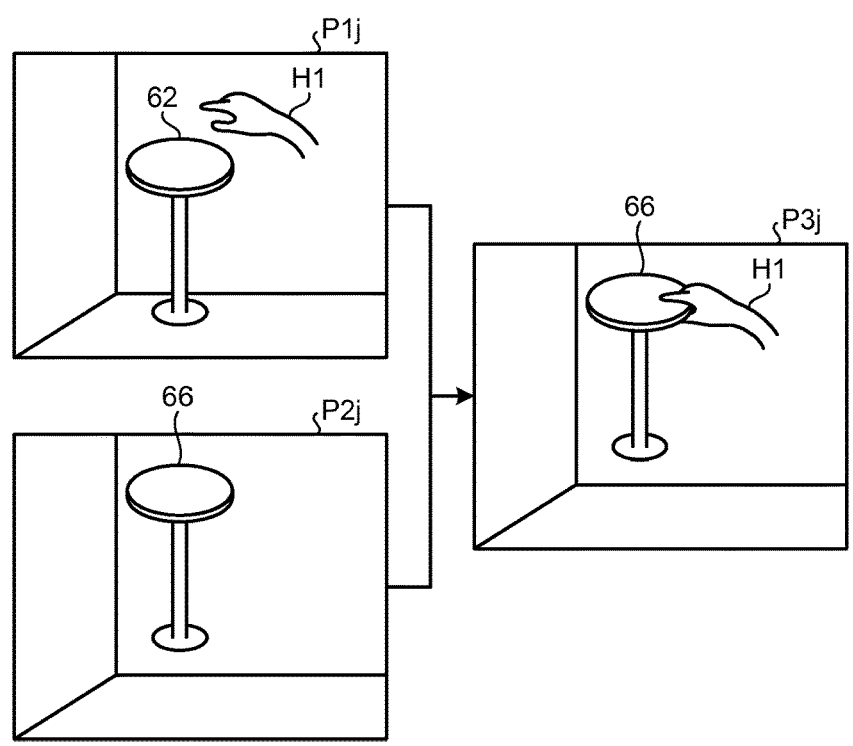

FIG.55
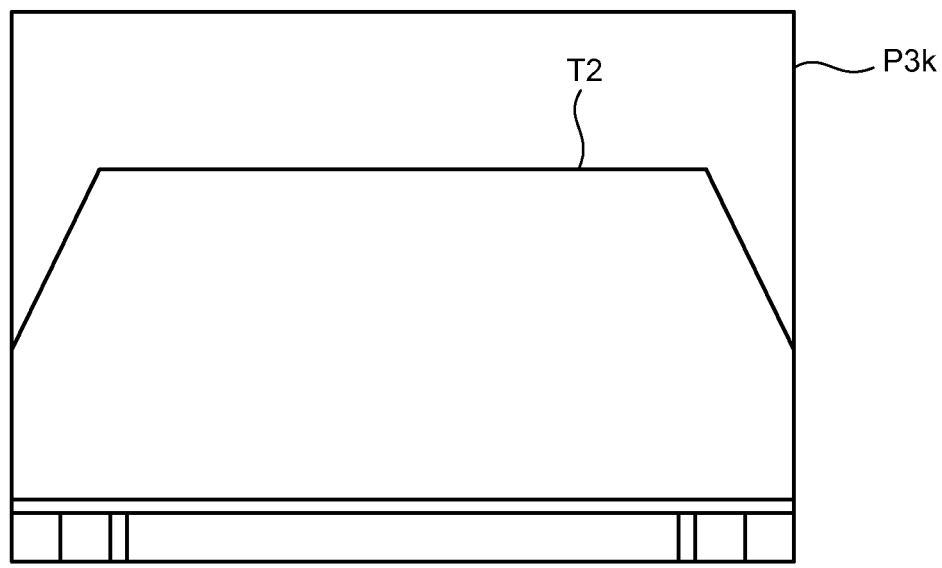
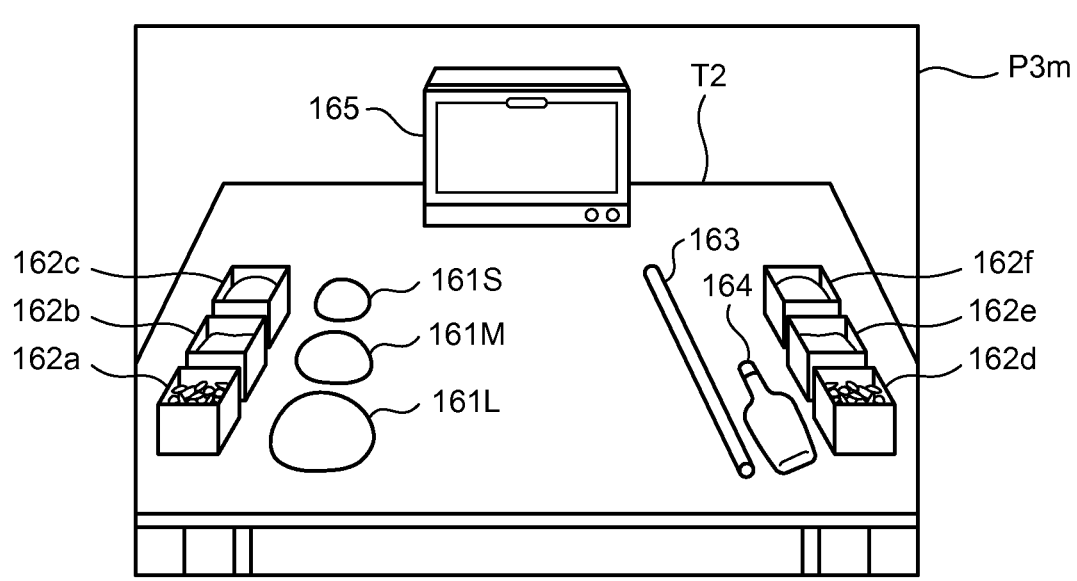

DISPLAY DEVICE, CONTROL METHOD, AND CONTROL PROGRAM FOR STEREOSCOPICALLY DISPLAYING OBJECTS

CROSS-REFERENCE TO RELATED APPLICATION

This application is a National Stage of PCT international application Ser. No. PCT/JP2013/076046 filed on Sep. 26, 2013 which designates the United States, incorporated herein by reference, and which is based upon and claims the benefit of priority from Japanese Patent Applications No. 2012-214954, No. 2012-215079, No. 2012-215080, and No. 2012-215081 filed on Sep. 27, 2012, the entire contents of which are incorporated herein by reference.

FIELD

The present disclosure relates to a display device, a control method, and a control program.

BACKGROUND

Among display devices that include a display unit, there are ones that can stereoscopically display images and the like (for example, see Patent Literature 1). The stereoscopic display is realized using binocular parallax.

CITATION LIST

Patent Literature

Patent Literature 1: JP 2011-95547 A

Technical Problem

Although the stereoscopic display is a display format is friendly to users, the stereoscopic display is used only for the purpose of viewing and is not used for improving convenience of operations in the conventional display devices. For the foregoing reasons, there is a need for a display device, a control method, and a control program that can provide the user with a highly convenient operation method.

SUMMARY

According to one of aspects, a display device includes: a display unit configured to three-dimensionally display a predetermined object, by displaying images respectively corresponding to both eyes of a user by being worn; a detection unit configured to detect displacement of a predetermined body in a display space of the object; and a control unit configured to perform an operation associated with the object, according to the displacement of the predetermined body detected by the detection unit.

According to another aspect, a display device includes: a display unit configured to three-dimensionally display a predetermined object, by displaying images respectively corresponding to both eyes of a user by being worn; a detection unit configured to detect a first body and a second body in a display space where the object is displayed; and a control unit configured to change the object when it is detected that the object is positioned between the first body and the second body in the display space.

According to another aspect, a display device includes: a display unit configured to three-dimensionally display a predetermined object, by displaying images respectively corresponding to both eyes of a user by being worn; a detection unit configured to detect a first body and a second body in a display space in which the object is displayed; and a control unit configured to change the object when it is detected that the first body and the second body are at positions where at least one of the first body or the second body is in contact with the object in the display space.

According to another aspect, a display device includes: a display unit configured to three-dimensionally display a predetermined object, by displaying images respectively corresponding to both eyes of a user by being worn; and a control unit configured to change the object when a first body and a second body are at positions where the first body and the second body sandwich the object in a display space where the object is displayed.

According to another aspect, a display device includes: a display unit configured to three-dimensionally display a predetermined object, by displaying images respectively corresponding to both eyes of a user by being worn; a detection unit configured to detect a first body and a second body on a display surface; and a control unit configured to change the object when it is detected that the object is positioned between the first body and the second body on the display surface.

According to another aspect, a display device includes: a display unit configured to three-dimensionally display a predetermined object, by displaying images respectively corresponding to both eyes of a user by being worn; a detection unit configured to detect a first body and a second body on a display surface; and a control unit configured to change the object when it is detected that the first body and the second body are at positions where at least one of the first body or the second body is in contact with the object, on the display surface.

According to another aspect, a display device includes: a display unit configured to three-dimensionally display a predetermined object, by displaying images respectively corresponding to both eyes of a user by being worn; a detection unit configured to detect a body in a display space where the object is stereoscopically displayed; and a control unit configured to change, when movement of the body is detected in the display space, the object in the display space according to the movement of the body.

According to another aspect, a display device includes: a display unit configured to three-dimensionally display a predetermined object, by displaying images respectively corresponding to both eyes of a user by being worn; and a control unit configured to change, when movement of a body is detected in a display space in which the object is stereoscopically displayed, the object in the display space according to the movement of the body.

According to another aspect, a control method is executed by a display device that three-dimensionally displays a predetermined object, by displaying images respectively corresponding to both eyes of a user by being worn. The control method includes: three-dimensionally displaying the predetermined object by the display device; detecting displacement of a predetermined body in a display space of the object; and performing an operation associated with the object, according to the detected displacement of the predetermined body.

According to another aspect, a control program causes a display device that three-dimensionally displays a predetermined object, by displaying images respectively corresponding to both eyes of a user by being worn, to execute: three-dimensionally displaying the predetermined object by a display unit; detecting displacement of a predetermined body in a display space of the object; and performing an operation associated with the object, according to the detected displacement of the predetermined body.

According to another aspect, a display device includes: a display unit configured to three-dimensionally display an object corresponding to a product, by displaying images respectively corresponding to both eyes of a user by being worn; a detection unit configured to detect a real body that operates the object; and a control unit configured to change a position of the object according to operation by the real body, and cause the object to stay on site when the real body stops operating the object.

According to another aspect, a control method of a display device includes: three-dimensionally displaying an object, by displaying images respectively corresponding to both eyes of a user; detecting a real body that operates the object; changing a position of the object according to the operation by the real body; and causing the object to stay on site when the real body stops operating the object.

According to another aspect, a display device includes: a display unit configured to three-dimensionally display an object arranged in a virtual space, by displaying images respectively corresponding to both eyes of a user by being worn; a sensor configured to detect change of a direction of the display device in a real space; and a control unit configured to change the object according to the change of the direction detected by the sensor.

According to another aspect, a control method of a display device includes: three-dimensionally displaying an object arranged in a virtual space, by displaying images respectively corresponding to both eyes of a user; detecting change of a direction of the display device in a real space; and changing the object according to the change of the direction.

According to another aspect, a display device includes: a display unit configured to three-dimensionally display an object arranged in a virtual space, by displaying images respectively corresponding to both eyes of a user by being worn; a sensor configured to detect change of a position of the display device in a real space; and a control unit configured to change the object according to the change of the position detected by the sensor.

According to another aspect, a control method of a display device includes: three-dimensionally displaying an object arranged in a virtual space, by displaying images respectively corresponding to both eyes of a user; detecting change of a position of the display device in a real space; and changing the object according to the change of the position.

Advantageous Effect of Invention

One of embodiments of the present invention exhibits an effect to provide the user with a highly convenient operation method.

BRIEF DESCRIPTION OF DRAWINGS

FIG. 9 is a diagram illustrating one of examples of information stored in acting data.
FIG. 10 is a diagram illustrating one of examples of the information stored in the acting data.
FIG. 13 is a diagram illustrating one of examples of the information stored in the acting data.
FIG. 14 is a diagram illustrating one of examples of the information stored in the acting data.
FIG. 30 is a diagram for describing a modification of the second example of detection of operation performed by holding a three-dimensional object.
FIG. 31 is a diagram for describing a third example of detection of operation performed by holding a three-dimensional object.

FIG. 32 is a diagram for describing the third example of detection of operation performed by holding a three-dimensional object.

FIG. 35 is a diagram for describing a modification of the third example of detection of operation performed by holding a three-dimensional object.

FIG. 44 is a diagram illustrating one of examples of changing the three-dimensional object in conjunction with change of a position.

FIG. 52 is a diagram for describing a scene of moving a real object.

FIG. 55 is a diagram for describing start of order processing of pizza.

DESCRIPTION OF EMBODIMENTS

Hereinafter, embodiments will be described in details with reference to the drawings. The present invention is not limited by the description below. Configuration elements in the description below include things which can be easily conceived by a person skilled in the art, which are substantially the same, and which are so-called equivalents.

Embodiment 1

Figure 1:
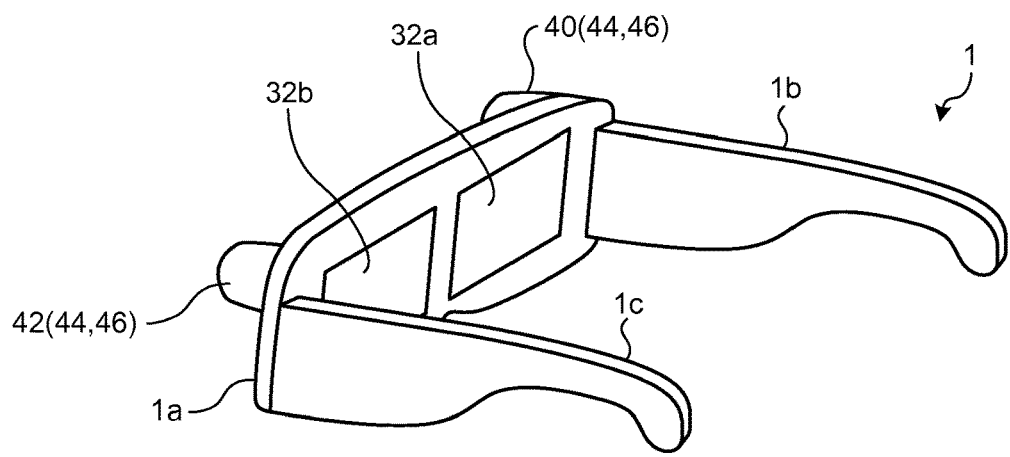
FIG. 1 is a perspective view of a display device according to a first embodiment.
Figure 2:
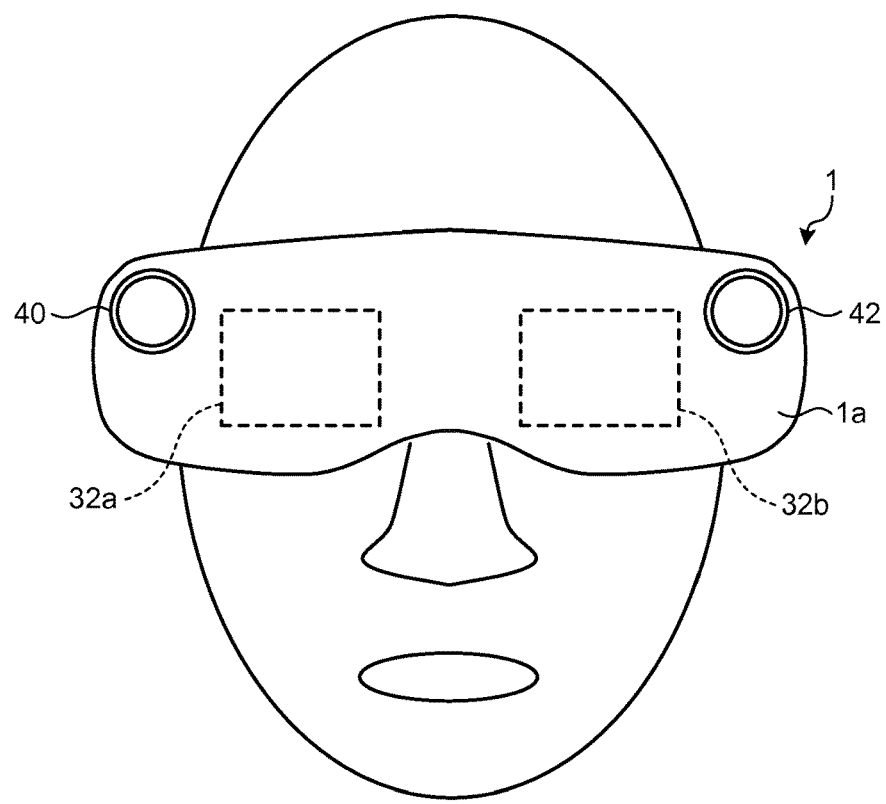
FIG. 2 is a diagram of the display device worn by a user as viewed from the front.

First of all, an overall configuration of a display device 1 according to a first embodiment will be described with reference to FIGS. 1 and 2. FIG. 1 is a perspective view of the display device 1. FIG. 2 is a diagram of the display device 1 worn by a user as viewed from the front. As illustrated in FIGS. 1 and 2, the display device 1 is a head mount-type device that is worn on the head of the user.

The display device 1 includes a front portion 1a, a side portion 1b, and a side portion 1c. The front portion 1a is arranged in front of the user to cover both eyes of the user when being worn by the user. The side portion 1b is connected to one end portion of the front portion 1a, and the side portion 1c is connected to the other end portion of the front portion 1a. The side portion 1b and the side portion 1c are supported by ears of the user like temples of eyeglasses when being worn, and stabilize the display device 1. The side portion 1b and the side portion 1c may be configured to be connected at the rear of the head of the user when being worn.

The front portion 1a includes a display unit 32a and a display unit 32b on a side facing the eyes of the user when being worn. The display unit 32a is arranged at a position facing a right eye of the user when being worn, and the display unit 32b is arranged at a position facing a left eye of the user when being worn. The display unit 32a displays an image for the right eye, and the display unit 32b displays an image for the left eye. As described above, the display device 1 can realize three-dimensional display using binocular parallax by including the display units 32a and 32b that display the images corresponding to the respective eyes of the user when being worn.

The display units 32a and 32b may be configured from one display device as long as the device can independently provide different images for the right eye and the left eye of the user. For example, the one display device may be configured to independently provide the different images for the right eye and the left eye by quickly switching a shutter that shields one eye so that only the other eye can see a displayed image. The front portion 1a may be configured to cover the eyes of the user so that light from outside does not enter the eyes of the user when being worn.

The front portion 1a includes an imaging unit 40 and an imaging unit 42 on a face opposite to the face where the display unit 32a and the display unit 32b are provided. The imaging unit 40 is arranged near one end portion (a right eye side when being worn) of the front portion 1a, and the imaging unit 42 is arranged near the other end portion (a left eye side when being worn) of the front portion 1a. The imaging unit 40 acquires an image in a range corresponding to a field of view of the right eye of the user. The imaging unit 42 acquires an image in a range corresponding to a field of view of the left eye of the user. The field of view referred to here is, for example, a field of view of when the user sees the front.

The display device 1 displays an image captured by the imaging unit 40 in the display unit 32a as an image for the right eye, and displays an image captured by the imaging unit 42 in the display unit 32b as an image for the left eye. Therefore, the display device 1 can provide the user who wears the display device 1 with a scene similar to a scene that is viewed by the user who does not wear the display device 1, even if the field of view is shielded by the front portion 1a.

The display device 1 has a function to three-dimensionally display virtual information, and to enable the user to operate the virtual information, in addition to the function to provide the user with a real scene as described above. According to the display device 1, the virtual information is superimposed on the real scene and displayed as if actually existed. The user can operate the virtual information as if the user actually touched the virtual information using a hand, for example, and apply change such as movement, rotation, deformation, or the like to the virtual information. As described above, the display device 1 provides an intuitive and highly convenient operation method in regard to the virtual information. In the description below, the virtual information that is three-dimensionally displayed by the display device 1 may be called "three-dimensional object".

The display device 1 provides the user with a wide field of view similar to a case where the user does not wear the display device 1. Further, the display device 1 can arrange a three-dimensional object with an arbitrary size in an arbitrary position in the wide field of view. As described above, the display device 1 can display three-dimensional objects having various sizes in various positions in a wide space without limitation due to size of the display device. Further, a person who can see the three-dimensional object is limited to the user of the display device 1, and thus high security can be secured.

Figure 3:
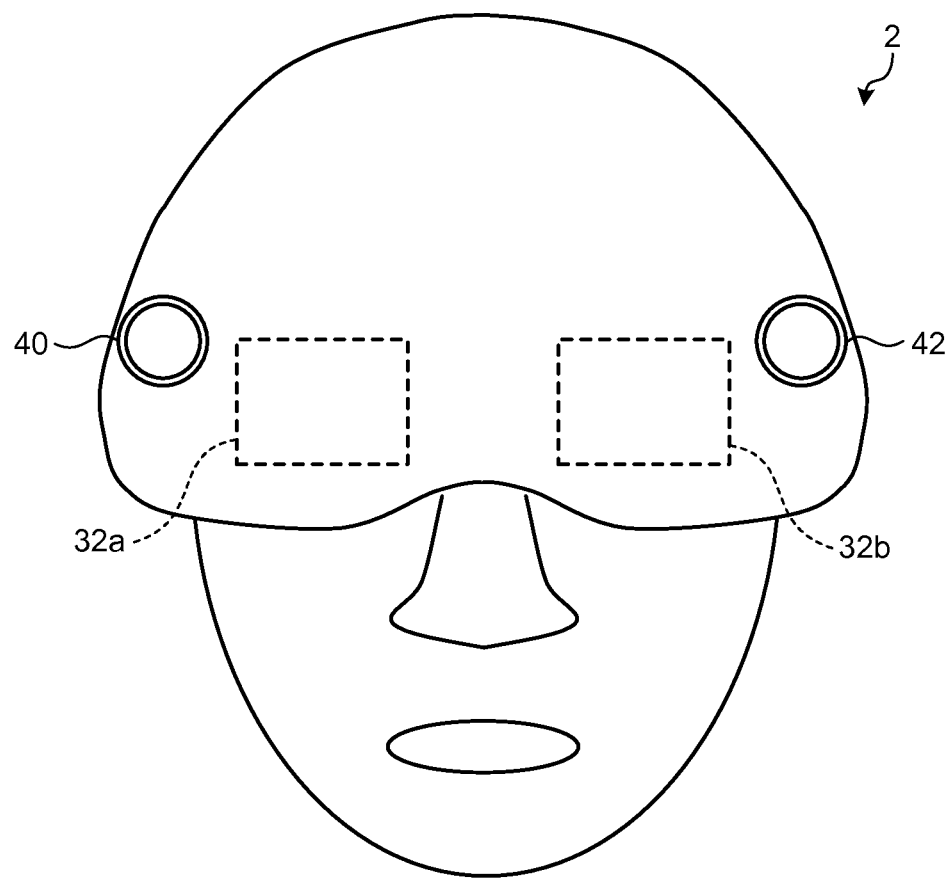
FIG. 3 is a diagram illustrating a modification of the display device.
Figure 4:
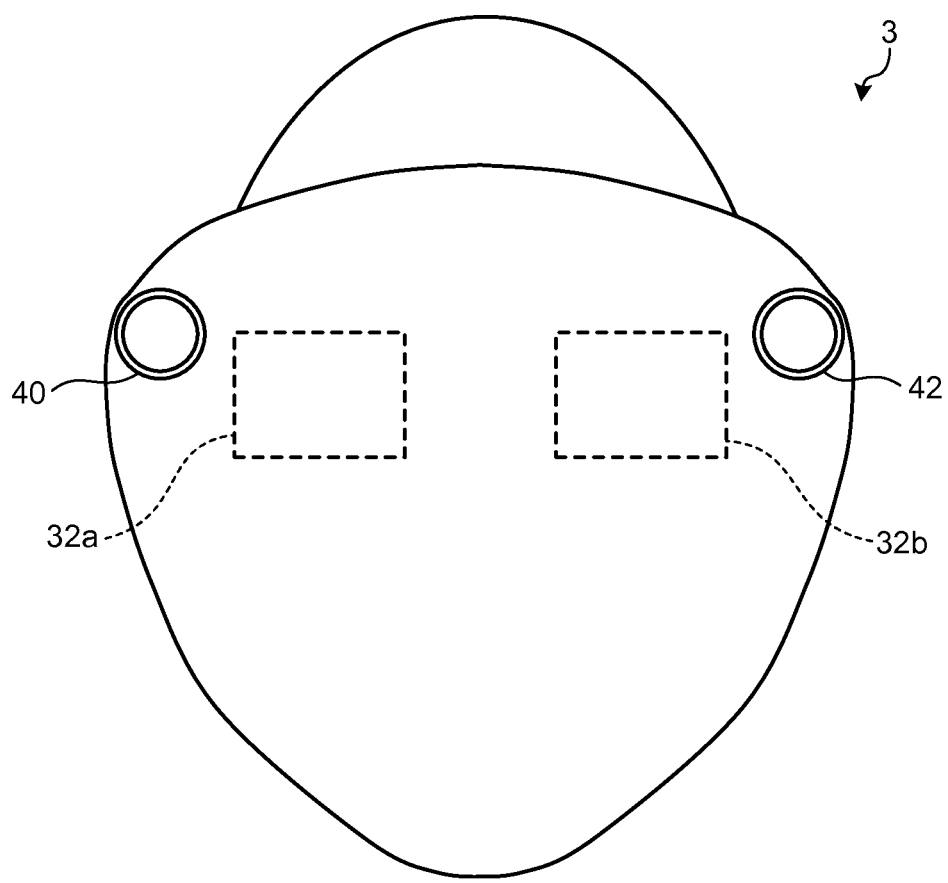
FIG. 4 is a diagram illustrating another modification of the display device.
Figure 5:
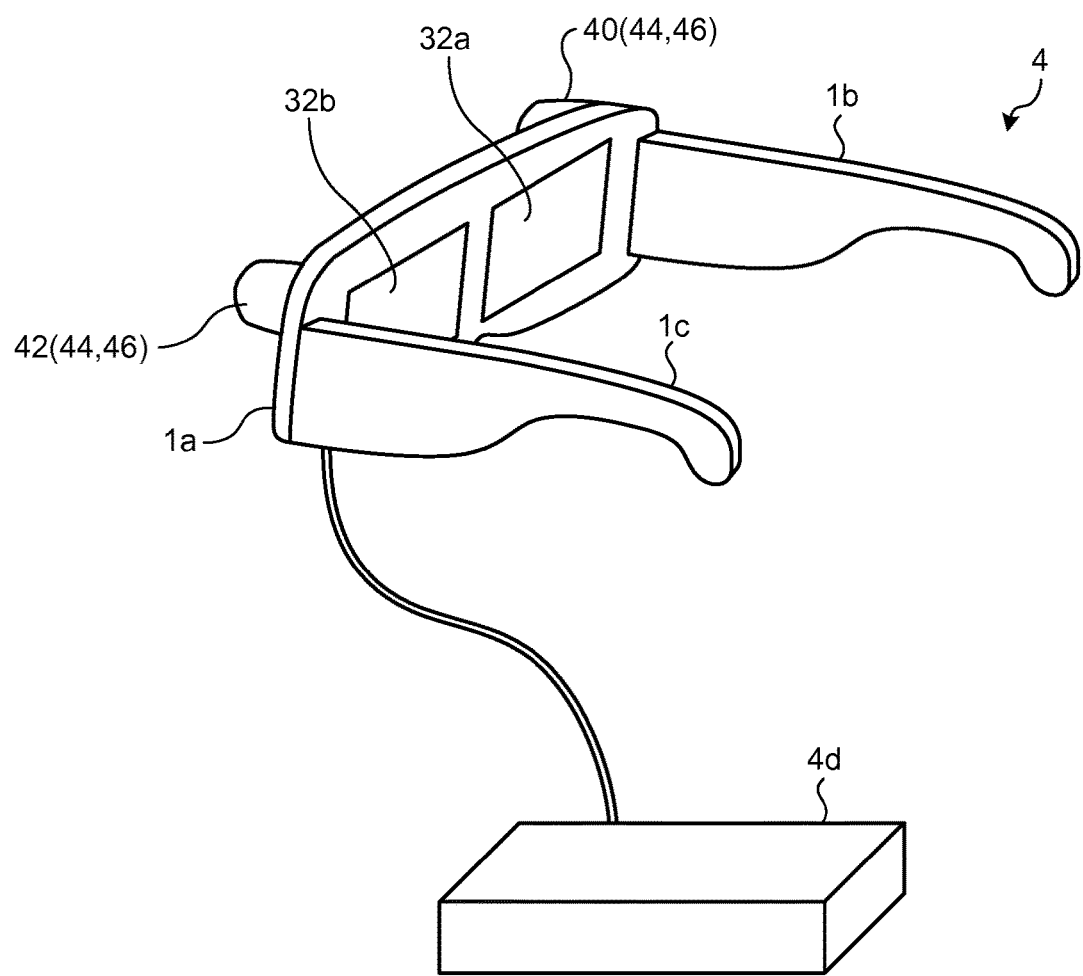
FIG. 5 is a diagram illustrating still another modification of the display device.

While, in FIGS. 1 and 2, one of examples in which the display device 1 has a shape of eyeglasses (goggles) has been described, the shape of the display device 1 is not limited thereto. FIG. 3 is a diagram illustrating a modification of the display device. FIGS. 4 and 5 are diagrams illustrating other modifications of the display device. For example, the display device 1 may have a helmet-type shape that substantially covers an upper half of the head of the user, like a display device 2 illustrated in FIG. 3. Alternatively, the display device 1 may have a mask-type shape that substantially covers the entire face of the user, like a display device 3 illustrated in FIG. 4. The display device 1 may be configured to be connected with an external device 4d such as an information processing device or a battery device in a wireless or wired manner, like a display device 4 illustrated in FIG. 5.

Figure 6:
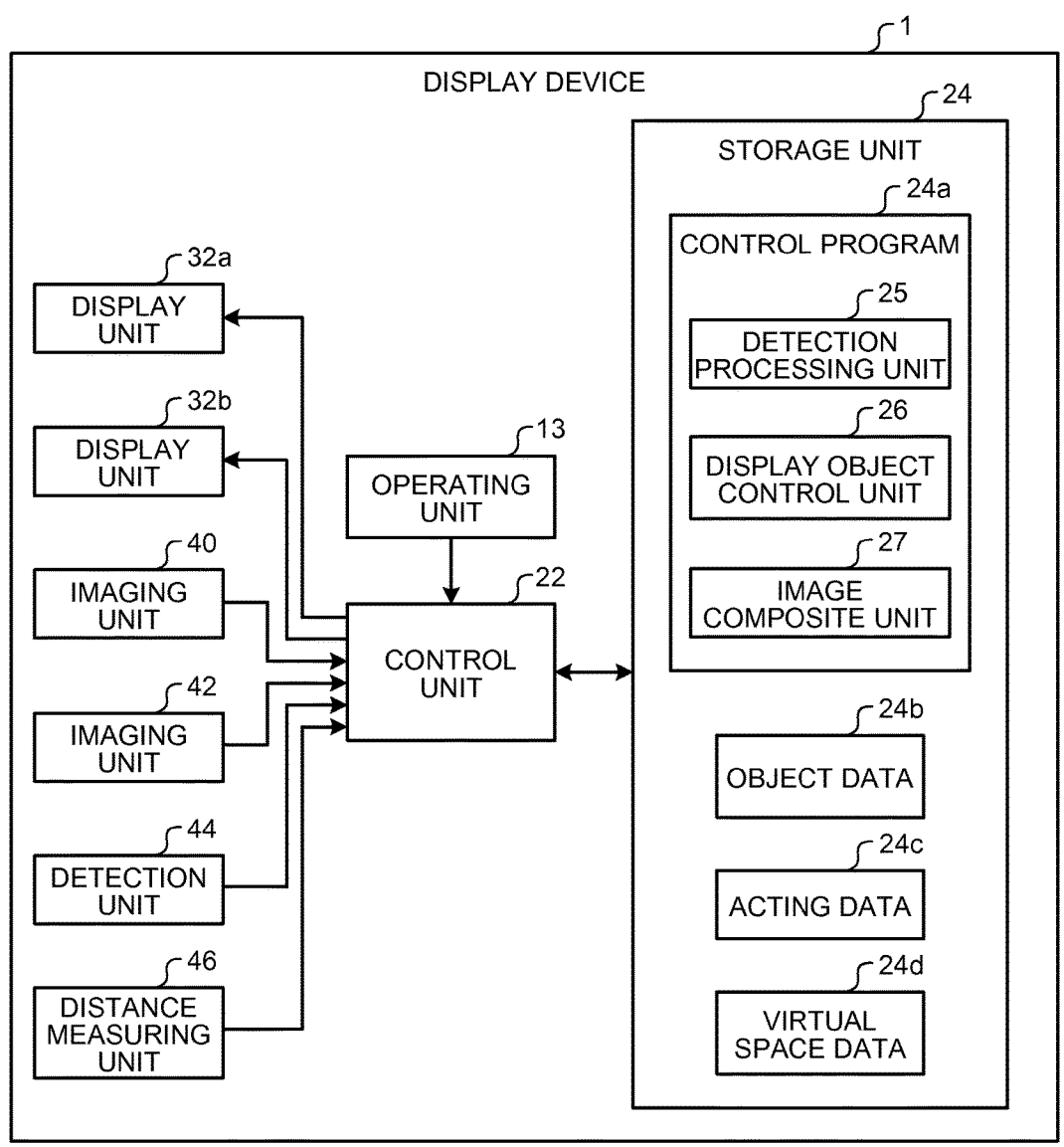
FIG. 6 is a block diagram of the display device according to the first embodiment.

Then, a functional configuration of the display device 1 will be described with reference to FIG. 6. FIG. 6 is a block diagram of the display device 1. As illustrated in FIG. 6, the display device 1 includes an operating unit 13, a control unit 22, a storage unit 24, the display units 32a and 32b, the imaging units 40 and 42, a detection unit 44, and a distance measuring unit 46. The operating unit 13 receives basic operations such as activation, stop, and change of an operation mode of the display device 1.

The display units 32a and 32b include a display device such as a liquid crystal display or an organic electroluminescence panel, and displays various types of information according to a control signal input from the control unit 22. The display units 32a and 32b may be projection devices that project images on retinas of the user using a light source such as a laser beam or the like.

The imaging units 40 and 42 electronically capture images using an image sensor such as a charge coupled device image sensor (CCD) or a complementary metal oxide semiconductor (CMOS). The imaging units 40 and 42 convert the imaged images into signals, and output the signals to the control unit 22.

The detection unit 44 detects a real body existing in image ranges of the imaging units 40 and 42. For example, the detection unit 44 detects a body that is matched with a shape registered in advance (for example, a shape of a hand of a human), among real bodies existing in the image ranges. Even about a body, the shape of which is not registered in advance, the detection unit 44 may detect a range (the shape and the size) of the real body in the image based on brightness and/or chroma of pixels, edges of hue, and the like.

The distance measuring unit 46 measures distances to the real body existing in the image ranges of the imaging units 40 and 42. The distances to the real body are measured, for respective eyes, with respect to the positions of the respective eyes of the user who wears the display device 1. Therefore, when reference positions with which the distance measuring unit 46 measures the distances are deviated from the positions of the respective eyes, measured values of the distance measuring unit 46 are corrected to express the distances to the positions of the eyes according to the deviation.

In the present embodiment, the imaging units 40 and 42 function as both of the detection unit 44 and the distance measuring unit 46. That is, in the present embodiment, the imaging units 40 and 42 detect the body in the image ranges by analyzing the images imaged by the imaging units 40 and 42. Further, the imaging units 40 and 42 measure (calculate) the distance to the body by comparing the body included in the image captured by the imaging unit 40 and the body included in the image captured by the imaging unit 42.

The display device 1 may include the detection unit 44 separately from the imaging units 40 and 42. The detection unit 44 may be a sensor that detects the real body existing in the image ranges using at least one of visible light, infrared light, ultraviolet rays, a radio wave, a sound wave, magnetism, and capacitance, for example. The display device 1 may include the distance measuring unit 46 separately from the imaging units 40 and 42. The distance measuring unit 46 may be a sensor that detects the distance to the real body existing in the image ranges using at least one of the visible light, infrared light, ultraviolet rays, a radio wave, a sound wave, magnetism, and capacitance, for example. The display device 1 may include a sensor that can function as both of the detection unit 44 and the distance measuring unit 46, like a sensor using a time-of-flight (TOF) method.

The control unit 22 includes a central processing unit (CPU) as calculation means, and a memory as storage means, and realizes various functions by executing a program using these hardware resources. To be specific, the control unit 22 reads out a program and data stored in the storage unit 24 and loads the program and data to the memory, and causes the CPU to execute instructions included in the program loaded to the memory. The control unit 22 then reads/writes data from/to the memory and the storage unit 24, and controls operations of the display unit 32a and the like, according to execution results of the instructions by the CPU. When the CPU executes the instructions, the data loaded to the memory, and the operation detected through the detection unit 44 are used as a part of parameters or determination conditions.

The storage unit 24 is constituted of a non-volatile storage device such as a flash memory, and stores therein various programs and data. The programs stored in the storage unit 24 include a control program 24a. The data stored in the storage unit 24 include object data 24b, acting data 24c, and virtual space data 24d. The storage unit 24 may be configured by a combination of a portable storage medium such as a memory card, and a read/write device that perform reading/writing from/to the storage medium. In this case, the control program 24a, the object data 24b, the acting data 24c, and the virtual space data 24d may be stored in the storage medium. The control program 24a, the object data 24b, the acting data 24c, and the virtual space data 24d may be acquired from another device such as a server via wireless or wired communication.

The control program 24a provides functions related to various types of control for operating the display device 1. The functions provided by the control program 24a include a function to superimpose a three-dimensional object on the images acquired by the imaging units 40 and 42 and display the superimposed images in the display units 32a and 32b, a function to detect operation to the three-dimensional object, a function to change the three-dimensional object according to the detected operation, and the like.

The control program 24a includes a detection processing unit 25, a display object control unit 26, and an image composite unit 27. The detection processing unit 25 provides a function for detecting the real body existing in the image ranges of the imaging units 40 and 42. The function provided by the detection processing unit 25 includes a function to measure the distances to the detected respective bodies.

The display object control unit 26 provides a function for managing what types of three-dimensional objects are arranged in a virtual space, and in what state each of the three-dimensional objects is. The function provided by the display object control unit 26 includes a function to detect the operation to the three-dimensional object based on movement of the real body detected by the function of the detection processing unit 25, and change the three-dimensional object based on the detected operation.

The image composite unit 27 provides a function for generating an image to be displayed in the display unit 32a and an image to be displayed in the display unit 32b by compositing an image in a real space and an image in the virtual space. The function provided by the image composite unit 27 includes a function to determine front and rear relationship between the real body and the three-dimensional object, based on the distance to the real body measured by the function of the detection processing unit 25, and the distance from a view point to the three-dimensional object in the virtual space, and to adjust overlapping.

The object data 24b includes information related to the shape and the properties of the three-dimensional object. The object data 24b is used for displaying the three-dimensional object. The acting data 24c includes information related to how operation to the displayed three-dimensional object acts on the three-dimensional object. The acting data 24c is used for determining how to change the three-dimensional object when the operation to the displayed three-dimensional object is detected. The change referred to here includes movement, rotation, deformation, disappearance, and the like. The virtual space data 24d holds information related to a state of the three-dimensional object arranged in the virtual space. The state of the three-dimensional object includes, for example, a position, an attitude, a status of deformation, and the like.

Figure 7:
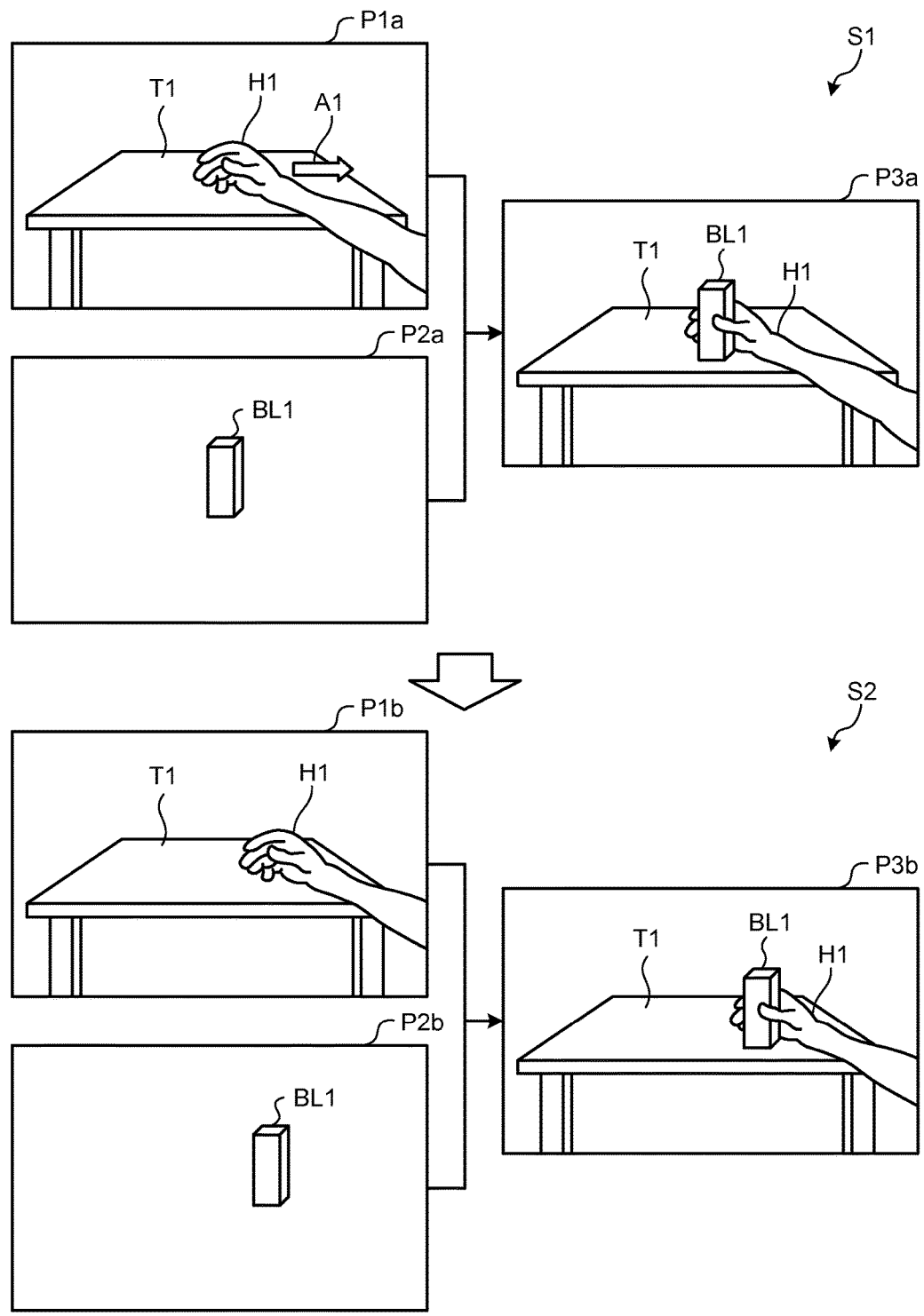
FIG. 7 is a diagram illustrating one of examples of control based on a function provided by a control program.

Then, one of examples of control based on the functions provided by the control program 24a will be described with reference to FIG. 7. FIG. 7 is a diagram illustrating one of examples of control based on the function provided by the control program. An image P1a is an image obtained by the imaging unit 40, that is, an image corresponding to a scene of the real space viewed by the right eye. In the image P1a, a table T1 and a hand H1 of the user appear. The display device 1 also acquires an image of the same scene imaged by the imaging unit 42, that is, an image corresponding to a scene of the real space viewed by the left eye.

An image P2a is an image for the right eye generated based on the virtual space data 24d and the object data 24b. In this example, the virtual space data 24d holds information related to a state of a block-like three-dimensional object BL1 existing in the virtual space, and the object data 24b holds information related to the shape and the properties of the three-dimensional object BL1. The display device 1 reproduces a virtual space based on these pieces of information, and generates the image P2a that is the reproduced virtual space viewed from a view point of the right eye. The position of the right eye (view point) in the virtual space is determined based on a predetermined rule. Similarly, the display device 1 also generates an image that is the reproduced virtual space viewed from a view point of the left eye. That is, the display device 1 also generates an image that causes the three-dimensional object BL1 to be three-dimensionally displayed in combination with the image P2a.

At Step S1 illustrated in FIG. 7, the display device 1 composites the image P1a and the image P2a to generate an image P3a. The image P3a is an image displayed in the display unit 32a as an image for the right eye. At this time, the display device 1 determines the front and rear relationship between the real body existing in the image range of the imaging unit 40 and the three-dimensional object BL1 existing in the virtual space using the position of the right eye of the user as a reference point. Then, when the real body and the three-dimensional object BL1 overlap with each other, the display device 1 adjusts the overlapping such that one closer to the right eye of the user can be seen in front.

Such adjustment of overlapping is performed for each range (for example, for each pixel) of a predetermined size within a region on the image where the real body and the three-dimensional object BL1 overlap with each other. Therefore, the distance from a view point to the real body in the real space is measured for each range of a predetermined size on the image. Further, the distance from the view point to the three-dimensional object BL1 in the virtual space is calculated for each range of a predetermined size on the image in consideration of the position, the shape, the attitude, and the like of the three-dimensional object BL1.

In the scene of Step S1 illustrated in FIG. 7, in the virtual space, the three-dimensional object BL1 is arranged at a position corresponding to right above a position where the table T1 exists in the real space. Further, in the scene of Step S1 illustrated in FIG. 7, the hand H1 of the user and the three-dimensional object BL1 exist in substantially the same distance in substantially the same direction, using the position of the right eye of the user as a reference point. Therefore, the overlapping is adjusted for each range of a predetermined size, so that the hand H1 appears in front in a portion corresponding to the thumb of the hand H1, and the three-dimensional object BL1 appears in front in other portions, of a region where the hand H1 and the three-dimensional object BL1 overlap with each other, in the composited image P3a. Further, the three-dimensional object BL1 appears in front in a region where the table T1 and the three-dimensional object BL1 overlap with each other.

With such adjustment of overlapping, at Step S1 illustrated in FIG. 7, the image P3a that can be seen as if the three-dimensional object BL1 were placed on the table T1 and the user held the three-dimensional object BL1 by hand H1 is obtained. By similar processing, the display device 1 composites the image captured by the imaging unit 42, and the image of the virtual space viewed from the view point of the left eye to generate an image to be displayed in the display unit 32b as an image for the left eye. When the image for the left eye is generated, the overlapping of the real body and the three-dimensional object BL1 is adjusted using the position of the left eye of the user as a reference point.

The display device 1 displays the composite images generated as described above in the display units 32a and 32b. As a result, the user can see the scene that is as if the three-dimensional object BL1 were placed on the table T1, and the user held the three-dimensional object BL1 with own hand H1.

In the scene of Step S1 illustrated in FIG. 7, the user moves the hand H1 in the direction of an arrow A1. In this case, in the scene of Step S2 illustrated in FIG. 7, the image obtained by the imaging unit 40 is changed to an image P1b in which the position of the hand H1 is moved to the right. Further, the display device 1 determines that the movement of the hand H1 is operation to move the three-dimensional object to the right while holding the three-dimensional object, and moves the position of the three-dimensional object to the right in the virtual space according to the operation. The movement of the three-dimensional object in the virtual space is reflected in the virtual space data 24d. As a result, the image for the right eye generated based on the virtual space data 24d and the object data 24b is changed to an image P2b in which the position of the three-dimensional object BL1 is moved in the right. Details of detection of the operation by the display device 1 will be described below.

The display device 1 composites the image P1b and the image P2b to generate an image P3b for the right eye. The image P3b is an image that can be seen as if the user held the three-dimensional object BL1 with the hand H1 at a more right side on the table T1 than the image P1a. Similarly, the display device 1 generates a composite image for the left eye. The display device 1 then displays the composite images generated as described above in the display units 32a and 32b. As a result, the user can see the scene that is as if the own hand H1 had held the three-dimensional object BL1 and moved it to the right.

Such update of the composite images for display is executed at a frequency (for example, 30 times per second) equivalent to a typical frame rate of a moving image. As a result, the change of the three-dimensional object BL1 according to the operation of the user is reflected to the image to be displayed in the display device 1 substantially in real time, and the user can operate the three-dimensional object BL1 as if the object actually existed, without a feeling of strangeness. Further, in the configuration according to the present embodiment, the hand H1 of the user, which operates the three-dimensional object BL1, is not positioned between the eyes of the user and the display units 32a and 32b, and thus the user can perform operation without caring about the display of the three-dimensional object BL1 being shielded by the hand H1.

Figure 8:
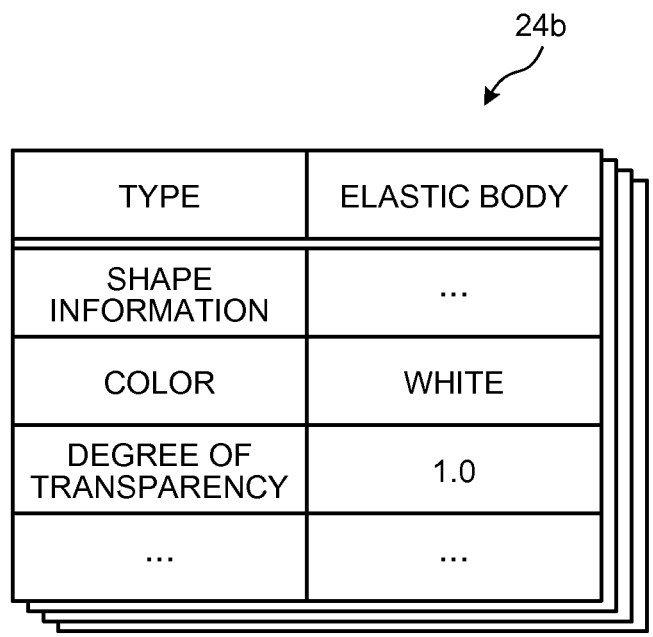
FIG. 8 is a diagram illustrating one of examples of information stored in object data.

Then, the object data 24b and the acting data 24c illustrated in FIG. 6 will be described in more detail with reference to FIGS. 8 to 14. FIG. 8 is a diagram illustrating one of examples of information stored in the object data 24b. FIGS. 9 to 14 are diagrams illustrating examples of information stored in the acting data 24c.

As illustrated in FIG. 8, in the object data 24b, information including a type, shape information, a color, the degree of transparency, and the like is stored for each three-dimensional object. The type indicates a physical property of the three-dimensional object. The type takes a value of a "rigid body", an "elastic body", or the like, for example. The shape information is information indicating a shape of the three-dimensional object. The shape information is a collection of vertex coordinates of faces that constitute the three-dimensional object. The color is a color of a surface of the three-dimensional object. The degree of transparency is a degree at which the three-dimensional object transmits light. The object data 24b can hold information related to a plurality of three-dimensional objects.

In examples illustrated in FIGS. 9 to 14, the information related to change of when pressing operation is detected is stored in the acting data 24c for each type of the three-dimensional object. As illustrated in FIG. 9, when the type of the three-dimensional object is "rigid body", change of when the pressing operation is detected differs depending on presence of a fulcrum, presence of an obstacle in the direction of pressing, and a speed of pressing. The obstacle referred to here may be another three-dimensional object, or may be a real body. Whether the speed of pressing is fast or slow is determined based on a threshold.

When there is no fulcrum in the three-dimensional object, and no obstacle in the direction of pressing, the three-dimensional object is displayed in such a manner as to be moved in the direction of pressing according to an amount of pressing. The three-dimensional object displayed in this way is, for example, a block, a pen, or a book. As for the way of moving, whether being slipped or rotated may be determined based on the shape of the three-dimensional object. Further, whether the three-dimensional object is moved together with the pressing body, or the three-dimensional object is moved away from the pressing body such that the three-dimensional object is flicked by the pressing body may be determined based on the speed of pressing, or may be determined based on a calculated value or a set value of frictional resistance between the three-dimensional object and the bottom surface.

When there is no fulcrum in the three-dimensional object, and there is a fixed obstacle in the direction of pressing, the three-dimensional object is displayed in such a manner as to be moved in the direction of pressing according to the amount of pressing, and to stop the movement at the timing when coming in contact with the obstacle. The three-dimensional object displayed in this way is, for example, a block, a pen, or a book. When the speed of pressing is fast, the three-dimensional object may destroy the obstacle and continue the movement. When the three-dimensional object comes in contact with the obstacle while being moved away from the pressing body such that the three-dimensional object is flicked by the pressing body, the three-dimensional object may be moved in the reverse direction such that the three-dimensional object rebounds.

When there is no fulcrum in the three-dimensional object, there is another unfixed rigid body in the direction of pressing, and the speed of pressing is slow, the three-dimensional object is displayed in such a manner as to be moved in the direction of pressing according to the amount of pressing, and to be moved together with another rigid body after coming in contact with another rigid body. When there is no fulcrum in the three-dimensional object, there is another unfixed rigid body in the direction of pressing, and the speed of pressing is fast, the three-dimensional object is displayed in such a manner as to be moved in the direction of pressing according to the amount of pressing. Then, after the three-dimensional object comes in contact with another rigid body, another rigid body is displayed in such a manner as to be flicked and to be moved. After coming in contact with another rigid body, the three-dimensional object may be stopped on site, or may reduce the speed and continue the movement. The combination of the three-dimensional object and another rigid body displayed in this way is, for example, a combination of a ball and pins in bowling, or a combination of marbles.

When there is no fulcrum in the three-dimensional object, and there is another unfixed rigid body in the direction of pressing, but the three-dimensional object can pass through another rigid body, the three-dimensional object is displayed in such a manner as to be moved in the direction of pressing according to the amount of pressing, and to pass through another rigid body and continue the movement after coming in contact with another rigid body. In reality, a rigid body does not pass through a rigid body, but if such passing through is available, the user can be provided with a novel experience. The combination of the three-dimensional object and another rigid body is, for example, a combination of a ball and pins in bowling, or a combination of marbles. A threshold may be provided to the speed of pressing, and when the speed of pressing is the threshold or less, the three-dimensional object may not pass through another rigid body.

When there is a fulcrum in the three-dimensional object, the three-dimensional object is displayed in such a manner as to be rotated around the fulcrum according to the amount and the direction of pressing. The rotation referred to here may be rotation of 360 degrees, or may be rotation reciprocating within a predetermined rotation range. The three-dimensional object displayed in this way is, for example, a pendulum, a sandbag of boxing, or a windmill.

As illustrated in FIG. 10, when the type of the three-dimensional object is "elastic body", the change of when the pressing operation is detected differs depending on the material, the presence of limitation on the amount of change, and the speed of pressing. The material referred to here is an assumed material of the three-dimensional object, and is defined in the object data 24b.

When the material of the three-dimensional object is a rubber-based material, there is no limitation on the amount of change, and the speed of pressing is slow, the three-dimensional object is displayed in such a manner as to be deformed in the direction of pressing according to the amount of pressing, and to return to an original shape when being released from the pressed state. When the material of the three-dimensional object is a rubber-based material, there is no limitation on the amount of change, and the speed of pressing is fast, the three-dimensional object is displayed in such a manner as to be deformed in the direction of pressing according to the amount of pressing, and then to be flicked and moved in the direction of pressing while returning to the original shape. The three-dimensional object displayed in this way is, for example, a rubber ball, or an eraser.

When the material of the three-dimensional object is a rubber-based material, and there is a limitation on the amount of change, the three-dimensional object is displayed in such a manner as to be deformed in the direction of pressing according to the amount of pressing, up to a deformable range, and, when the pressing operation continues to be detected after that, to be moved in the direction of pressing while returning to the original shape. The three-dimensional object displayed in this way is, for example, a rubber ball, or an eraser.

When the material of the three-dimensional object is a metal-based material, the three-dimensional object is displayed in such a manner as to be deformed in the direction of pressing according to the amount of pressing, up to the deformable range, and to repeat returning to the original shape and deforming (vibrates) when being released from the pressed state. When the three-dimensional object is pressed in a direction other than the deformable direction, the three-dimensional object is moved similarly to the rigid body. The three-dimensional object displayed in this way is, for example, a plate spring or a helical spring.

Figure 11:
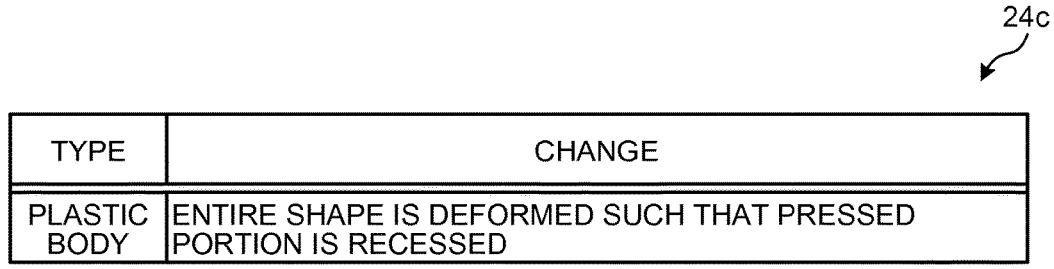
FIG. 11 is a diagram illustrating one of examples of the information stored in the acting data.

As illustrated in FIG. 11, when the type of the three-dimensional object is "plastic body", the three-dimensional object is displayed such that a pressed portion is recessed and the entire shape is changed. The three-dimensional object displayed in this way is, for example, clay.

Figure 12:
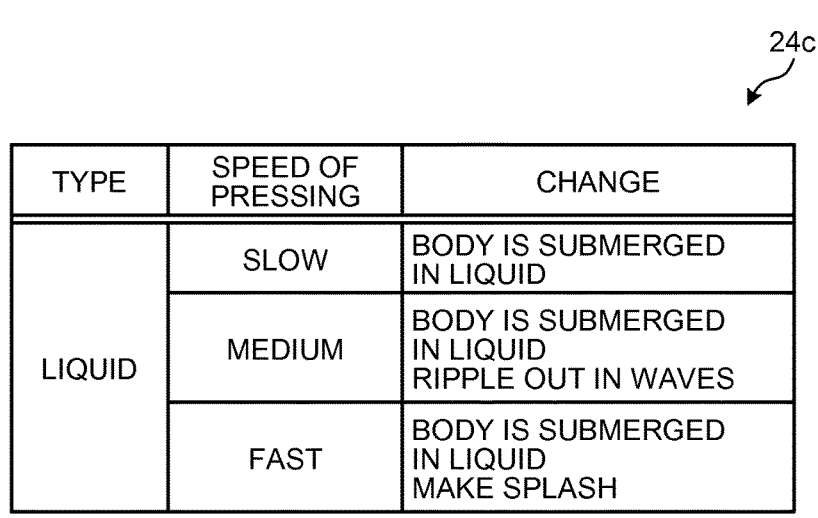
FIG. 12 is a diagram illustrating one of examples of the information stored in the acting data.

As illustrated in FIG. 12, when the type of the three-dimensional object is "liquid", the change of when the pressing operation is detected differs depending on the speed of pressing. When the speed of pressing is slow, the three-dimensional object is displayed such that the pressing body is submerged in the three-dimensional object, that is, in the liquid. When the speed of pressing is a medium speed, the three-dimensional object is displayed such that the pressing body is submerged in the liquid, and the liquid ripples out in waves. When the speed of pressing is fast, the three-dimensional object is displayed such that the pressing body is submerged in the liquid, and the liquid makes a splash. The three-dimensional object displayed in this way is, for example, water in a glass.

As illustrated in FIG. 13, when the type of the three-dimensional object is "gas", the change of when the pressing operation is detected differs depending on the speed of pressing. When the speed of pressing is slow, the three-dimensional object, that is, the gas is displayed in such a manner as to be interrupted by the pressing body, and to hang around the pressing body. When the speed of pressing is a medium speed, the gas is displayed in such a manner as to be scattered by the pressing body. When the speed of pressing is fast, the gas is displayed in such a manner as to cause a whirl by turbulence in the rear side of the moving direction of the pressing body. The three-dimensional object displayed in this way is, for example, smoke.

As illustrated in FIG. 14, when the type of the three-dimensional object is "aggregation", the change of when the pressing operation is detected differs depending on a bonding state of elements of the aggregation. When there is no bonding between the elements of the aggregation, the three-dimensional object is displayed such that a pressed portion is recessed, and the entire shape of the aggregation is changed. The three-dimensional object displayed in this way is, for example, sand, or sugar.

When there is bonding between the elements of the aggregation, the three-dimensional object is displayed such that the pressed portion is recessed, and the entire shape of the aggregation is changed. Further, elements other than the pressed portion are displayed in such a manner as to be pulled and moved by the elements in the pressed portion. The three-dimensional object displayed in this way is, for example, a chain.

When there is no bonding between the elements of the aggregation, but attraction force or repulsive force acts between the three-dimensional object and the pressing body, the three-dimensional object is displayed in such a manner as to be moved without being in contact with the pressing body. When the attraction force acts between the three-dimensional object and the pressing body, the three-dimensional object is attracted by the pressing body when entering within a predetermined distance to the pressing body without being in contact with the pressing body. When the repulsive force acts between the three-dimensional object and the pressing body, the three-dimensional object is moved away from the pressing body when entering within a predetermined distance to the pressing body without being in contact with the pressing body. The combination of the three-dimensional object and the pressing body is, for example, a combination of iron powder and a magnet.

As described above, the three-dimensional object is changed based on the information stored in the object data 24b and the information stored in the acting data 24c, whereby the three-dimensional object can be changed in various manners according to the pressing operation. The information stored in the object data 24b and the acting data 24c is not limited to the above examples, and may be appropriately changed according to use or the like. For example, it may be set to switch the way of changing the three-dimensional object according to the type and the size of the pressing body, or the size of a contact area of the pressing body and the three-dimensional object.

Then, detection of operation to press the three-dimensional object, and change of the three-dimensional object according to detected operation will be described with reference to FIGS. 15 and 16. In the description below, a space viewed by the user who wears the display device 1 may be called display space. The display device 1 provides images respectively corresponding to the right eye and the left eye of the user, thereby to three-dimensionally (stereoscopically) display the real body and the three-dimensional object in the display space. The display device 1 associates the virtual space reproduced based on the virtual space data 24d, and the real space imaged by the imaging units 40 and 42, based on a predetermined rule, and displays a space in which these spaces are overlapped, as the display space.

Figure 15:
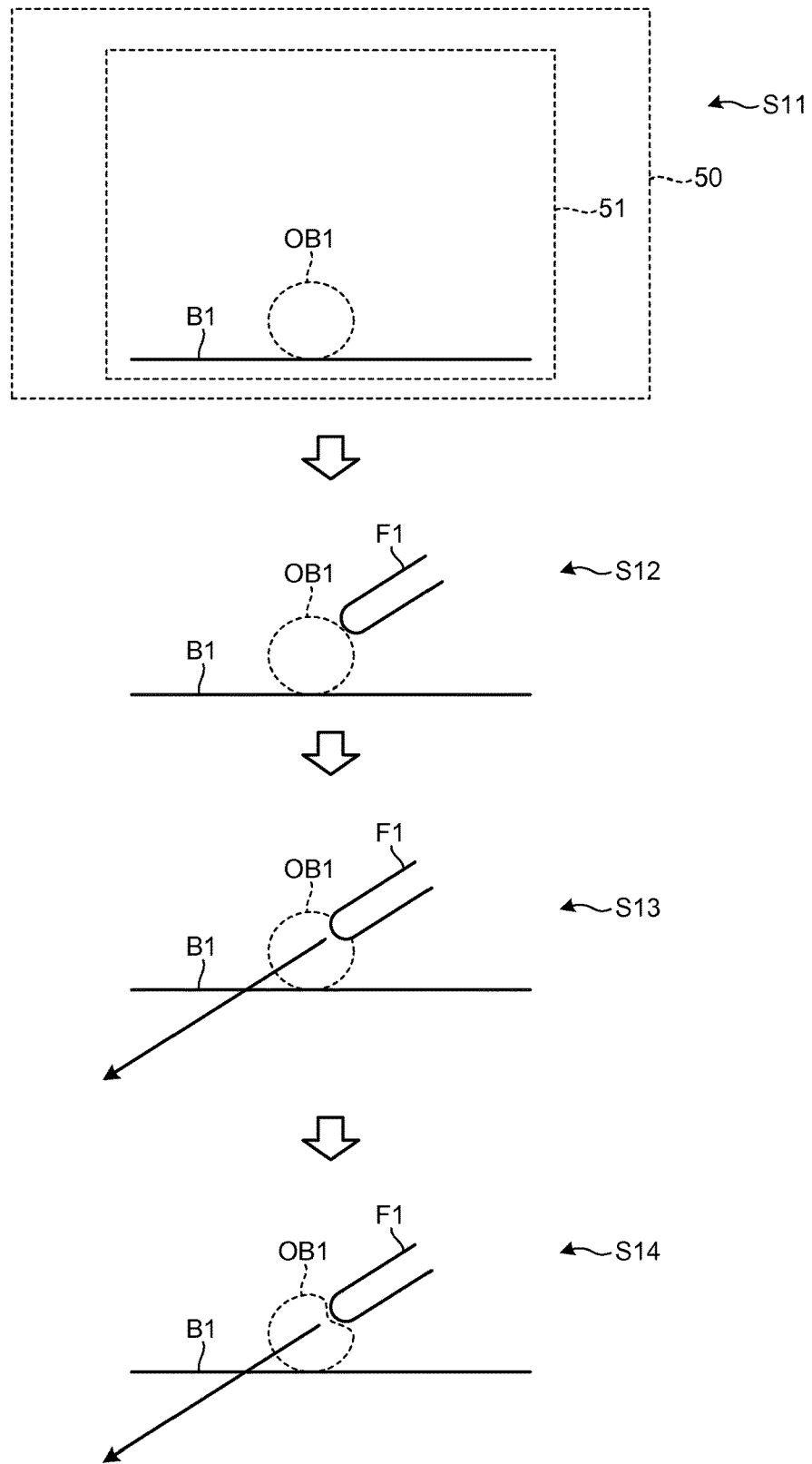
FIG. 15 is a diagram for describing a first example of detection of operation to press a three-dimensional object, and change of the three-dimensional object according to the detected operation.
Figure 16:
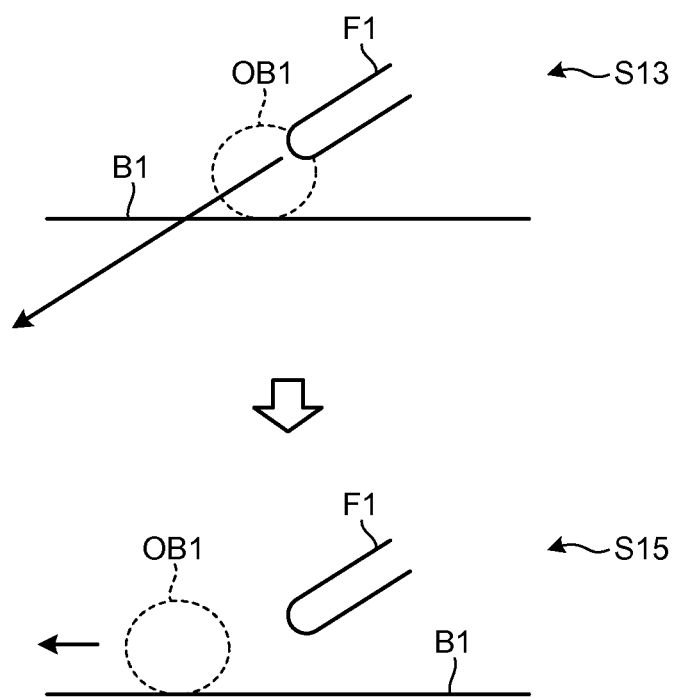
FIG. 16 is a diagram for describing the first example of detection of operation to press a three-dimensional object, and change of the three-dimensional object according to the detected operation.

FIGS. 15 and 16 are diagrams for describing detection of operation to press a three-dimensional object, and change of the three-dimensional object according to the detected operation. At Step S11 illustrated in FIG. 15, the display device 1 stereoscopically displays a three-dimensional object OB1 in a display space 50. The three-dimensional object OB1 is, for example, an object that is modeled on a ball. At Step S11, a bottom surface B1 that supports the three-dimensional object OB1 is displayed.

At Step S12, the user places a finger F1 to a position at which the finger F1 is in contact with the three-dimensional object OB1, and keeps the finger F1 to stand still. When the real body has been detected in the display space, and the state in which the real body is in contact with the three-dimensional object OB1 is continued for a predetermined time or more, the display device 1 determines that the three-dimensional object OB1 has been selected as an object to be operated. Then, the display device 1 notifies the user of the fact that the three-dimensional object OB1 has been selected as the object to be operated, by changing a display style of the three-dimensional object OB1, or the like.

Determination of whether the body is in contact with the three-dimensional object OB1 is made based on the position of the body in the real space, and the shape, the attitude, and the position in the virtual space of the three-dimensional object OB1, and the like. Comparison between the position in the real space and the position in the virtual space may be performed by converting a position in one space into a position in the other space based on the above-described predetermined rule, or may be performed by converting positions in both spaces into positions in a space for comparison. When a finger has been detected as the real body, the position of a tip of the finger may be processed as the position of the body. Humans often use a tip of a finger when operating something. Therefore, the position of the tip of the finger is processed as the position of the body, whereby more natural operation feeling can be provided to the user.

The notification of the fact that the three-dimensional object has been selected as the object to be operated is realized by, for example, changing the entire color of the three-dimensional object OB1, or changing the color of a vicinity of the position that is in contact with the body, of a surface of the three-dimensional object OB1. The display device 1 may perform notification with a sound and/or vibration, in place of, or in addition to such visual notification.

As described above, when the state in which the real body such as the finger is in contact with the three-dimensional object OB1 has been continuously detected for a predetermined time or more, the display device 1 determines that the three-dimensional object OB1 has been selected as the object to be operated. The continuous detection of the contact state for the predetermined time or more is added as one of conditions, whereby a possibility of selecting an unintended three-dimensional object as the object to be operated in the process of moving the finger to operate another three-dimensional object can be reduced.

Assume that, after the three-dimensional object OB1 is selected as the object to be operated, the user enters the finger F1 into an inner side of the three-dimensional object OB1 such that he/she presses the three-dimensional object OB1, as illustrated in Step S13. When the operation of entering the body into the three-dimensional object selected as the object to be operated has been detected, the display device 1 changes the three-dimensional object according to the operation. How to change the three-dimensional object is determined based on the type of the three-dimensional object defined in the object data 24b, and a rule of change associated with the type defined in the acting data 24c.

For example, assume that the three-dimensional object OB1 is defined as an elastic body in the object data 24b, and it is defined in the acting data 24c that the elastic body is deformed in the direction of pressing according to the amount of pressing when pressed. In this case, as illustrated in Step S14, the display device 1 changes the three-dimensional object OB1 such that a portion into which the finger F1 enters is pressed and recessed.

Assume that the three-dimensional object OB1 is defined as a rigid body in the object data 24b, and it is defined in the acting data 24c that the rigid body is moved in the direction of pressing according to the amount of pressing when pressed. In this case, as illustrated in Step S15 of FIG. 16, the display device 1 moves the three-dimensional object OB1 into a direction of travel of the finger F1 such that the three-dimensional object OB1 is pressed by the finger F1. At Step S15 of FIG. 16, the three-dimensional object OB1 is supported by the bottom surface B1, and is thus moved according to a component of force applied to the rigid body in a direction horizontal to the bottom surface B1.

As described above, when the operation to press the three-dimensional object has been detected, the three-dimensional object OB1 is changed based on the object data 24b and the acting data 24c, whereby the three-dimensional object can be changed in various manners according to the operation. The pressing operation is operation used in various scenes in the real world. Therefore, the processing of detecting and handling the operation to press the three-dimensional object OB1 is executed, whereby intuitive and highly convenient operability can be realized.

The body used for operating the three-dimensional object is not limited to the finger, and may be a hand, a foot, a stick, a tool, or the like. A manner in which the three-dimensional object is changed according to the pressing operation may conform to a real physical rule, or may be one that is unlikely to happen in reality.

The display device 1 may limit the space in which the display device 1 detects the operation to the three-dimensional object, to an operable range 51. The operable range 51 is a range that can be reached by the hand of the user who wears the display device 1. In this way, the space in which the display device 1 detects the operation to the three-dimensional object is limited, whereby a load of calculation processing executed by the display device 1 in order to detect the operation can be reduced.

Figure 17:
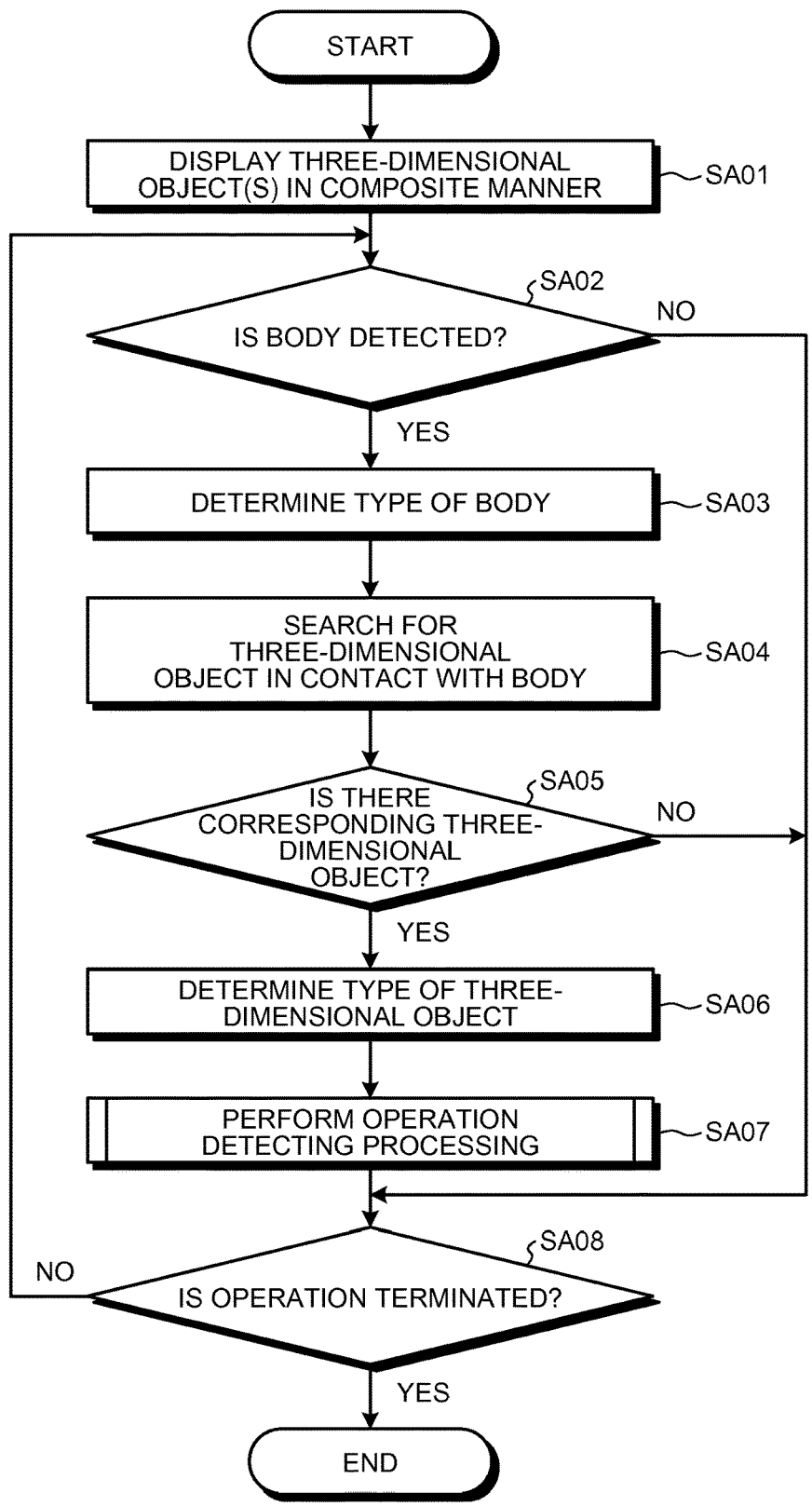
FIG. 17 is a flowchart illustrating a processing procedure of contact detecting processing in the first example.

Then, a first example of a processing procedure executed by the display device 1 with respect to the operation to press the three-dimensional object will be described with reference to FIGS. 17 and 18. FIG. 17 is a flowchart illustrating a processing procedure of contact detecting processing of the three-dimensional object. The processing procedure illustrated in FIG. 17 is realized by the control unit 22 executing the control program 24a.

As illustrated in FIG. 17, first of all, at Step SA01, the control unit 22 composites and displays an image of the virtual space including the three-dimensional object(s) and an image of the real space.

Subsequently, at Step SA02, the control unit 22 determines whether a predetermined body has been detected by the detection unit 44, that is, by the imaging units 40 and 42. The predetermined body is, for example, a finger of the user. When the predetermined body has not been detected (No at Step SA02), then at Step SA08, the control unit 22 determines whether operation termination has been detected.

The operation termination is detected, for example, when predetermined operation with respect to the operating unit 13 has been performed. When the operation termination has been detected (Yes at Step SA08), the control unit 22 terminates the contact detecting processing. When the operation termination has not been detected (No at Step SA08), the control unit 22 re-executes Step SA02 and the subsequent steps.

When the predetermined body has been detected (Yes at Step SA02), then at Step SA03, the control unit 22 determines the type of the predetermined body. The type of the predetermined body is determined based on, for example, the size, the shape, the color, or the like of the body in the images captured by the imaging units 40 and 42. Subsequently, at Step SA04, the control unit 22 searches for a three-dimensional object that is in contact with the predetermined body. When there is no three-dimensional object that is in contact with the predetermined body (No at Step SA05), the control unit 22 proceeds to Step SA08.

When the three-dimensional object that is in contact with the predetermined body is found (Yes at Step SA05), then at Step SA06, the control unit 22 determines the type of the three-dimensional object that is in contact with the predetermined body, based on the object data 24b. Then, at Step SA07, the control unit 22 executes operation detecting processing described below. Subsequently, the control unit 22 proceeds to Step SA08.

Figure 18:
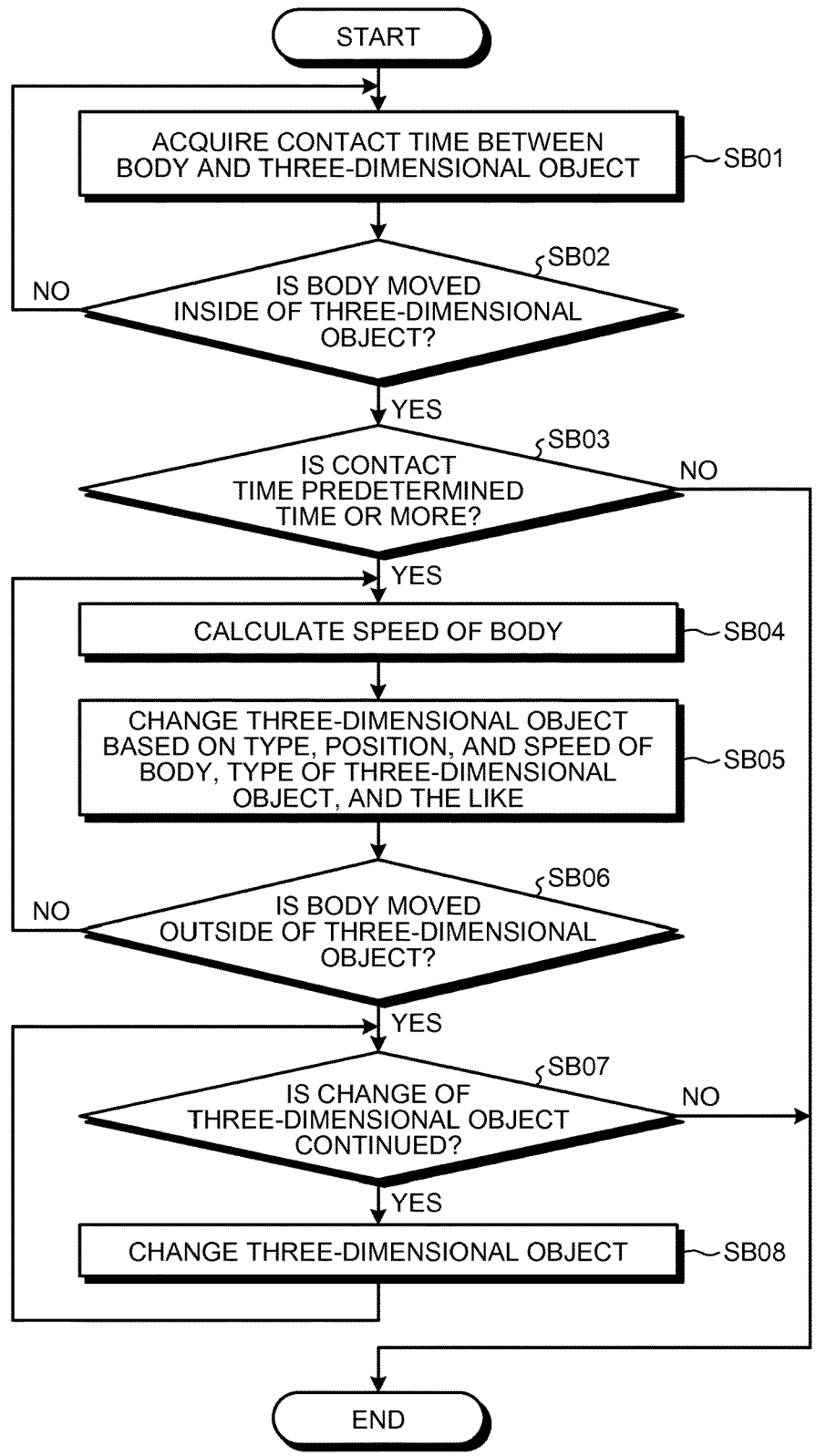
FIG. 18 is a flowchart illustrating a processing procedure of operation detecting processing in the first example.

FIG. 18 is a flowchart illustrating a processing procedure of the operation detecting processing. The processing procedure illustrated in FIG. 18 is realized by the control unit 22 executing the control program 24a.

As illustrated in FIG. 18, first of all, at Step SB01, the control unit 22 acquires a contact time of the predetermined body and the three-dimensional object. Then, at Step SB02, the control unit 22 determines whether the predetermined body has been moved to an inside of the three-dimensional object. When the predetermined body has not been moved to the inside of the three-dimensional object (No at Step SB02), the control unit 22 re-executes Step SB01 and the subsequent steps.

When the predetermined body has been moved to the inside of the three-dimensional object (Yes at Step SB02), then at Step SB03, the control unit 22 determines whether the contact time is a predetermined time or more. When the contact time is shorter than the predetermined time (No at Step SB03), the three-dimensional object is determined not to be the object to be operated, and thus the control unit 22 terminates the operation detecting processing.

When the contact time is the predetermined time or more (Yes at Step SB03), then at Step SB04, the control unit 22 calculates the speed of the predetermined body. Then, at Step SB05, the control unit 22 changes the three-dimensional object based on the type, the position, and the speed of the predetermined body, and the type of the three-dimensional object, and the like. A specific way of changing the three-dimensional object is determined according to the acting data 24c.

Subsequently, at Step SB06, the control unit 22 determines whether the predetermined body has been moved to an outside of the three-dimensional object. When the predetermined body has not been moved to the outside of the three-dimensional object, that is, when the pressing operation is continued (No at Step SB06), the control unit 22 re-executes Step SB04 and the subsequent steps.

When the predetermined body has been moved to the outside of the three-dimensional object, that is, when the three-dimensional object has been released (Yes at Step SB06), then at Step SB07, the control unit 22 determines whether the change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SB07), then at Step SB08, the control unit 22 changes the three-dimensional object, and then re-executes Step SB07 and the subsequent steps. When the change of the three-dimensional object is not continued (No at Step SB07), the control unit 22 terminates the operation detecting processing.

As described above, in the first example, the three-dimensional object is changed in various manners according to the pressing operation, whereby a highly convenient operation method can be provided to the user.

A second example of a processing procedure related to the operation to press a three-dimensional object will be described. The contact detecting processing in the second example is the same as the contact detecting processing in the first example. Therefore, in the second example, description overlapping with the first example is not repeated, and the operation detecting processing will be mainly described.

Figure 19:
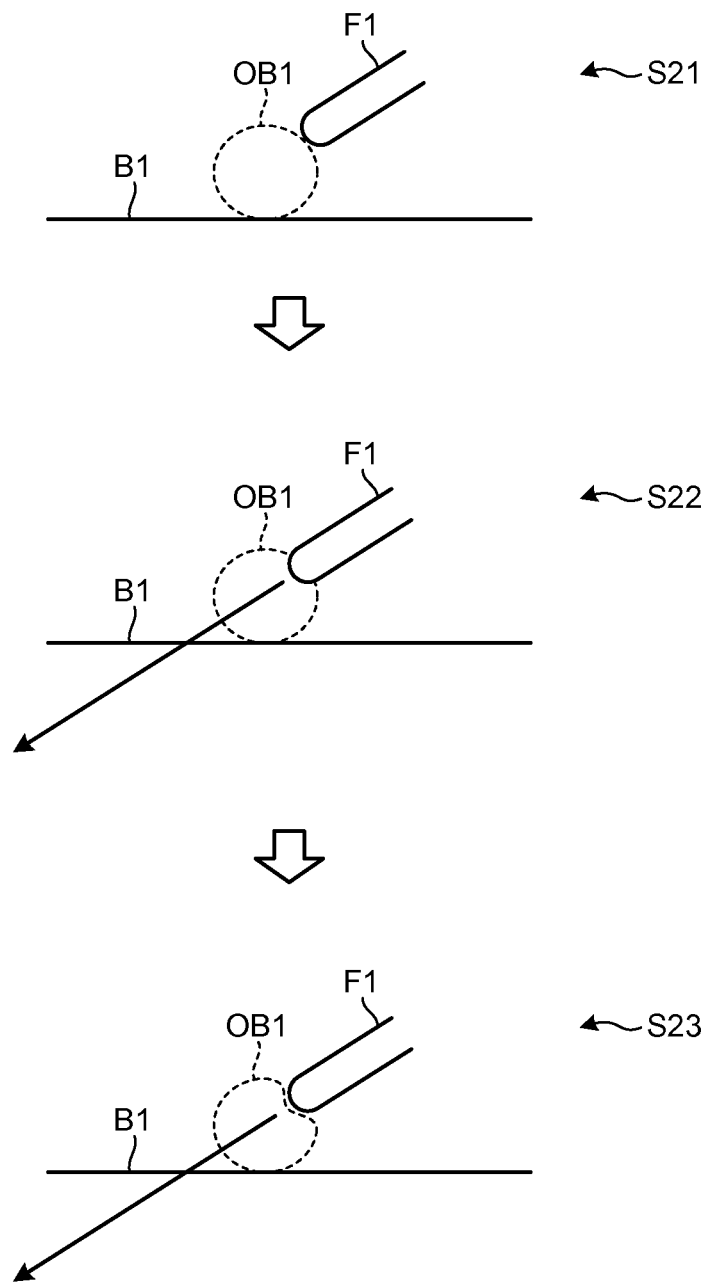
FIG. 19 is a diagram for describing a second example of detection of operation to press a three-dimensional object, and change of the three-dimensional object according to the detected operation.

First of all, detection of operation to press a three-dimensional object, and change of the three-dimensional object according to the detected operation will be described with reference to FIG. 19. FIG. 19 is a diagram for describing detection of the operation to press a three-dimensional object, and change of the three-dimensional object according to the detected operation. At Step S21 illustrated in FIG. 19, the user brings the finger F1 in contact with the three-dimensional object OB1, and at Step S22, the user enters the finger F1 into an inner side of the three-dimensional object OB1.

When a real body has been detected in the display space, and a state in which the real body is in contact with the three-dimensional object OB1, and is then moved to an inside of the three-dimensional object OB1 is continued for a predetermined time or more, the display device 1 determines that the three-dimensional object OB1 has been selected as the object to be operated. Then, the display device 1 notifies the user of the fact that the three-dimensional object OB1 has been selected as the object to be operated, by changing the display style of the three-dimensional object OB1, or the like. Further, as illustrated in Step S23, the display device 1 changes the three-dimensional object OB1 according to the operation with the finger F1 of at and after the contact detection, as if the three-dimensional object OB1 had already been selected as the object of the pressing operation at the stage of Step S21.

As described above, after the contact of the body and the three-dimensional object is detected, the pressing operation is made detectable even if the body does not stay on site, whereby the user can promptly start the operation to press the three-dimensional object. Further, the continuance of the state in which the body is moved to the inside of the three-dimensional object OB1 after the contact for the predetermined time or more is added as one of conditions, whereby the possibility of selecting an unintended three-dimensional object as the object to be operated in the process of moving the finger to operate another three-dimensional object can be reduced.

Figure 20:
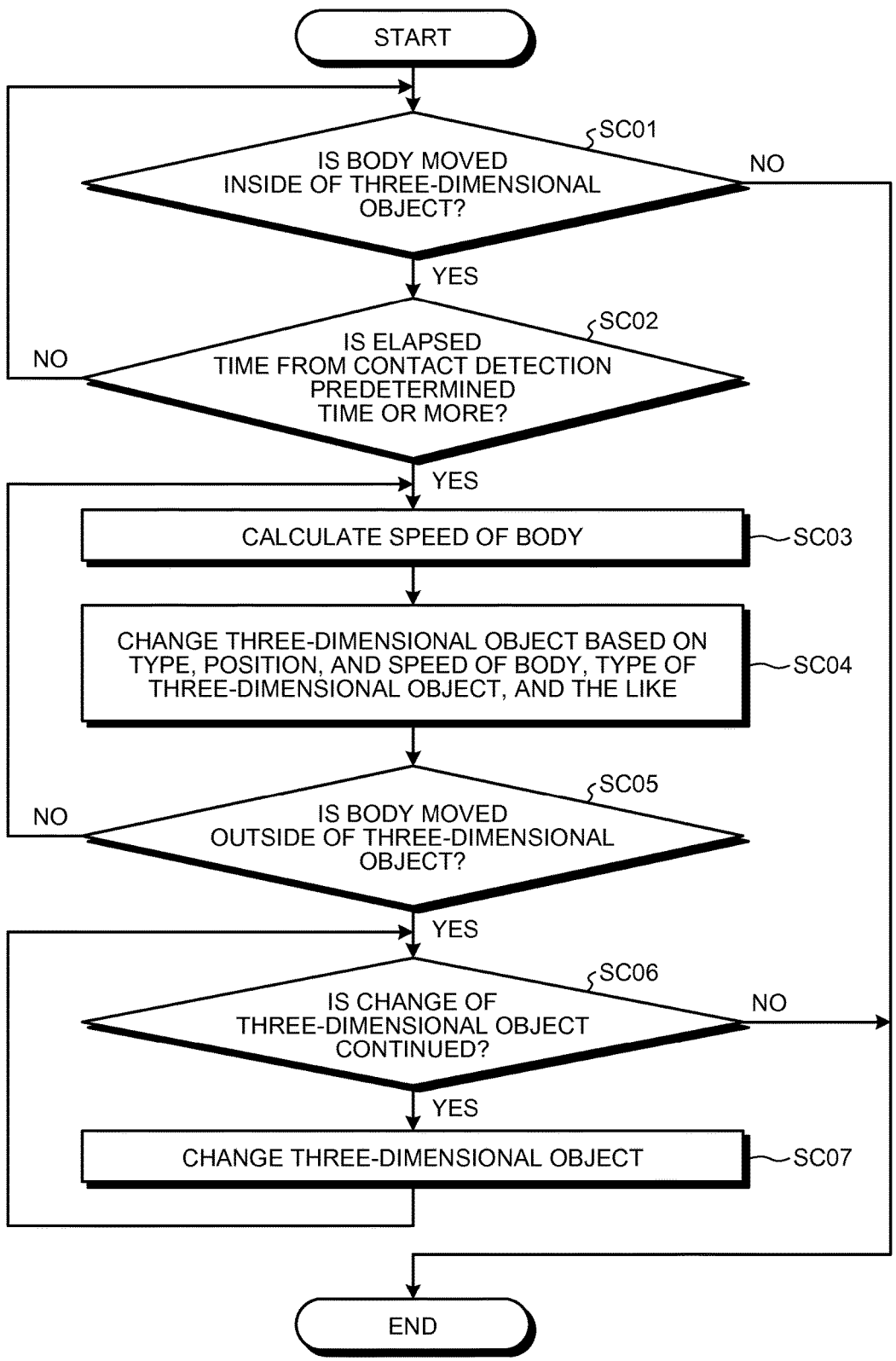
FIG. 20 is a flowchart illustrating a processing procedure of operation detecting processing in the second example.

Then, a processing procedure of the operation detecting processing in the second example will be described with reference to FIG. 20. FIG. 20 is a flowchart illustrating a processing procedure of the operation detecting processing. The processing procedure illustrated in FIG. 20 is realized by the control unit 22 executing the control program 24a. A processing procedure of contact detecting processing is similar to the procedure illustrated in FIG. 17.

As illustrated in FIG. 20, first of all, at Step SC01, the control unit 22 determines whether a predetermined body has been moved to an inside of the three-dimensional object. When the predetermined body has not been moved to the inside of the three-dimensional object (No at Step SC01), the three-dimensional object is determined not to be the object to be operated, and thus the control unit 22 terminates the operation detecting processing.

When the predetermined body has been moved to the inside of the three-dimensional object (Yes at Step SC01), then at Step SC02, the control unit 22 determines whether an elapsed time from the contact detection is a predetermined time or more. When the elapsed time is shorter than the predetermined time (No at Step SC02), the control unit 22 re-executes Step SC01 and the subsequent steps.

When the elapsed time is the predetermined time or more (Yes at Step SC02), then at Step SC03, the control unit 22 calculates the speed of the predetermined body. Then, at Step SC04, the control unit 22 changes the three-dimensional object based on the type, the position, and the speed of the predetermined body, the type of the three-dimensional object, and the like. A specific way of changing the three-dimensional object is determined according to the acting data 24c.

Subsequently, at Step SC05, the control unit 22 determines whether the predetermined body has been moved to an outside of the three-dimensional object. When the predetermined body has not been moved to the outside of the three-dimensional object, that is, when the pressing operation is continued (No at Step SC05), the control unit 22 re-executes Step SC03 and the subsequent steps.

When the predetermined body has been moved to the outside of the three-dimensional object, that is, when the three-dimensional object has been released (Yes at Step SC05), then at Step SC06, the control unit 22 determines whether change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SC06), then at Step SC07, the control unit 22 changes the three-dimensional object, and then re-executes Step SC06 and the subsequent steps. When the change of the three-dimensional object is not continued (No at Step SC06), the control unit 22 terminates the operation detecting processing.

As described above, in the second example, the pressing operation is recognized even if the state in which the body such as the finger is in contact with the three-dimensional object is not continued for the predetermined time or more. Therefore, the user can promptly start the operation to press the three-dimensional object.

A third example of a processing procedure related to the operation to press a three-dimensional object will be described. The contact detecting processing in the third example is the same as the contact detecting processing in the first example. Therefore, in the third example, description overlapping with the first example is not repeated, and the operation detecting processing will be mainly described.

Figure 21:
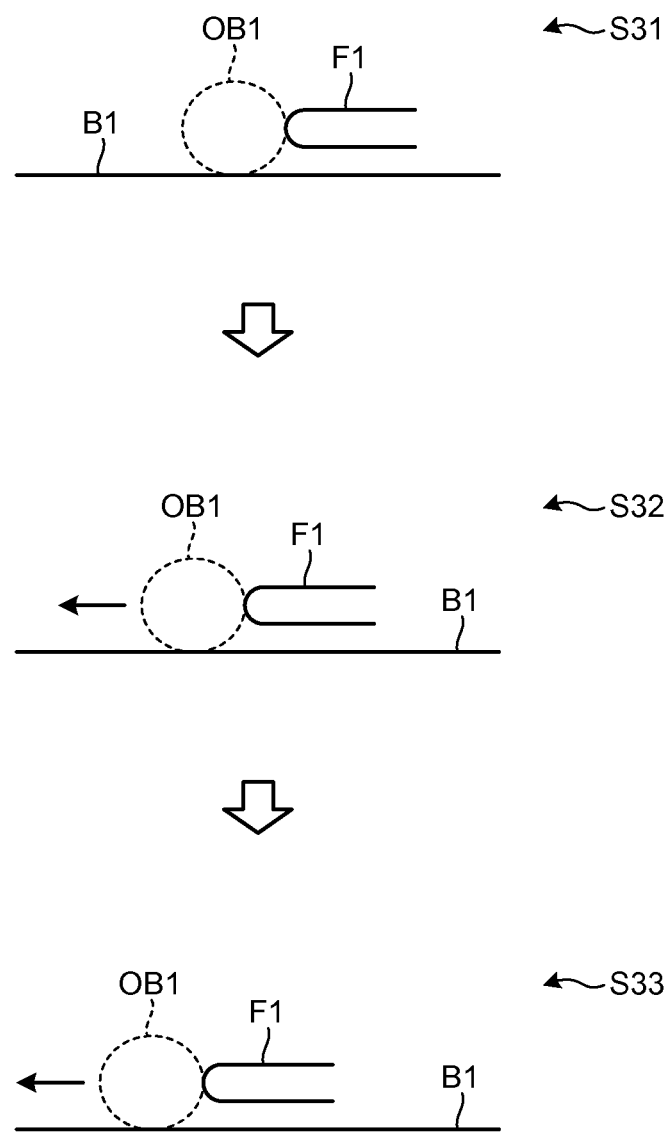
FIG. 21 is a diagram for describing a third example of detection of operation to press a three-dimensional object, and change of the three-dimensional object according to the detected operation.
Figure 22:
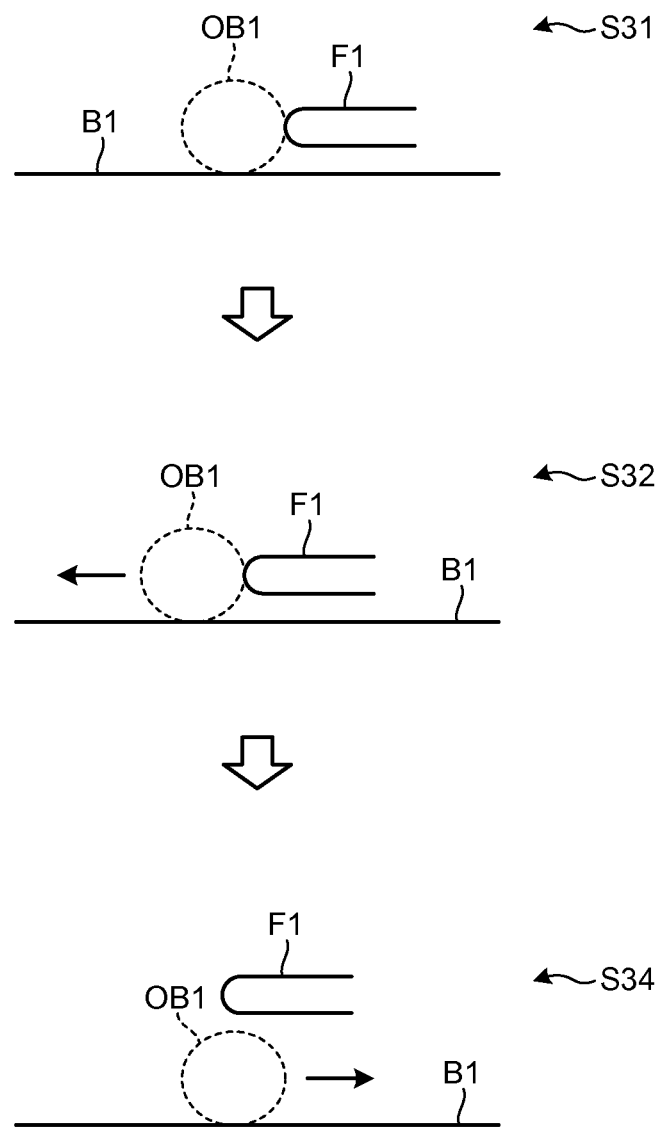
FIG. 22 is a diagram for describing the third example of detection of operation to press a three-dimensional object, and change of the three-dimensional object according to the detected operation.

First of all, detection of the operation to press a three-dimensional object, and change of the three-dimensional object according to the detected operation will be described with reference to FIGS. 21 and 22. FIGS. 21 and 22 are diagrams for describing detection of the operation to press a three-dimensional object, and change of the three-dimensional object according to the detected operation. At Step S31 illustrated in FIG. 21, the three-dimensional object OB1 is stereoscopically displayed in the display space. Further, the user brings the finger F1 in contact with the three-dimensional object OB1.

Assume that the user enters the finger F1 into an inside of the three-dimensional object OB1. When it is detected that the body that is in contact with the three-dimensional object OB1 has been moved to the inside of the three-dimensional object OB1, the display device 1 changes the three-dimensional object OB1 from the time point, according to the operation with the finger F1, as illustrated in Step S32. In the example illustrated in FIG. 21, at Step S32, the three-dimensional object OB1 has already started movement in accordance with the movement of the finger F1.

Then, as illustrated in Step S33, the display device 1 determines the three-dimensional object OB1 as the object to be operated, at a stage where the movement of the finger F1 to the inside of the three-dimensional object OB1 is continued for a predetermined time or more. Then, the display device 1 notifies the user of the fact that the three-dimensional object OB1 has been determined as the object to be operated, by changing the display style of the three-dimensional object OB1, or the like. The display device 1 still continues to change the three-dimensional object OB1 while the movement of the finger F1 to the inside of the three-dimensional object OB1 is detected.

As illustrated in Step S34 of FIG. 22, when the movement of the finger F1 to the inside of the three-dimensional object OB1 has not been detected before a predetermined time elapses, the display device 1 applies reverse change to the change applied by that time, to the three-dimensional object OB1. As a result, the three-dimensional object OB1 is displayed at the same position in the same state as the stage of Step S31. The speed to apply the reverse change to the three-dimensional object OB1 may be faster than the speed at which the change to the three-dimensional object OB1 had been applied by that time. That is, the display device 1 may reversely change the three-dimensional object OB1 as if the display device 1 reversely reproduced the three-dimensional object OB1 at a high speed.

As described above, the display device 1 starts applying the change to the three-dimensional object from at the stage where it is detected that the body enters into the inside of the three-dimensional object, whereby the user can recognize the three-dimensional object is getting selected before the selection is determined. As a result, the user can know whether an intended three-dimensional object has been selected, at an early stage. When an unintended three-dimensional object has been selected, the user can put the unintendedly selected three-dimensional object back in an original state, by canceling the operation before the predetermined time elapses.

Until the movement of the finger F1 to the inside of the three-dimensional object OB1 is continued for a predetermined time or more, the three-dimensional object to which the change is applied may be displayed in a style different (for example, translucently) from a normal time or from a state in which the selection as the object to be operated has been determined. By the change of the display style in such a manner, the user can easily discriminate the state of the three-dimensional object.

Figure 23:
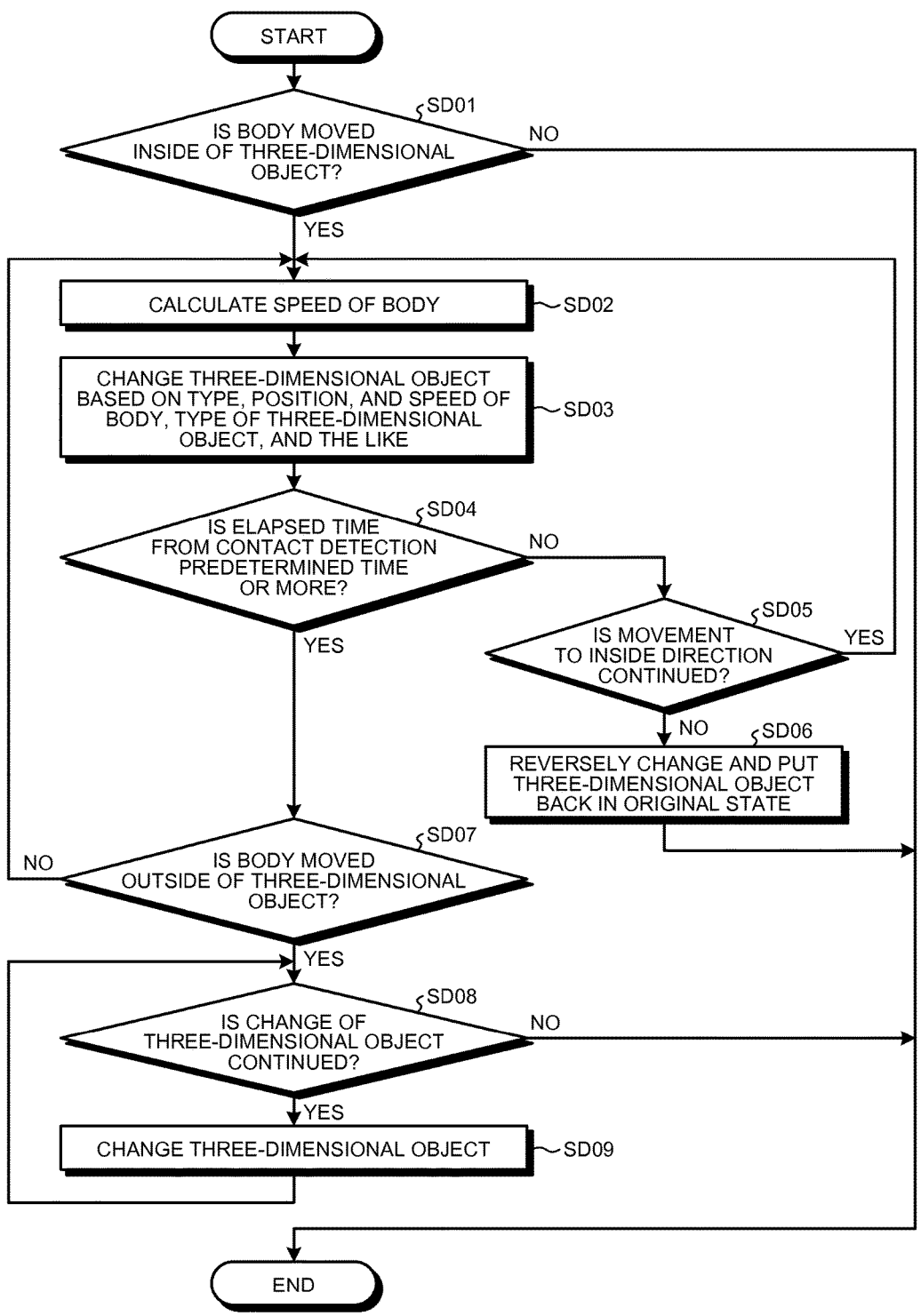
FIG. 23 is a flowchart illustrating a processing procedure of operation detecting processing in the third example.

Then, a processing procedure of the operation detecting processing in the third example will be described with reference to FIG. 23. FIG. 23 is a flowchart illustrating a processing procedure of the operation detecting processing. The processing procedure illustrated in FIG. 23 is realized by the control unit 22 executing the control program 24a. The processing procedure in the contact detecting processing is similar to the procedure illustrated in FIG. 17.

As illustrated in FIG. 23, first of all, at Step SD01, the control unit 22 determines whether a predetermined body has been moved to an inside of a three-dimensional object. When the predetermined body has not been moved to the inside of the three-dimensional object (No at Step SD01), the three-dimensional object is determined not to be the object to be operated, and thus the control unit 22 terminates the operation detecting processing.

When the predetermined body has been moved to the inside of the three-dimensional object (Yes at Step SD01), then at Step SD02, the control unit 22 calculates the speed of the predetermined body. Then, at Step SD03, the control unit 22 changes the three-dimensional object, based on the type, the position, and the speed of the predetermined body, the type of the three-dimensional object, and the like. A specific way of changing the three-dimensional object is determined according to the acting data 24c.

Subsequently, at Step SD04, the control unit 22 determines whether an elapsed time from the contact detection is a predetermined time or more. When the elapsed time is shorter than the predetermined time, that is, when the three-dimensional object has not been determined as the object of the pressing operation (No at Step SD04), then at Step SD05, the control unit 22 determines whether the movement of the predetermined body to the inside of the three-dimensional object is continued.

When the movement to the inside of the three-dimensional object is continued (Yes at Step SD05), the control unit 22 re-executes Step SD02 and the subsequent steps. When the movement to the inside of the three-dimensional object is not continued (No at Step SD05), then at Step SD06, the control unit 22 reversely changes the three-dimensional object and puts the three-dimensional object back in the original state. Then, the control unit 22 terminates the operation detecting processing.

When the elapsed time from the contact detection is the predetermined time or more (Yes at Step SD04), then at Step SD07, the control unit 22 determines whether the predetermined body has been moved to an outside of the three-dimensional object. When the predetermined body has not been moved to the outside of the three-dimensional object, that is, when the pressing operation is continued (No at Step SD07), the control unit 22 re-executes Step SD02 and the subsequent steps.

When the predetermined body has been moved to the outside of the three-dimensional object, that is, when the three-dimensional object has been released (Yes at Step SD07), then at Step SD08, the control unit 22 determines whether the change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SD08), then at Step SD09, the control unit 22 changes the three-dimensional object, and re-executes Step SD08 and the subsequent steps. When the change of the three-dimensional object is not continued (No at Step SD08), the control unit 22 terminates the operation detecting processing.

As described above, in the third example, from at the time point when the pressing operation has been detected, the three-dimensional object is changed according to the operation. Therefore, the user can easily recognize the three-dimensional object that is an object of the pressing operation.

The operation to press the three-dimensional object has been described as the operation related to the three-dimensional object. However, the operation detected by the display device 1 in relation to the three-dimensional object is not limited to the pressing operation. The display device 1 can also detect operation performed by holding the three-dimensional object by the user. Hereinafter, operation performed by holding the three-dimensional object will be described.

Figure 24:
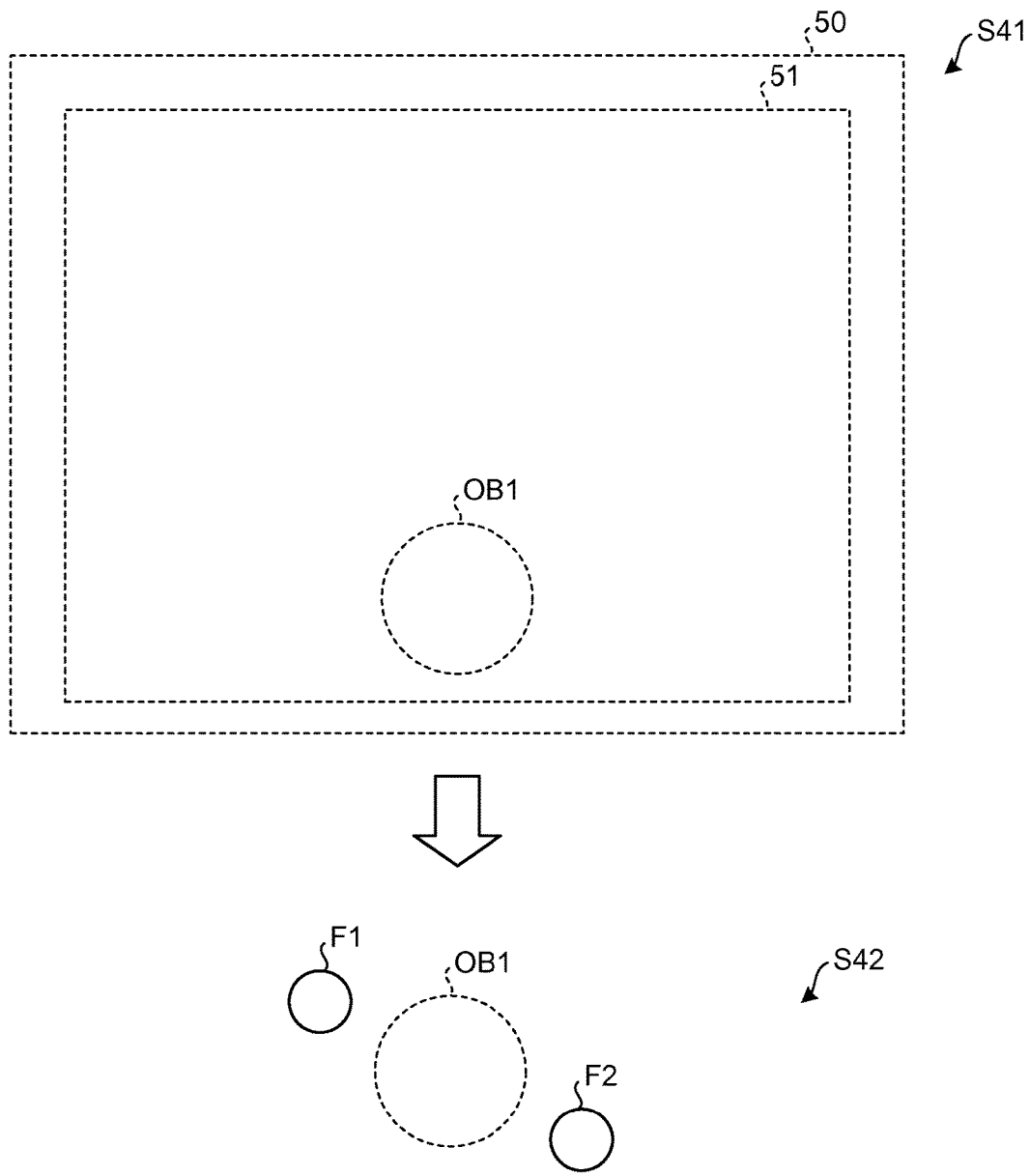
FIG. 24 is a diagram for describing a first example of detection of operation performed by holding a three-dimensional object.

Detection of the operation performed by holding the three-dimensional object will be described with reference to FIG. 24. FIG. 24 is a diagram for describing the detection of the operation performed by holding the three-dimensional object. At Step S41 illustrated in FIG. 24, the three-dimensional object OB1 is stereoscopically displayed in the display space 50.

Assume that the user wishes to hold the three-dimensional object OB1 and perform some sort of operation. To hold the three-dimensional object OB1 and perform some sort of operation, first of all, it is necessary to select the three-dimensional object OB1 as the object to be operated. To select the three-dimensional object OB1, as illustrated in Step S42, the user moves the finger F1 and a finger F2 such that the three-dimensional object OB1 is positioned between the finger F1 and the finger F2, and maintains the state for a predetermined time or more.

When two real bodies have been detected in the display space, and the state in which the three-dimensional object OB1 is positioned between the two bodies is continued for a predetermined time or more, the display device 1 determines that the three-dimensional object OB1 has been selected, and causes the three-dimensional object OB1 to be in a selected state. Then, the display device 1 notifies the user of the fact that the three-dimensional object OB1 is in a selected state, by changing the display style of the three-dimensional object OB1, or the like.

The determination of whether the three-dimensional object OB1 is positioned between the two bodies is made based on the positions of the two bodies in the real space, the shape, the attitude, and the position in the virtual space of the three-dimensional object OB1, and the like. Comparison between the position in the real space and the position in the virtual space may be performed by converting a position in one space into a position in the other space based on the above-described predetermined rule, or may be performed by converting positions in both spaces into positions in a space for comparison. When fingers have been detected as the real bodies, the positions of tips of the fingers may be processed as the positions of the bodies.

As descried above, when the state in which the three-dimensional object OB1 is positioned between the real bodies such as the fingers has been continuously detected for a predetermined time or more, the display device 1 determines that the three-dimensional object OB1 has been selected. The operation to arrange the fingers to sandwich the three-dimensional object OB1 is similar to human operation to hold something in order to select something in the real space. Therefore, the operation is intuitive and easy to understand, as operation for selecting the three-dimensional object. Further, the continuous detection of the state for the predetermined time or more is added as one of conditions, whereby, for example, the possibility of selecting an unintended three-dimensional object in the process of moving the fingers to select another three-dimensional object can be reduced.

After determining that the three-dimensional object OB1 is in the selected state, the display device 1 applies change, such as movement, deformation, or disappearance, to the three-dimensional object OB1 according to the movement of the finger F1 and the finger F2.

Figure 25:
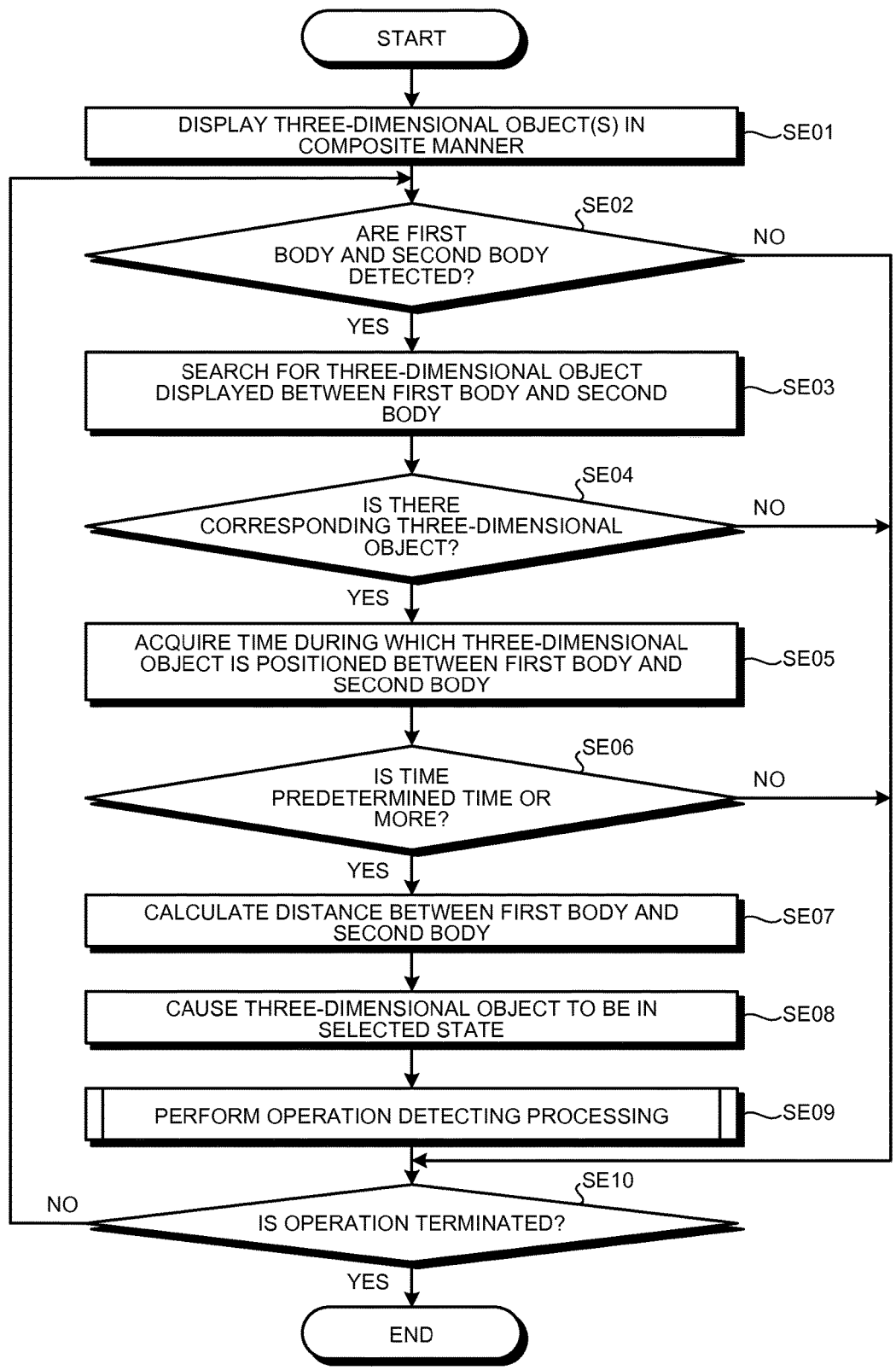
FIG. 25 is a flowchart illustrating a processing procedure of selection detecting processing in the first example.

Then, a first example of a processing procedure executed by the display device 1 in relation to the operation performed by holding a three-dimensional object will be described with reference to FIGS. 25 and 26. FIG. 25 is a flowchart illustrating a processing procedure of selection detecting processing of the three-dimensional object. The processing procedure illustrated in FIG. 25 is realized by the control unit 22 executing the control program 24a.

As illustrated in FIG. 25, first of all, at Step SE01, the control unit 22 composites and displays an image in the virtual space including the three-dimensional object(s) and an image of the real space.

Subsequently, at Step SE02, the control unit 22 determines whether a first body and a second body have been detected by the detection unit 44, that is, by the imaging units 40 and 42. The first body and the second body are real bodies, for example, fingers of the user. When the first body and the second body have not been detected (No at Step SE02), then at Step SE10, the control unit 22 determines whether operation termination has been detected.

The operation termination is detected when predetermined operation with respect to the operating unit 13 has been performed, for example. When the operation termination has been detected (Yes at Step SE10), the control unit 22 terminates the selection detecting processing. When the operation termination has not been detected (No at Step SE10), the control unit 22 re-executes Step SE02 and the subsequent steps.

When the first body and the second body have been detected (Yes at Step SE02), then at Step SE03, the control unit 22 searches the displayed three-dimensional object(s) for a three-dimensional object displayed between the first body and the second body. When there is no corresponding three-dimensional object (No at Step SE04), the control unit 22 proceeds to Step SE10.

When the three-dimensional object displayed between the first body and the second body is found (Yes at Step SE04), then at Step SE05, the control unit 22 acquires a time during which the three-dimensional object is positioned between the first body and the second body. When the acquired time is less than a predetermined time (No at Step SE06), the control unit 22 proceeds to Step SE10.

When the acquired time is the predetermined time or more (Yes at Step SE06), then at Step SE07, the control unit 22 calculates a distance between the first body and the second body. At Step SE08, the control unit 22 causes the three-dimensional object displayed between the first body and the second body to be in the selected state. Then, at Step SE09, the control unit 22 executes operation detecting processing described below, and, in the processing, changes the three-dimensional object in the selected state, according to the detected operation. After the operation detecting processing has been completed, the control unit 22 proceeds to Step SE10.

Figure 26:
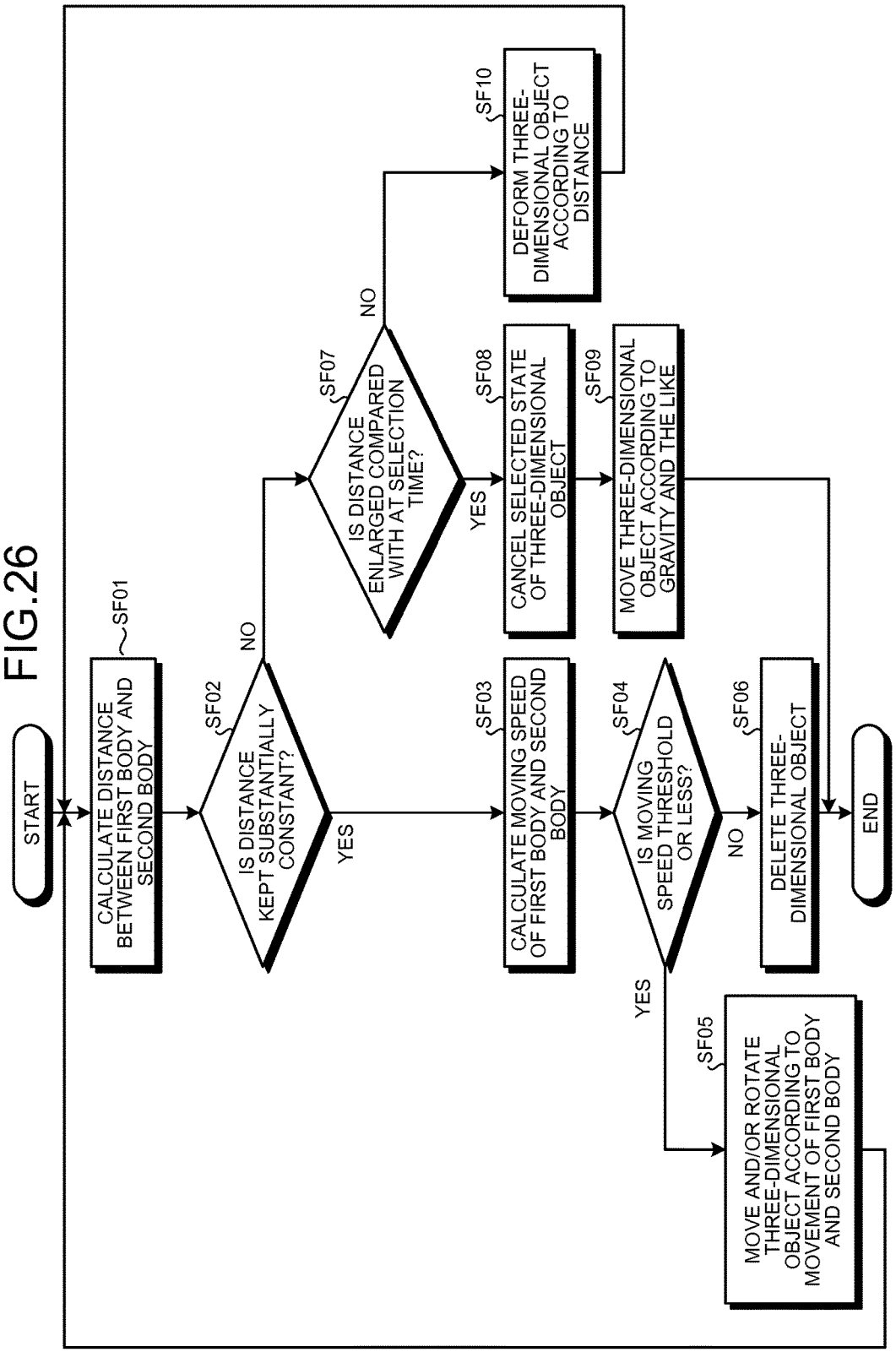
FIG. 26 is a flowchart illustrating a processing procedure of operation detecting processing in the first example.

FIG. 26 is a flowchart illustrating a processing procedure of the operation detecting processing. The processing procedure illustrated in FIG. 26 is realized by the control unit 22 executing the control program 24a.

As illustrated in FIG. 26, first of all, at Step SF01, the control unit 22 calculates a distance between the first body and the second body. Then, at Step SF02, the control unit 22 determines whether the distance between the first body and the second body at and after a start time point of the operation detecting processing is kept substantially constant. The distance being kept substantially constant means that an amount of change of the distance between the first body and the second body at the current time point falls within a predetermined range (±10% or so of a maximum amount of change of the distance when the first body and the second body are moved at a normal speed), compared with the distance at the start time point of the operation detecting processing, for example. Alternatively, when the distance between the first body and the second body is continuously reduced at and after the start time point of the operation detecting processing (when the first body and the second body are moved into a direction of squashing the three-dimensional object), the control unit 22 may determine that the distance is kept substantially constant. Further alternatively, when the distance between the first body and the second body is changed only within a range of hand shake, or the like, the control unit 22 may determine that the distance is kept substantially constant.

When the distance between the first body and the second body is kept substantially constant (Yes at Step SF02), then at Step SF03, the control unit 22 calculates a moving speed of the first body and the second body. Then, at Step SF04, the control unit 22 determines whether the calculated moving speed is a threshold or less. The threshold used here is a moving speed of a fingertip of a human when he/she throws an object. The moving speed compared with the threshold may be an average speed of the moving speeds of the first body and the second body, or may be a faster one or a slower one of the moving speeds of the first body and the second body.

When the moving speed is the threshold or less (Yes at Step SF04), at Step SF05, the control unit 22 applies change to the three-dimensional object according to detected movement of the first body and second body. For example, when movement of the first body and the second body in the right direction is detected, the control unit 22 moves the three-dimensional object in the right direction in accordance with the movement of the first body and the second body. When left-handed rotation of the first body and the second body is detected, the control unit 22 rotates the three-dimensional object in a left-handed direction in accordance with the rotation of the first body and the second body. When the movement and the rotation have been detected at the same time, the movement and the rotation are executed at the same time. When there is an obstacle against the movement and/or the rotation of the three-dimensional object, the movement and/or the rotation of the three-dimensional object may be stopped at a time point when the three-dimensional object comes in contact to the obstacle. The obstacle may be a real body or may be another three-dimensional object. Then, the control unit 22 re-executes Step SF01 and the subsequent steps.

When the moving speed is faster than the threshold (No at Step SF04), then at Step SF06, the control unit 22 deletes the three-dimensional object. When deleting the three-dimensional object, the control unit 22 may display animation such that the three-dimensional object flies on to the moving direction of the first body and the second body. Then, the control unit 22 terminates the operation detecting processing. As described above, the three-dimensional object is deleted when the first body and the second body are moved at a high speed to throw the three-dimensional object, whereby the deletion of the three-dimensional object can be realized with intuitive operation. Instead of the operation to move the first body and the second body at a high speed, the deletion of the three-dimensional object may be allocated to operation to squash the three-dimensional object. Instead of deleting the three-dimensional object, the three-dimensional object may be put back to an initial arrangement location. The display device 1 may not perform the processing of Steps SF03, SF04, and SF06. That is, when the distance between the first body and the second body is determined to be substantially constant at Step SF02, the display device 1 may execute Step SF05 regardless of the moving speed of the two bodies.

When the distance between the first body and the second body is not kept substantially constant (No at Step SF02), then at Step SF07, the control unit 22 determines whether the distance is enlarged, compared with at the time of selecting the three-dimensional object, that is, the start time point of the operation detecting processing. When the distance is enlarged (Yes at Step SF07), then at Step SF08, the control unit 22 cancels the selected state of the three-dimensional object. The operation to enlarge the distance between the first body and the second body is similar to operation to release a held real object. Therefore, the operation is intuitive and easy to understand, as the operation for canceling the selection of the three-dimensional object.

Subsequently, at Step SF09, the control unit 22 moves the three-dimensional object, the selection state of which has been canceled, according to the gravity and the like. Then, the control unit 22 terminates the operation detecting processing. The movement here is displayed such that the three-dimensional object falls down according to the gravity, and is stopped on a floor or a table, for example. Before stopping the movement of the three-dimensional object, the control unit 22 may cause the three-dimensional object to bound according to elasticity of the three-dimensional object and hardness of the floor or the table. The control unit 22 may calculate magnitude of impact of when the three-dimensional object collides with the floor or the table, and when the impact is larger than a predetermined value, the control unit 22 may display the three-dimensional object as if it had been broken. The control unit 22 may move the three-dimensional object slower than the case where the actual gravity works.

When the distance between the first body and the second body is reduced, compared with at the time of selecting the three-dimensional object (No at Step SF07), then at Step SF10, the control unit 22 deforms the three-dimensional object according to the distance. Then, the control unit 22 re-executes Step SF01 and the subsequent steps. The degree of deformation of the three-dimensional object may be changed according to elasticity set to the three-dimensional object as an attribute. The control unit 22 may increase the degree of deformation as the distance between the first body and the second body is reduced, regarding an object to which low hardness is set as the attribute, like the three-dimensional object that is modeled on a rubber ball. The control unit 22 may keep the degree of deformation small even if the distance between the first body and the second body is reduced, regarding an object to which high hardness is set as the attribute, like the three-dimensional object that is modeled on a block.

When the distance between the first body and the second body is reduced, compared with at the time of selecting the three-dimensional object, the display device 1 may reduce the size of the three-dimensional object instead of deforming the three-dimensional object. When the distance between the first body and the second body becomes a predetermined value or less, the display device 1 may display the three-dimensional object, as if it had been broken.

As described above, in the first example, when the state in which the three-dimensional object is positioned between the bodies such as the fingers is continued for a predetermined time or more, the three-dimensional object is selected. Therefore, the selection of the three-dimensional object can be realized by intuitive and easily understandable operation.

Figure 27:
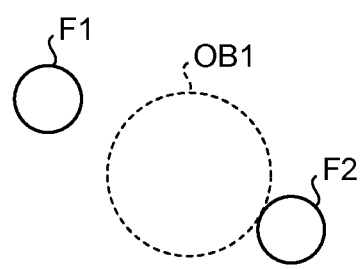
FIG. 27 is a diagram for describing a modification of the first example of detection of operation performed by holding a three-dimensional object.

As illustrated in FIG. 27, the display device 1 may employ continuance of the state in which at least one of the first body and the second body is in contact with the three-dimensional object for a predetermined time or more, as one of conditions to select the three-dimensional object. The contact to the three-dimensional object is employed as the condition of selection, whereby the user can easily select a desired three-dimensional object when a plurality of three-dimensional objects is closely displayed.

A second example of a processing procedure related to the operation performed by holding the three-dimensional object will be described. The operation detecting processing in the second example is the same as the operation detecting processing in the first example. Therefore, in the second example, description overlapping with the first example is not repeated, and the selection detecting processing will be mainly described.

Figure 28:
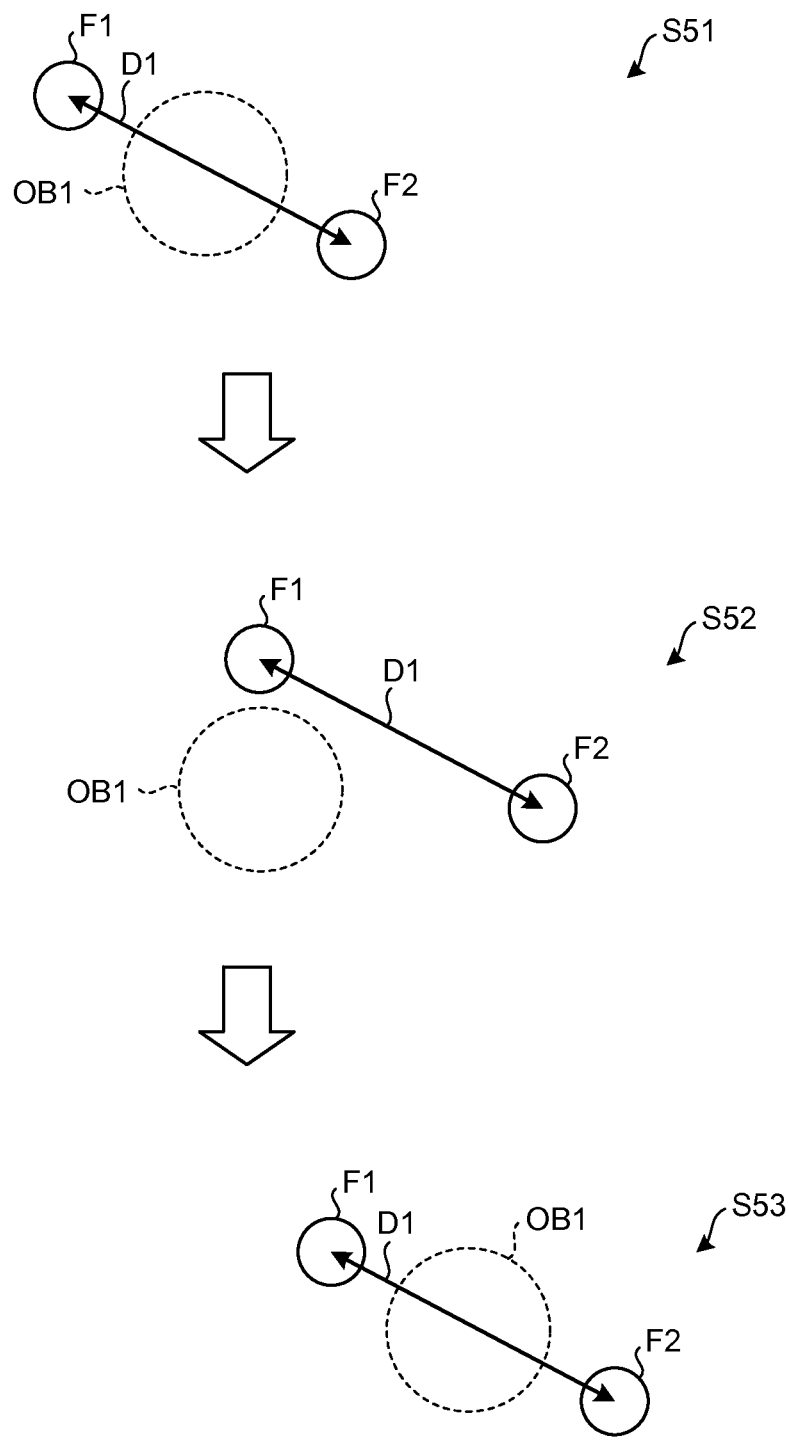
FIG. 28 is a diagram for describing a second example of detection of operation performed by holding a three-dimensional object.

First of all, detection of the operation performed by holding a three-dimensional object will be described with reference to FIG. 28. FIG. 28 is a diagram for describing detection of the operation performed by holding a three-dimensional object. At Step S51 illustrated in FIG. 28, the three-dimensional object OB1 is stereoscopically displayed in the display space. To select the three-dimensional object OB1, the user moves the finger F1 and the finger F2 such that the three-dimensional object OB1 is positioned between the finger F1 and the finger F2.

When two real bodies have been detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in the selected state. Then, the display device 1 notifies the user of the fact that the three-dimensional object OB1 is in the selected state, by changing the display style of the three-dimensional object OB1, or the like.

The two bodies do not necessarily stay at the positions where the two bodies sandwich the three-dimensional object OB1, while the display device 1 is monitoring the change of the distance between the two bodies. That is, after moving the finger F1 and the finger F2 such that the three-dimensional object OB1 is positioned between the finger F1 and the finger F2 as illustrated at Step S51, the user can move the finger F1 and the finger F2 to other positions without keeping the state of the finger F1 and the finger F2.

Assume that the user has moved the finger F1 and the finger F2 from the state of Step S51 while keeping a distance D1 between the finger F1 and the finger F2 substantially constant, as illustrated at Step S52. In this case, as illustrated at Step S53, the display device 1 causes the three-dimensional object OB1 to be in the selected state at a stage where the state in which the distance D1 between the finger F1 and the finger F2 is kept substantially constant is continued for a predetermined time or more. Then, the display device 1 moves the three-dimensional object OB1 to between the finger F1 and the finger F2, as if the three-dimensional object OB1 had already been selected at the stage of Step S51. The display device 1 may store the movement of the finger F1 and the finger F2 from Steps S51 to S53, and apply rotation or the like to the three-dimensional object OB1 in accordance with the stored movement. Subsequently, the display device 1 provides change, such as movement, deformation, or disappearance, to the three-dimensional object OB1 according to the movement of the finger F1 and the finger F2.

As described above, when the two bodies are once moved to the positions where these bodies sandwich the three-dimensional object, the display device 1 allows the user to select the three-dimensional even if these bodies do not stay at the positions thereafter, whereby the user can promptly start operation after selecting the three-dimensional object.

Figure 29:
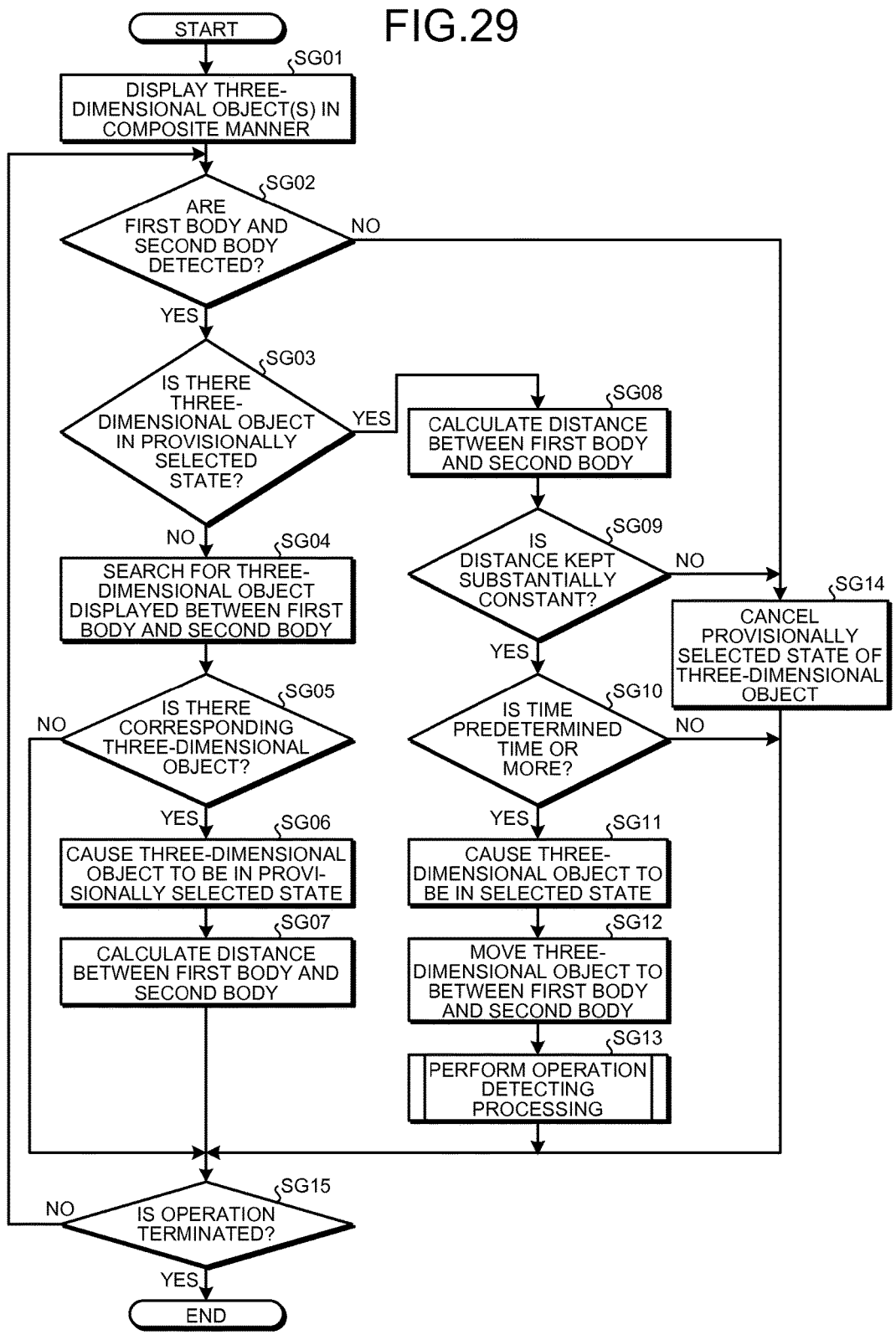
FIG. 29 is a flowchart illustrating a processing procedure of selection detecting processing in the second example.

Then, a processing procedure of the selection detecting processing in the second example will be described with reference to FIG. 29. FIG. 29 is a flowchart illustrating a processing procedure of the selection detecting processing of the three-dimensional object. The processing procedure illustrated in FIG. 29 is realized by the control unit 22 executing the control program 24a.

As illustrated in FIG. 29, first of all, at Step SG01, the control unit 22 composites and displays an image of the virtual space including the three-dimensional object(s) and an image of the real space. Subsequently, at Step SG02, the control unit 22 determines whether the first body and the second body have been selected by the detection unit 44, that is, by the imaging units 40 and 42. When the first body and the second body have not been detected (No at Step SG02), then at Step SG14, if there is a three-dimensional object in a provisionally selected state, the control unit 22 cancels the provisionally selected state of the three-dimensional object. The provisionally selected state is a state in which whether the distance between the two bodies is kept substantially constant is monitored, after the state in which the three-dimensional object is displayed between the two bodies has been detected.

Then, at Step SG15, the control unit 22 determines whether operation termination has been detected. When the operation termination has been detected (Yes at Step SG15), the control unit 22 terminates the selection detecting processing. When the operation termination has not been detected (No at Step SG15), the control unit 22 re-executes Step SG02 and the subsequent steps.

When the first body and the second body have been detected (Yes at Step SG02), then at Step SG03, the control unit 22 determines whether there is a three-dimensional object in the provisionally selected state. When there is no three-dimensional object in the provisionally selected state (No at Step SG03), then at Step SG04, the control unit 22 searches displayed three-dimensional object(s) for a three-dimensional object displayed between the first body and the second body. When there is no corresponding three-dimensional object (No at Step SG05), then the control unit 22 proceeds to Step SG15.

When the three-dimensional object displayed between the first body and the second body is found (Yes at Step SG05), then at Step SG06, the control unit 22 causes the three-dimensional object displayed between the first body and the second body to be in the provisionally selected state. At Step SG07, the control unit 22 calculates a distance between the first body and the second body. Then, the control unit 22 proceeds to Step SG15.

When the first body and the second body have been detected, and there is the three-dimensional object in the provisionally selected state (Yes at Step SG03), then at Step SG08, the control unit 22 calculates the distance between the first body and the second body. Then, at Step SG09, the control unit 22 determines whether the distance is kept substantially constant. When the distance is not kept substantially constant (No at Step SG09), then at Step SG14, the control unit 22 cancels the provisionally selected state of the three-dimensional object in the provisionally selected state. Then, the control unit 22 proceeds to Step SG15.

When the distance between the first body and the second body is kept substantially constant (Yes at Step SG09), then at Step SG10, the control unit 22 determines whether a period in which the distance is kept substantially constant is a predetermined time or more. When the period in which the distance is kept substantially constant is less than the predetermined time (No at Step SG10), the control unit 22 proceeds to Step SG15.

When the period in which the distance is kept substantially constant is the predetermined time or more (Yes at Step SG10), then at Step SG11, the control unit 22 causes the three-dimensional object displayed between the first body and the second body to be in the selected state. Further, at Step SG12, the control unit 22 moves the three-dimensional object to between the first body and the second body. Then, at Step SG13, the control unit 22 executes the operation detecting processing illustrated in FIG. 26, and in the processing, changes the three-dimensional object in the selected state according to the detected operation. After the operation detecting processing is completed, the control unit 22 proceeds to Step SG15.

As described above, in the second example, when the three-dimensional object is positioned between the bodies such as the fingers, and thereafter the distance between the bodies is kept substantially constant for a predetermined time or more, the three-dimensional object is selected. Therefore, the user can promptly start operation after selecting the three-dimensional object.

FIG. 30 is a diagram for describing a modification of the second example of the detection of the operation performed by holding the three-dimensional object. As illustrated in Steps S61 to S63 of FIG. 30, the display device 1 may employ keeping the distance between the first body and the second body substantially constant for a predetermined time or more after at least one of the first body and the second body comes in contact with the three-dimensional object, as one of conditions to select the three-dimensional object. The contact to the three-dimensional object is employed as one of conditions, whereby the user can easily select a desired three-dimensional object when a plurality of three-dimensional objects is closely displayed.

A third example of a processing procedure related to the operation performed by holding the three-dimensional object will be described. In the third example, description overlapping with the first example is not repeated, and the selection detecting processing and the operation detecting processing will be mainly described.

First of all, detection of the operation performed by holding the three-dimensional object will be described with reference to FIGS. 31 and 32. FIGS. 31 and 32 are diagrams for describing a third example of the detection of the operation performed by holding the three-dimensional object. At Step S71 illustrated in FIG. 31, the three-dimensional object OB1 is stereoscopically displayed in the display space. Further, to select the three-dimensional object OB1, the user moves the finger F1 and the finger F2 such that the three-dimensional object OB1 is positioned between the finger F1 and the finger F2.

When two real bodies have been detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in the selected state. Then, the display device 1 notifies the user of the fact that the three-dimensional object OB1 is in the selected state, by changing the display style of the three-dimensional object OB1, or the like.

The two bodies do not necessarily stay at the positions where the two bodies sandwich the three-dimensional object OB1 while the display device 1 is monitoring the change of the distance between the two bodies. That is, after moving the finger F1 and the finger F2 such that the three-dimensional object OB1 is positioned between the finger F1 and the finger F2 as illustrated at Step S71, the user can move the finger F1 and the finger F2 to other positions without keeping the state of the finger F1 and the finger F2.

Assume that the user has moved the finger F1 and the finger F2 from the state of Step S71 while keeping a distance D1 between the finger F1 and the finger F2 substantially constant, as illustrated at Step S72. In this case, the display device 1 applies change, such as movement, deformation, or disappearance, to the three-dimensional object OB1, according to movement of the finger F1 and the finger F2, from at a stage where it is detected that the three-dimensional object OB1 is displayed between the finger F1 and the finger F2, that is, from at a stage of Step S71. Then, as illustrated at Step S73, the display device 1 causes the three-dimensional object OB1 to be in a selected state, at a stage where the state in which the distance D1 between the finger F1 and the finger F2 is kept substantially constant is continued for a predetermined time or more.

As illustrated in Step S74 of FIG. 32, when the distance D1 between the finger F1 and the finger F2 is enlarged before the predetermined time elapses, that is, when selection has not been performed, the display device 1 applies reverse change to the change applied by that time, to the three-dimensional object OB1. As a result, the three-dimensional object OB1 is displayed at the same position in the same state as the stage of Step S71. The speed to apply the reverse change to the three-dimensional object OB1 may be faster than the speed at which the change to the three-dimensional object OB1 had been applied by that time. That is, the display device 1 may reversely change the three-dimensional object OB1 as if the three-dimensional object OB1 was reversely reproduced at a high speed.

As described above, the display device 1 starts applying the change to the three-dimensional object from at the stage where it is detected that the three-dimensional object is displayed between the two bodies, whereby the user can recognize that the three-dimensional object is getting selected before the selection is determined. As a result, the user can recognize whether the intended three-dimensional object has been selected at an early stage. Until the state in which the distance between the two bodies is kept substantially constant is continued for the predetermined time or more, the display device 1 may display the three-dimensional object, to which the change is applied, in a different style (for example, translucently) from a normal time or from the selected state, thereby to allow the user to be able to easily discriminate a state of the three-dimensional object.

Figure 33:
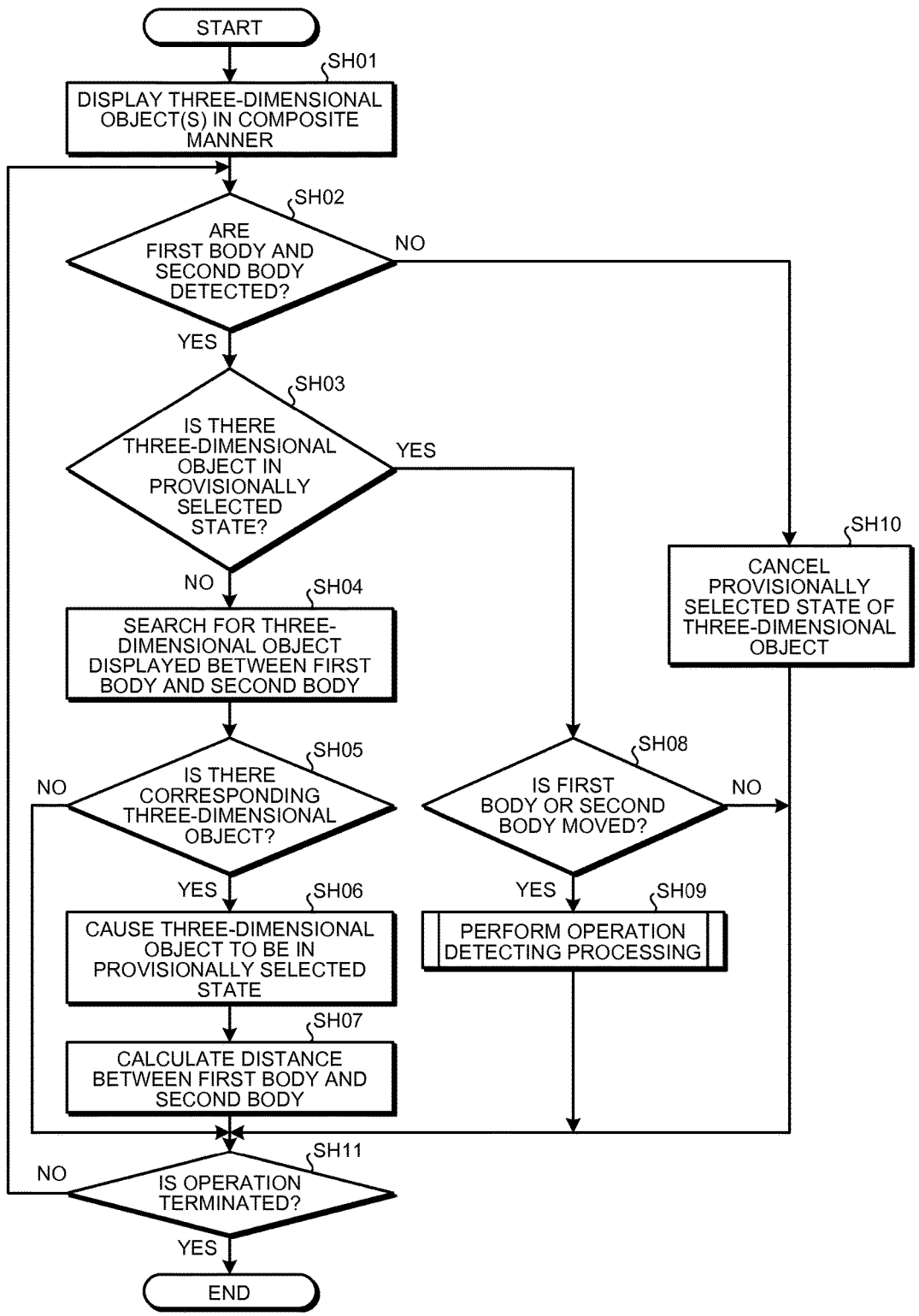
FIG. 33 is a flowchart illustrating a processing procedure of selection detecting processing in the third example.

Then, a processing procedure executed by the display device 1 in relation to the operation performed by holding the three-dimensional object will be described with reference to FIGS. 33 and 34. FIG. 33 is a flowchart illustrating a processing procedure of the selection detecting processing of the three-dimensional object. The processing procedure illustrated in FIG. 33 is realized by the control unit 22 executing the control program 24a.

As illustrated in FIG. 33, first of all, at Step SH01, the control unit 22 composites and displays an image of the virtual space including the three-dimensional object(s) and an image of the real space. Subsequently, at Step SH02, the control unit 22 determines whether the first body and the second body have been detected by the detection unit 44, that is, by the imaging units 40 and 42. When the first body and the second body have not been detected (No at Step SH02), then at Step SH10, if there is a three-dimensional object in a provisionally selected state, the control unit 22 cancels the provisionally selected state of the three-dimensional object.

Then, at Step SH11, the control unit 22 determines whether operation termination has been detected. When the operation termination has been detected (Yes at Step SH11), the control unit 22 terminates the selection detecting processing. When the operation termination has not been detected (No at Step SH11), the control unit 22 re-executes Step SH02 and the subsequent steps.

When the first body and the second body have been selected (Yes at Step SH02), then at Step SH03, the control unit 22 determines whether there is a three-dimensional object in the provisionally selected state. When there is no three-dimensional object in the provisionally selected state (No at Step SH03), then at Step SH04, the control unit 22 searches displayed three-dimensional object(s) for a three-dimensional object displayed between the first body and the second body. When there is no corresponding three-dimensional object (No at Step SH05), the control unit 22 proceeds to Step SH11.

When the three-dimensional object displayed between the first body and the second body is found (Yes at Step SH05), then at Step SH06, the control unit 22 causes the three-dimensional object displayed between the first body and the second body to be in the provisionally selected state. At Step SH07, the control unit 22 calculates the distance between the first body and the second body. Then, the control unit 22 proceeds to Step SH11.

When the first body and the second body have been detected, and there is the three-dimensional object in the provisionally selected state (Yes at Step SH03), then at Step SH08, the control unit 22 determines whether at least one of the first body and the second body has been moved. When both of the first body and the second body has not been moved (No at Step SH08), the control unit 22 proceeds to Step SH11.

Figure 34:
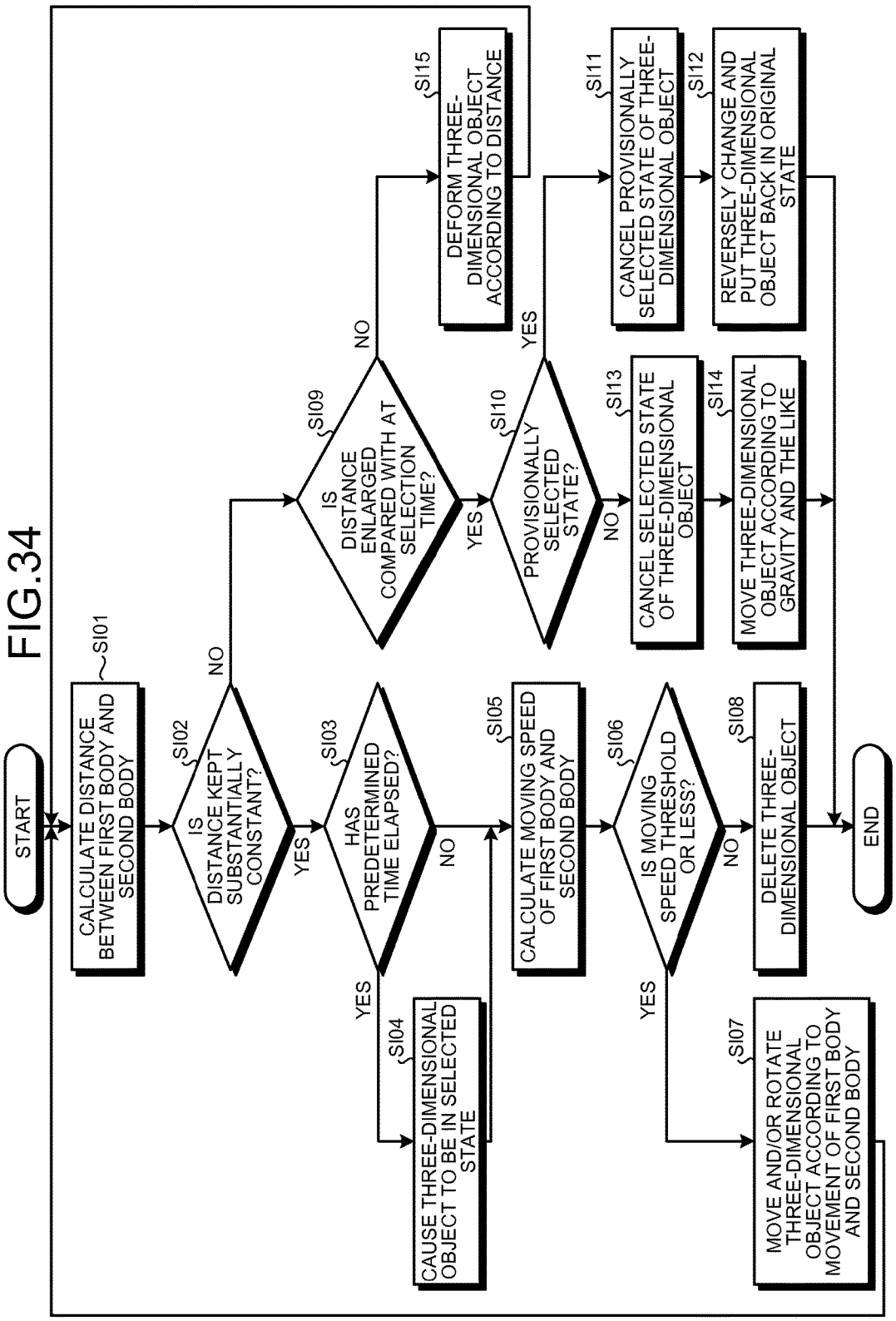
FIG. 34 is a flowchart illustrating a processing procedure of operation detecting processing in the third example.

When at least one of the first body and the second body has been moved (Yes at Step SH08), then at Step SH09, the control unit 22 executes the operation detecting processing illustrated in FIG. 34, and in the processing, changes the three-dimensional object in the selected state, according to the detected operation. After the operation detecting processing is completed, the control unit 22 proceeds to Step SH11.

FIG. 34 is a flowchart illustrating a processing procedure of the operation detecting processing. The processing procedure illustrated in FIG. 34 is realized by the control unit 22 executing the control program 24a. As illustrated in FIG. 34, first of all, at Step SI01, the control unit 22 calculates the distance between the first body and the second body. Then, at Step SI02, the control unit 22 determines whether the distance between the first body and the second body at and after the start time point of the operation detecting processing is kept substantially constant.

When the distance between the first body and the second body is kept substantially constant (Yes at Step S102), then at Step SI03, the control unit 22 determines whether a predetermined time has elapsed after the operation detecting processing is started. When the predetermined time has elapsed (Yes at Step SI03), then at Step SI04, if there is a three-dimensional object in the provisionally selected state, the control unit 22 causes the three-dimensional object to be in the selected state. When the predetermined time has not elapsed (No at Step S103), Step SI04 is not executed.

Subsequently, at Step SI05, the control unit 22 calculates the moving speed of the first body and the second body. Then, at Step SI06, the control unit 22 determines whether the calculated moving speed is a threshold or less. When the moving speed is the threshold or less (Yes at Step SI06), then at Step SI07, the control unit 22 moves and/or rotates the three-dimensional object, according to the detected movement of the first body and the second body. Then, the control unit 22 re-executes Step SI01 and the subsequent steps.

When the moving speed is faster than the threshold (No at Step SI06), then at Step SI08, the control unit 22 deletes the three-dimensional object. In deleting the three-dimensional object, the control unit 22 may display animation such that the three-dimensional object flies on to the moving direction of the first body and the second body. Then, the control unit 22 completes the operation detecting processing. Instead of the operation to move the first body and the second body at a high speed, the deletion of the three-dimensional object may be allocated to operation to squash the three-dimensional object. Instead of the deletion of the three-dimensional object, the three-dimensional object may be put back to an initial arrangement location. The display device 1 may not perform the processing of Steps SI05, SI06, and SI08. That is, the display device 1 may execute Step SI07 regardless of the moving speed of the two bodies after determining "No" at Step SI03 or executing Step SI04.

When the distance between the first body and the second body is not kept substantially constant (No at Step SI02), then at Step SI09, the control unit 22 determines whether the distance is enlarged, compared with at the time of selecting the three-dimensional object, that is, the start time point of the operation detecting processing. When the distance is enlarged (Yes at Step SI09), then at Step SI10, the control unit 22 determines whether the three-dimensional object displayed between the first body and the second body is in the provisionally selected state.

When the three-dimensional object is in the provisionally selected state (Yes at Step SI10), then at Step SI11, the control unit 22 cancels the provisionally selected state of the three-dimensional object. Further, at Step SI12, the control unit 22 reversely changes and puts the three-dimensional object back in the original state. Then, the control unit 22 terminates the operation detecting processing.

When the three-dimensional object is not in the provisionally selected state, that is, the three-dimensional object is in the selected state (No at Step SI10), then at Step SI13, the control unit 22 cancels the selected state of the three-dimensional object. Then, at Step SI14, the control unit 22 moves the three-dimensional object, the selection state of which has been canceled, according to the gravity, and the like. Then, the control unit 22 terminates the operation detecting processing. The movement here is displayed such that the three-dimensional object falls down according to the gravity, and is stopped on a floor or a table, for example. Before stopping the movement of the three-dimensional object, the control unit 22 may cause the three-dimensional object to bound according to elasticity of the three-dimensional object and hardness of the floor or the table. The control unit 22 may calculate magnitude of impact of when the three-dimensional object collides with the floor or the table, and when the impact is larger than a predetermined value, the control unit 22 may display the three-dimensional object as if it had been broken. The control unit 22 may move the three-dimensional object slower than the case where the actual gravity works.

When the distance between the first body and the second body is reduced, compared with at the time of selecting the three-dimensional object (No at Step SI09), then at Step SI15, the control unit 22 deforms the three-dimensional object according to the distance. Then, the control unit 22 re-executes Step SI01 and the subsequent steps. The degree of deforming the three-dimensional object may be changed according to the hardness set to the three-dimensional object, as an attribute.

As described above, in the third example, from the time point when the three-dimensional object positioned between the bodies such as the fingers is detected, the three-dimensional object is changed according to the operation. Therefore, the user can easily recognize the selection of the three-dimensional object.

FIG. 35 is a diagram for describing a modification of the third example of the detection of the operation performed by holding the three-dimensional object. As illustrated in Steps S81 to S83 in FIG. 35, keeping the distance between the first body and the second body substantially constant for a predetermined time or more after at least one of the first body and the second body comes in contact with the three-dimensional object may be employed as one of conditions to select the three-dimensional object. The contact to the three-dimensional object is employed as one of conditions of selection, whereby the user can easily select a desired three-dimensional object when a plurality of three-dimensional objects is closely displayed.

The display device 1 described in the above embodiment can be applied to various uses. The three-dimensional object (display item) that is an object to be operated may be an object that is modeled on a thing that actually exists, such as a book, a block, a spoon, chopsticks, trumps, clay, or a musical instrument, or may be an object that does not actually exist, such as a virtual avatar, a character in a game, or a virtual reality AR tag. Further, the change applied to the three-dimensional object according to the detected operation is not limited to the movement, deformation, disappearance, or the like. For example, change added to the three-dimensional object according to the detected operation includes rotation, replacement, or the like. The replacement refers to replacing one three-dimensional object with another three-dimensional object. Further, the change added to the three-dimensional object according to the pressing operation is not limited to the embodiment, and may be changed according to the type of the three-dimensional object.

For example, when the three-dimensional object that is modeled on clay (hereinafter, simply referred to as "clay") is used as the object to be operated, the clay may be deformed according to the pressing operation, and the user may be allowed to form the clay into an arbitrary shape. Further, the clay may be hardened or the viscosity of the clay may be decreased as if the clay would be dried with time. Further, the viscosity of the clay may be improved when operation to press the clay with a finger or a hand, which has been put in the three-dimensional object of water, has been detected.

When the three-dimensional object that is modeled on a record (hereinafter, simply referred to as "record") is used as the object to be operated, the record may be rotated around a fulcrum according to the pressing operation, and the sound may be reproduced. A technique by a disk jockey, such as scratch, may be virtually realized by having rotation and reproduction of the sound in conjunction with each other.

Embodiment 2

In Embodiment 1, examples in which the display device detects the operation to the three-dimensional object, applies adds change to the three-dimensional object, according to the detected operation has been described. However, a display device may perform an operation associated with a three-dimensional object according to displacement of a predetermined body detected by a detection unit, according to operation to the three-dimensional object. The following describes one of examples of a display device that performs an operation associated with a three-dimensional object according to displacement of a predetermined body detected by a detection unit.

Figure 36:
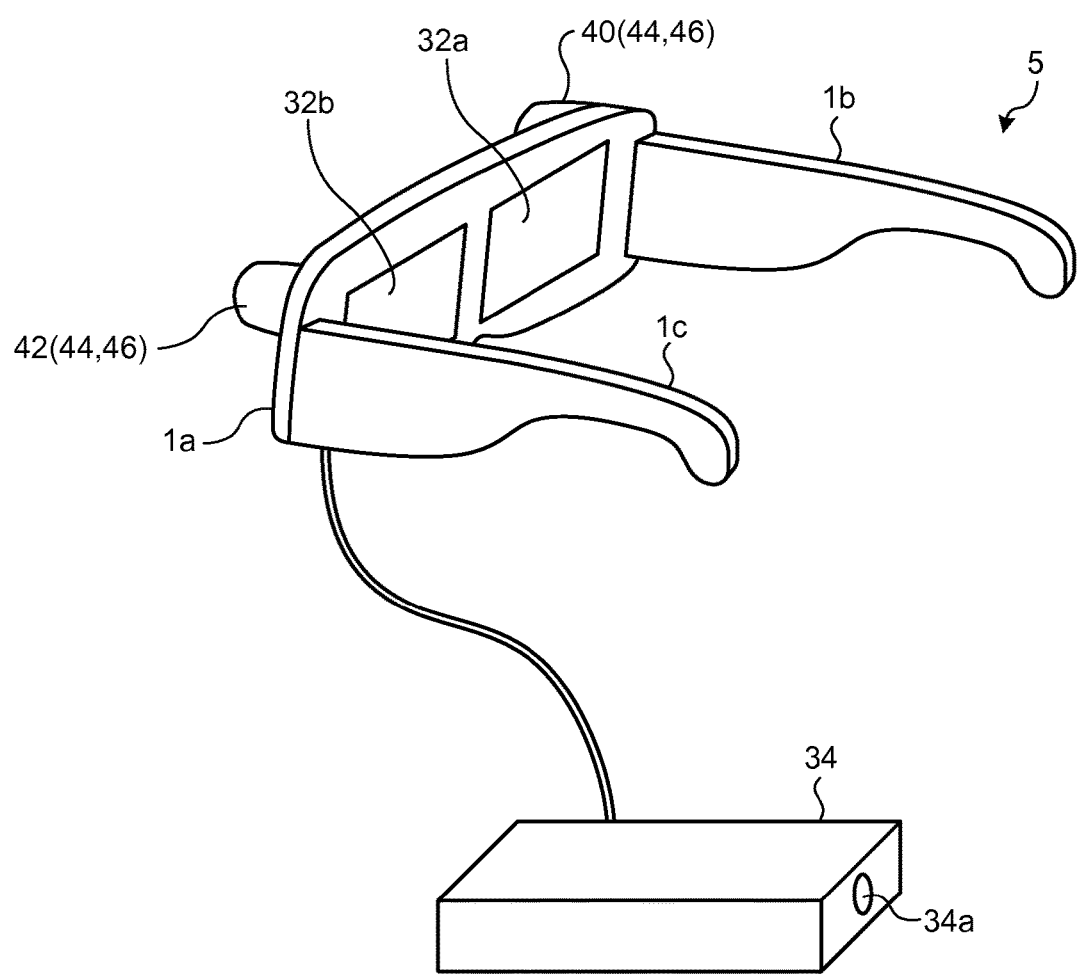
FIG. 36 is a perspective view of a display device according to a second embodiment.
Figure 37:
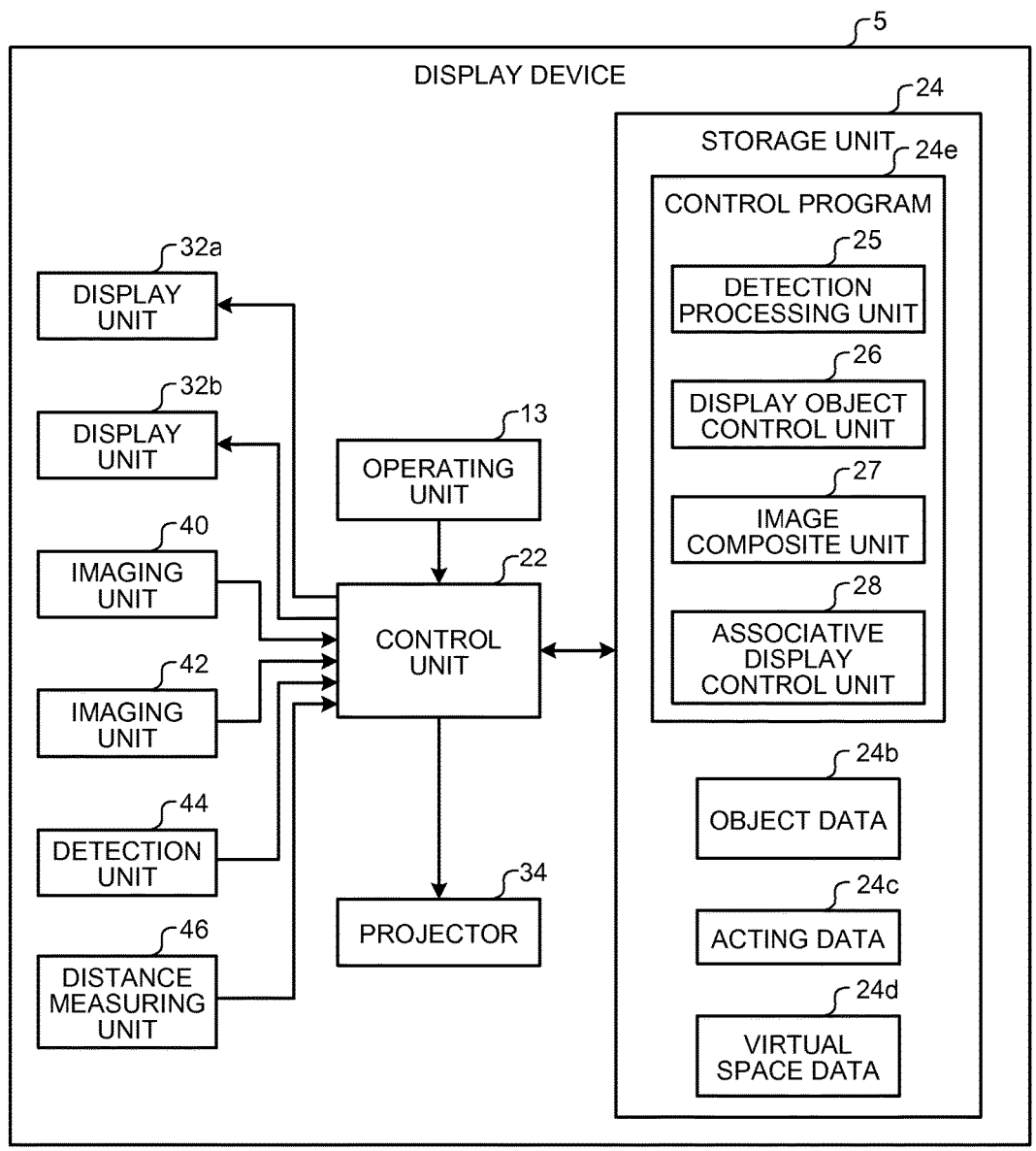
FIG. 37 is a block diagram of the display device according to the second embodiment.

First of all, a configuration of a display device 5 according to the second embodiment will be described with reference to FIGS. 36 and 37. FIG. 36 is a perspective view of the display device 5. FIG. 37 is a block diagram of the display device 5. In the description below, a portion similar to the portion that has already been described may be denoted with the same reference sign. In the description below, description overlapping with the description that has already been provided may not be repeated. As illustrated in FIGS. 36 and 37, the display device 5 has a configuration similar to the configuration of the display device 1, except that the display device 5 further includes a projector 34, and stores a control program 24e in a storage unit 24, instead of the control program 24a.

The projector 34 projects an image from a projection unit 34a according to a signal transmitted from a control unit 22. The projected image is displayed on a screen, a wall, or the like, and can be seen by a person other than a user who wears the display device 5. A system of projecting an image by the projector 34 is not especially limited. For example, the projector 34 may reflect laser light irradiated from a light source by using a micro electro mechanical system (MEMS) mirror to draw an image. The projector 34 may be configured from a combination of a light source such as a halogen light, an LED, or an LD, and an optical system such as an LCD, or a digital micro-mirror device (DMD). The display device 5 may include an external display, instead of the projector 34.

The control program 24e has a configuration similar to the control program 24a, except that the control program 24e further includes an associative display control unit 28. The associative display control unit 28 provides a function to cause the projector 34 to project information related to information displayed in display units 32a and 32b. The function provided by the associative display control unit 28 includes a function to change the information projected by the projector 34, in conjunction with change of a three-dimensional object in a display space according to operation to the three-dimensional object.

Figure 38:
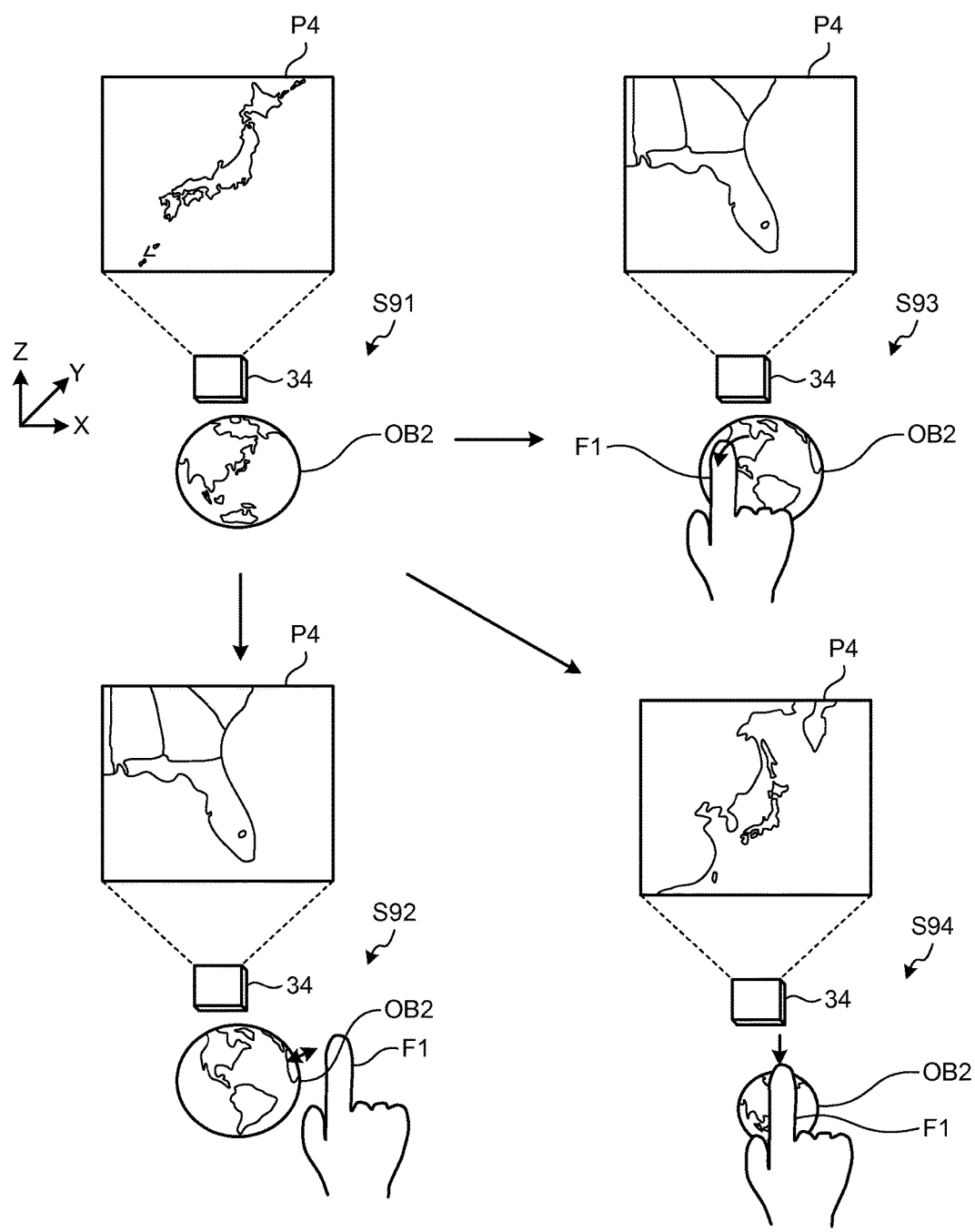
FIG. 38 is a diagram illustrating one of examples of display control in conjunction with change of the three-dimensional object.
Figure 39:
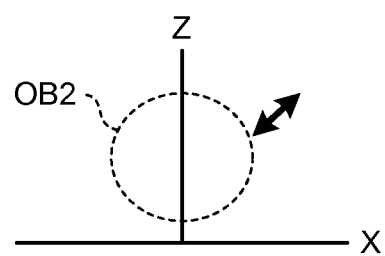
FIG. 39 is a diagram illustrating one of examples of a locus of operation to bring a finger in contact with the three-dimensional object for a moment.
Figure 40:
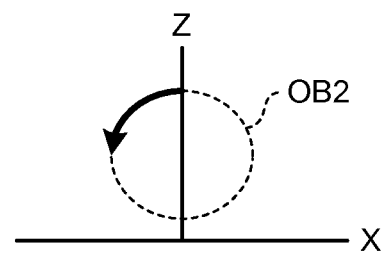
FIG. 40 is a diagram illustrating one of examples of a locus of operation to move the finger along the three-dimensional object.
Figure 41:
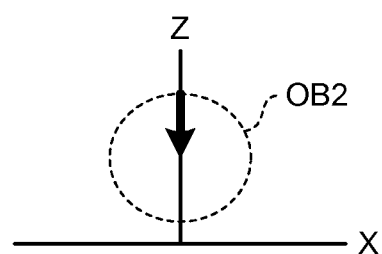
FIG. 41 is a diagram illustrating one of examples of a locus to squash the three-dimensional object with the finger.

Then, one of examples of display control in conjunction with change of a three-dimensional object will be described with reference to FIGS. 38 to 41. FIG. 38 is a diagram illustrating one of examples of display control in conjunction with change of a three-dimensional object. FIG. 39 is a diagram illustrating one of examples of a locus of operation to bring a finger F1 in contact with the three-dimensional object for a moment. FIG. 40 is a diagram illustrating one of examples of a locus of operation to move the finger F1 along the three-dimensional object. FIG. 41 is a diagram illustrating one of examples of a locus of operation to squash the three dimensional object with the finger F1.

At Step S91 illustrated in FIG. 38, the control unit 22 displays a spherical globe in the display space, as a three-dimensional object OB2. Further, the control unit 22 causes the projector 34 to project a map in which Japan is enlarged, as a projection image P4. Japan is positioned in the center of the three-dimensional object OB2 as viewed from the user who wears the display device 5. In this way, the control unit 22 causes the projector 34 to project an image related to the three-dimensional object OB2 displayed in the display space. When the projection image P4 is projected within an imaging range of imaging units 40 and 42, the user can confirm a state of the projection image P4 with images captured by the imaging units 40 and 42.

In this example, a map of Japan is projected as an image related to Japan positioned in the center of the three-dimensional object OB2. However, another image such as a flag of Japan, a national flower, or the like, which is related to Japan, may be projected. The image may be stored in the storage unit 24, in advance, or may be acquired from another device by means of wired or wireless communication.

Assume that, in the state of Step S91, operation to move the finger F1 obliquely downward, to bring the finger F1 in contact with the three-dimensional object OB2 for a moment, and to immediately release the finger F1 is detected, as illustrated in FIG. 39. This operation is similar to tapping operation to bring the finger F1 in contact with a touch panel for a moment, and to immediately release the finger F1. However, while the tapping operation can select only a point on a plane, this operation is superior to the tapping operation in that this operation can select an arbitrary place of the three-dimensional object OB2.

When the operation illustrated in FIG. 39 is detected, the control unit 22 determines that the position with which the finger F1 is brought in contact is selected, and executes processing corresponding to the selected position. The processing corresponding to the selected position is, for example, processing to project detailed information corresponding to the selected position, from the projector 34. Assume that, in the present embodiment, as the processing corresponding to the selected position, processing to rotate the three-dimensional object OB2 such that the selected position comes to the center is executed.

At Step S92 illustrated in FIG. 38, as a result of detection of the operation illustrated in FIG. 39, the control unit 22 rotates the three-dimensional object OB2 such that a vicinity of Florida Peninsula, which is touched, comes to the center. The control unit 22 causes the projector 34 to project a map of the vicinity of Florida Peninsula, which is moved to the center of the three-dimensional object OB2, as the projection image P4, in conjunction with the rotation of the three-dimensional object OB2. The direction to move the finger F1 in order to bring the finger F1 in contact with the three-dimensional object OB2 for a moment is not limited to the oblique downward direction, and any direction may be employed.

Assume that, in the state of Step S91, operation to move the finger F1 along the three-dimensional object OB2 as illustrated in FIG. 40 is detected. When the operation as illustrated in FIG. 40 is detected, the control unit 22 rotates the three-dimensional object OB2, according to a moving direction and an amount of movement of the finger F1. As the processing in response to the movement of the finger F1 along the three-dimensional object OB2, the rotation of the three-dimensional object OB2 is intuitive and easy to remember for the user.

At Step S93 illustrated in FIG. 38, as a result of detection of the operation illustrated in FIG. 40, the control unit 22 rotates the three-dimensional object OB2 in a left direction by an angle according to the amount of movement of the finger F1. The control unit 22 causes the projector 34 to project the map of the vicinity of Florida Peninsula, which is moved to the center of the three-dimensional object OB2, as the projection image P4, in conjunction with the rotation of the three-dimensional object OB2.

Assume that, in the state of Step S91, operation to squash the three-dimensional object OB2 from above using the finger F1 as illustrated in FIG. 41 is detected. When the operation as illustrated in FIG. 41 is detected, the control unit 22 reduces the three-dimensional object OB2 in size according to an amount of pushing the finger F1 into the three-dimensional object OB2 by the user. As the processing in response to the operation to squash the three-dimensional object OB2, the reduction of the three-dimensional object OB2 in size is intuitive and easy to remember for the user.

At Step S94 illustrated in FIG. 38, as a result of detection of the operation illustrated in FIG. 41, the control unit 22 reduces the three-dimensional object OB2 in size. Further, the control unit 22 zooms out the map projected from the projector 34 as the projection image P4, in conjunction with the reduction of the three-dimensional object OB2.

Figure 42:
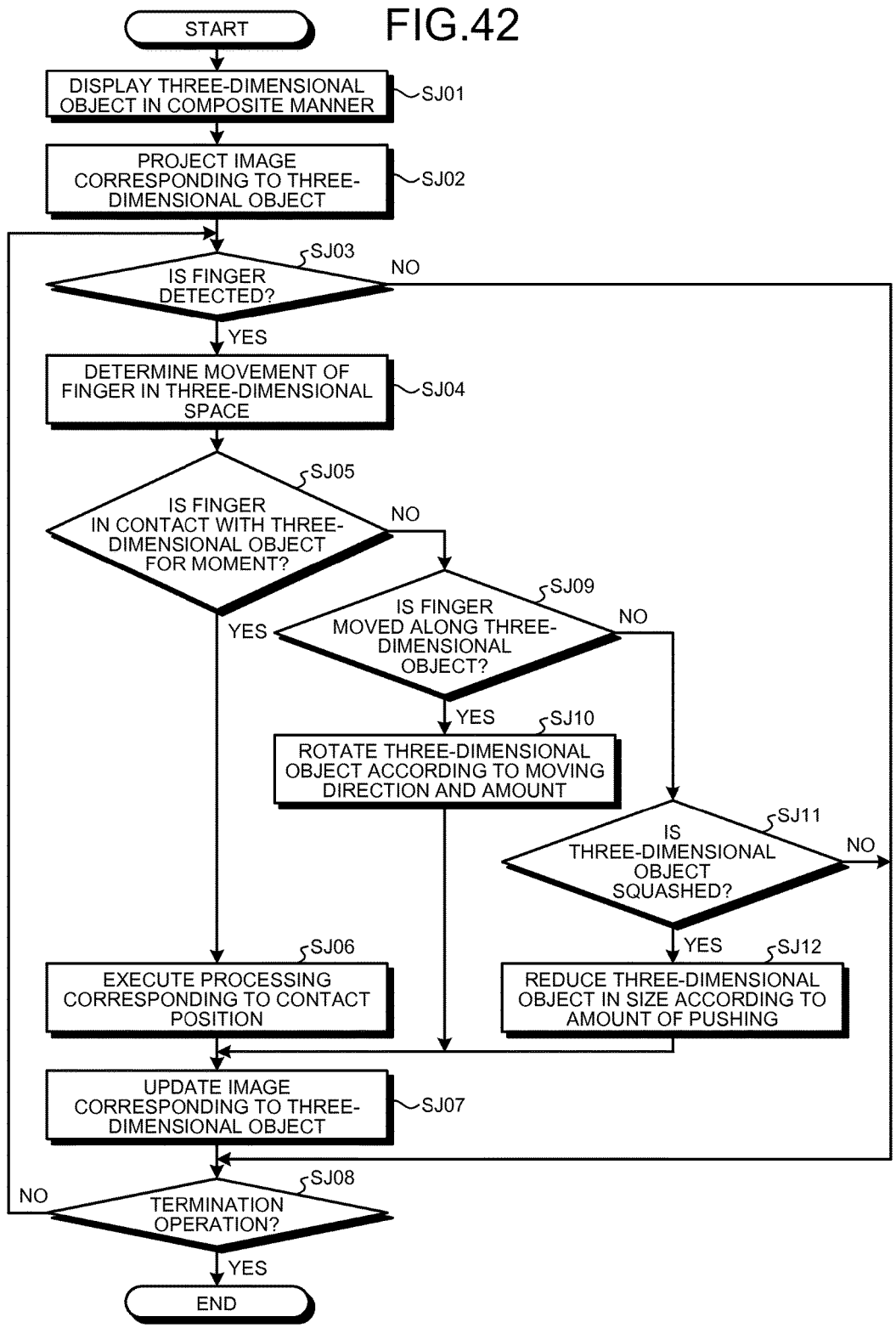
FIG. 42 is a flowchart illustrating a processing procedure of display control executed in conjunction with change of the three-dimensional object.

Then, a processing procedure of display control executed in conjunction with change of the three-dimensional object will be described with reference to FIG. 42. FIG. 42 is a flowchart illustrating a processing procedure of display control executed in conjunction with change of the three-dimensional object. The processing procedure illustrated in FIG. 42 is realized by the control unit 22 executing the control program 24e.

As illustrated in FIG. 42, first of all, at Step SJ01, the control unit 22 composites an image of the virtual space including the three-dimensional object and an image of the real space to display the composite images in display units 32a and 32b. Further, at Step SJ02, the control unit 22 projects an image corresponding to the three-dimensional object from the projector 34.

Subsequently, at Step SJ03, the control unit 22 determines whether a finger has been detected by a detection unit 44. When the finger has not been detected by the detection unit 44 (No at Step SJ03), then at Step SJ08, the control unit 22 determines whether termination operation by the user has been detected. When the termination operation has not been detected (No at Step SJ08), the control unit 22 re-executes Step SJ03 and the subsequent steps. Meanwhile, when the termination operation has been detected (Yes at Step SJ08), the control unit 22 terminates the processing procedure.

When the finger has been detected at Step SJ03 (Yes at Step SJ03), then at Step SJ04, the control unit 22 determines movement of the finger in the three-dimensional space, based on the detection result of the detection unit 44. Then, when the operation that the finger comes in contact with the three-dimensional object for a moment has been detected (Yes at Step SJ05), then at Step SJ06, the control unit 22 executes processing corresponding to the contact position. Then, at Step SJ07, the control unit 22 updates the projected image in association with the three-dimensional object, and proceeds to Step SJ08.

When displacement corresponding to the operation of the finger moving along the three-dimensional object has been detected (No at Step SJ05, and Yes at Step SJ09), then at Step SJ10, the control unit 22 rotates the three-dimensional object according to the moving direction and the amount of movement of the finger. Then, at Step SJ07, the control unit 22 updates the projected image in association with the three-dimensional object, and proceeds to Step SJ08.

When displacement corresponding to the operation to squash the three-dimensional object with the finger has been detected (No at Step SJ09, and Yes at Step SJ11), then at Step SJ12, the control unit 22 reduces the three-dimensional object in size according to the amount of pushing the finger into the three-dimensional object. Then, at Step SJ07, the control unit 22 updates the projected image in association with the three-dimensional object, and proceeds to Step SJ08.

When any of the operation is not detected (No at Step SJ11), the control unit 22 maintains the projected image as it is, and proceeds to Step SJ08.

As described above, in the present embodiment, the operation of the user is detected, based on the movement of the finger in the three-dimensional space. Therefore, various operation methods can be provided to the user. Further, the information to be displayed or projected to an outside is updated, in conjunction with the change of the three-dimensional object according to the detected operation. Therefore, also regarding operation for updating information to be provided to a third person, various operation methods can be provided to the user.

In the above-described embodiment, the three types of operation are detected, based on the movement of the finger in the three-dimensional space. However, operation detected based on the movement of a finger or a hand in the three-dimensional space is not limited thereto. For example, the control program 24e may be configured to allow the user to operate three-dimensionally displayed blocks or clay with fingers to produce a statue or building, in conjunction with a creation program. The control program 24e may be configured to allow the user to operate a three-dimensionally displayed wheel with hands to enjoy a race, in conjunction with a race game program.

The control program 24e may be configured to allow the user to operate a three-dimensionally displayed piano or keyboard with fingers to enjoy playing the instrument, in conjunction with an instrument play program. The control program 24e may be configured to, when a three-dimensionally displayed portion having an arbitrary shape is cut by a hand, cause an image of a cut surface to be projected from the projector 34, in conjunction with a data display program.

Embodiment 3

Figure 43:
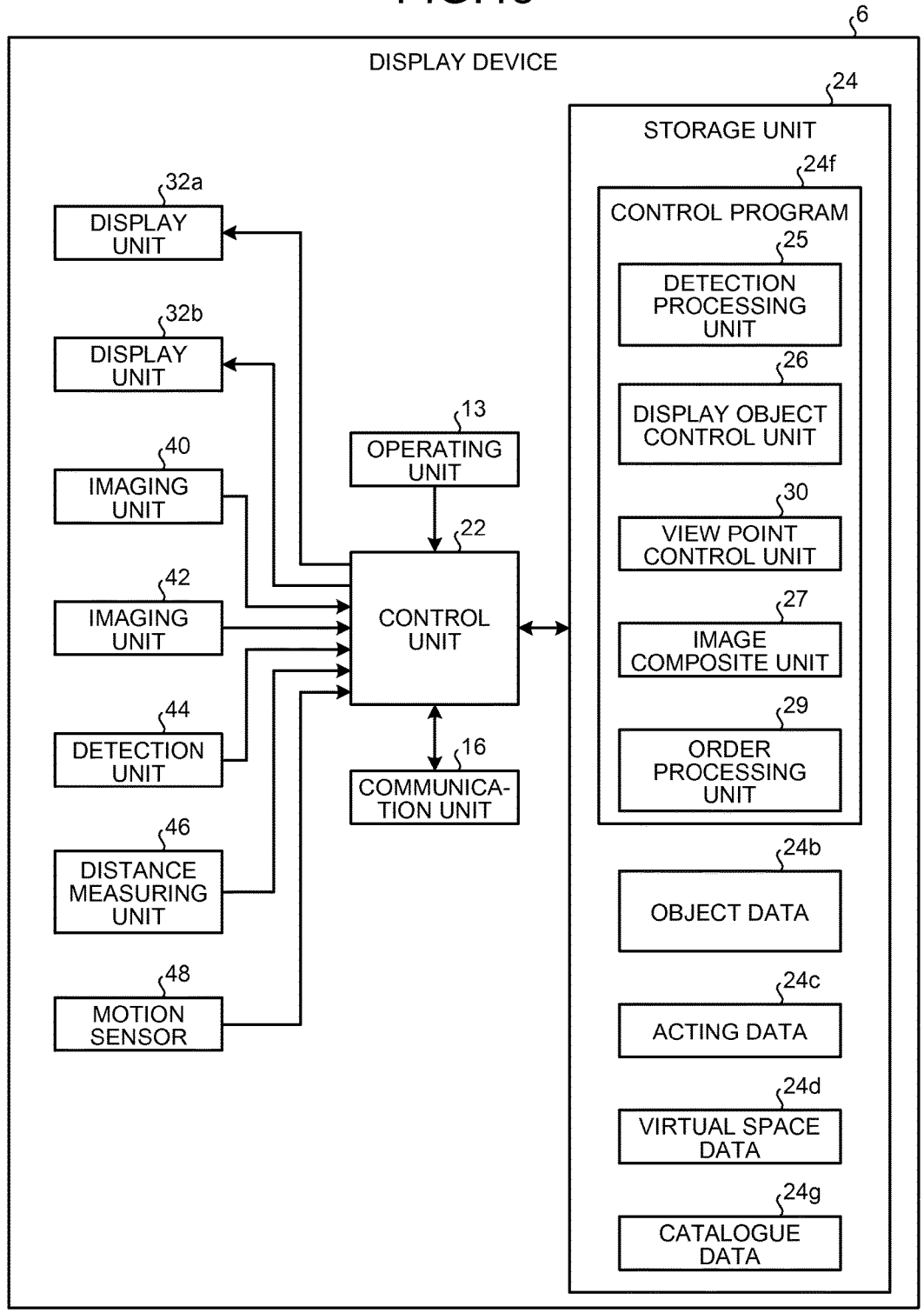
FIG. 43 is a block diagram of a display device according to a third embodiment.

A configuration of a display device 6 according to a third embodiment will be described with reference to FIG. 43. FIG. 43 is a block diagram of the display device 6. As illustrated in FIG. 43, the display device 6 has a similar configuration to the display device 1 except that the display device 6 further includes a communication unit 16 and a motion sensor 48, and a control program 24f is stored in a storage unit 24, in place of a control program 24a. The storage unit 24 further stores catalogue data 24g. The display device 6 may have a configuration of any one of the above-described display devices 2 to 4.

The communication unit 16 performs communication with other devices. The communication unit 16 may support a communication system that performs wireless communication within a relatively small range such as a wireless LAN or Bluetooth (registered trademark), or may support a communication system that performs wireless communication within a relatively large range such as a 3G communication system or a 4G communication system for communication carriers. The communication unit 16 may support a wired communication system such as Ethernet (registered trademark). The communication unit 16 may support a plurality of communication systems.

The motion sensor 48 detects change of a position and change of a direction (attitude) of the display device 6. The change of the position and the change of the direction are three-dimensionally detected. That is, the motion sensor 48 detects the change of the position and the change of the direction not only in a horizontal direction but also in a vertical direction. The motion sensor 48 includes a triaxial acceleration sensor in order to detect the change of the position and the change of the direction of the display device 6, for example. The motion sensor 48 may include a global positioning system (GPS) receiver or a pressure sensor in order to detect the change of the position of the display device 6. The motion sensor 48 may use a measurement result of a distance by the distance measuring unit 46 in order to detect the change of the position of the display device 6. The motion sensor 48 may combine a plurality of systems to detect the change of the position of the display device 6. The motion sensor 48 may include a gyro sensor or an azimuth sensor in order to detect the change of the direction of the display device 6. The motion sensor 48 may combine a plurality of systems to detect the change of the direction of the display device 6.

The storage unit 24 is made of a non-volatile storage device such as a flash memory, and stores various types of programs and data. The programs stored in the storage unit 24 include the control program 24f. The data stored in the storage unit 24 includes object data 24b, acting data 24c, virtual space data 24d, and the catalogue data 24g. The storage unit 24 may be configured from a combination of a portable storage medium such as a memory card, and a writing/reading device that performs writing/reading to/from the storage medium. In this case, the control program 24f, the object data 24b, the acting data 24c, the virtual space data 24d, and the catalogue data 24g may be stored in the storage medium. The control program 24f, the object data 24b, the acting data 24c, the virtual space data 24d, and the catalogue data 24g may be acquired from another device such as a server by means of communication by the communication unit 16.

The control program 24f provides functions related to various types of control for operating the display device 6. The functions provided by the control program 24f include a function to superimpose a three-dimensional object on images acquired by imaging units 40 and 42 and to display the superimposed imaged in display units 32a and 32b, a function to detect operation to the three-dimensional object, and a function to change the three-dimensional object according to the detected operation.

The control program 24f includes a detection processing unit 25, a display object control unit 26, a view point control unit 30, an image composite unit 27, and an order processing unit 29. The detection processing unit 25 provides a function to detect a real body existing in an imaging range of the imaging units 40 and 42. The function provided by the detection processing unit 25 includes a function to measure a distance to each of detected bodies.

The view point control unit 30 provides a function to manage a position and a direction of a view point of a user in a virtual space. The function provided by the view point control unit 30 includes a function to change the position and the direction of the view point of the user in the virtual space according to the change of the position and the change of the direction of the display device 6, which are detected by the motion sensor 48. For example, when forward movement of the display device 6 is detected by the motion sensor 48, the view point control unit 30 moves the view point of the user in the virtual space forward. For example, rightward rotation of the display device 6 is detected by the motion sensor 48, the view point control unit 30 rotates the view point of the user in the virtual space rightward. In this way, the position and the direction of the view point of the user in the virtual space is changed in accordance with the change of the position and the change of the direction of the display device 6, whereby change of the image in the virtual space that is superimposed on the image in the real space can be matched with change of the image in the real space.

The order processing unit 29 provides a function to order a product using a three-dimensional object. Details of the function of the order processing unit 29 will be described below.

The object data 24*b* includes information related to a shape and properties of the three-dimensional object. The object data 24*b* is used to display the three-dimensional object. The acting data 24*c* includes information related to how operation to the displayed three-dimensional object acts on the three-dimensional object. The acting data 24*c* is used to determine how to change the three-dimensional object, when the operation to the displayed three-dimensional object is detected. The change referred to here includes movement, rotation, deformation, disappearance, replacement, and the like. The virtual space data 24*d* holds information related to a state of the three-dimensional object arranged in the virtual space. The state of the three-dimensional object includes, for example, a position, an attitude, a status of deformation, and the like. The catalogue data 24*g* includes information for selling the product such as a specification and a price of the product.

Then, another example of the control based on the functions provided by the control program 24*f* will be described with reference to FIGS. 44 to 47. FIG. 44 is a diagram illustrating one of examples of changing the three-dimensional object in conjunction with the change of a position. At Step S3 illustrated in FIG. 44, an image P1*c* is an image obtained by the imaging unit 40, that is, an image corresponding to a scene of the real space viewed by the right eye. In the image P1*c*, a jogging course in front of the user appears. The display device 6 also acquires an image corresponding to an image of the same scene imaged by the imaging unit 42, that is, a scene of the real space viewed by the left eye.

An image P2*c* is an image for the right eye generated based on the virtual space data 24*d* and the object data 24*b*. In this example, the virtual space data 24*d* holds information related to a status of three-dimensional objects of signs, which are arranged at positions corresponding to a side of the jogging course. The object data 24*b* holds information related to shapes and properties of the three-dimensional objects of the signs. Each of the three-dimensional objects has thereon a described figure that indicates a distance from a start point, and is arranged at a position corresponding to a position away from the start point along the jogging course, by the distance indicated by the figure. Similarly, the display device 6 also generates an image of the virtual space viewed by the view point of the left eye.

At Step S3 illustrated in FIG. 44, the display device 6 composites the image P1*c* and the image P2*c* to generate an image P3*c*. The image P3*c* is an image displayed in the display unit 32*a*, as the image for the right eye. In the image P3*c*, the three-dimensional objects of the sighs are added to the scene of the jogging course as if the signs actually existed.

When the user moves forward in the jogging course, the display device 6 detects the change of a position, and moves the position of the view point in the virtual space forward in accordance with the detected change of the position. For example, when the position of the display device 1 is moved forward by 1 m, the display device 6 moves the view point of the user in the virtual space by the distance corresponding to 1 m. By repetition of such change, the three-dimensional object in front of the user is getting closer to the user as the user moves on, as well as trees beside the course, and disappears from view as the user passes by. At Step S4 illustrated in FIG. 44, the display device 6 composites an image P1*d* and an image P2*d* to generate an image P3*d*. At Step S4 illustrated in FIG. 44, the three-dimensional object of a sign of "600 m" seen in the distance at the stage of Step S3 is displayed immediately in front of the user.

As described above, by changing the position of the display device 6, the user can change the three-dimensional object displayed in the display device 6 without performing operation with a hand. That is, the display device 6 accepts the change of the position of the display device 6 by the user, as operation to change the three-dimensional object. Such an operation to change the three-dimensional object with the change of a position is operation in line with a phenomenon experienced by the user in an actual space, and thus is intuitive and easy to understand for the user. Further, the operation with the change of a position can be combined with operation using a hand or the like, and thus can realize various types of change of the three-dimensional object, and is highly convenient.

In the example illustrated in FIG. 44, the signs that do not actually exist are displayed by the side of the jogging course. Therefore, the display device 6 can display useful information for the user in association with positions on the jogging course. Further, the information displayed by the display device 6 can be differentiated for each user, and thus can describe information convenient for each user on the signs, which is different from an actual sign.

The three-dimensional object changed in conjunction with the change of a position is not limited to the signs. For example, a three-dimensional virtual shopping street may be built such that shops that the user can see are switched in conjunction with the user walking in a room or the like. The display device 6 may change the three-dimensional object in conjunction with the number of stepping on site.

The display device 6 may cause the degree of change of the three-dimensional object to be larger or smaller than the detected change of a position. For example, the display device 6 may provide change that is 10 times larger than the magnitude of the change of a position in the real space, to the three-dimensional object in the virtual space. For example, in the example illustrated in FIG. 44, the display device 6 may cause an interval at which the three-dimensional objects of the signs are arranged to be larger or smaller than an interval indicated by the description in the signs. By such adjustment of the interval of the signs, the distance to run can be adjusted according to user's physical condition. The display device 6 may associate movement of 10 m in the real space with movement of 100 m in the virtual space, or may associate the movement of 10 m in the real space with movement of 1 m in the virtual space. When a plurality of attraction facilities is displayed with three-dimensional objects in a place like a room only with white walls, the degree of change of the three-dimensional objects may be caused to be larger than the detected change of positions, whereby the user can easily move between distant facilities. For example, when it is desired to precisely control the three-dimensional objects, the degree of change of the three-dimensional objects may be caused to be smaller than the detected change of a position.

The display device 6 may change the three-dimensional object in conjunction with the change of a position in an up and down direction. For example, when the user jumps, the display device 6 may change the scene to be displayed, to a scene which is viewed from a height corresponding to the height of the jump. The scene is the three-dimensional object such as a building around which the user currently exists. In this case, when the user jumps to the fullest extent, the display device 6 may display a scene of looking down the three-dimensional object such as a building around which the user currently exists.

Figure 45:
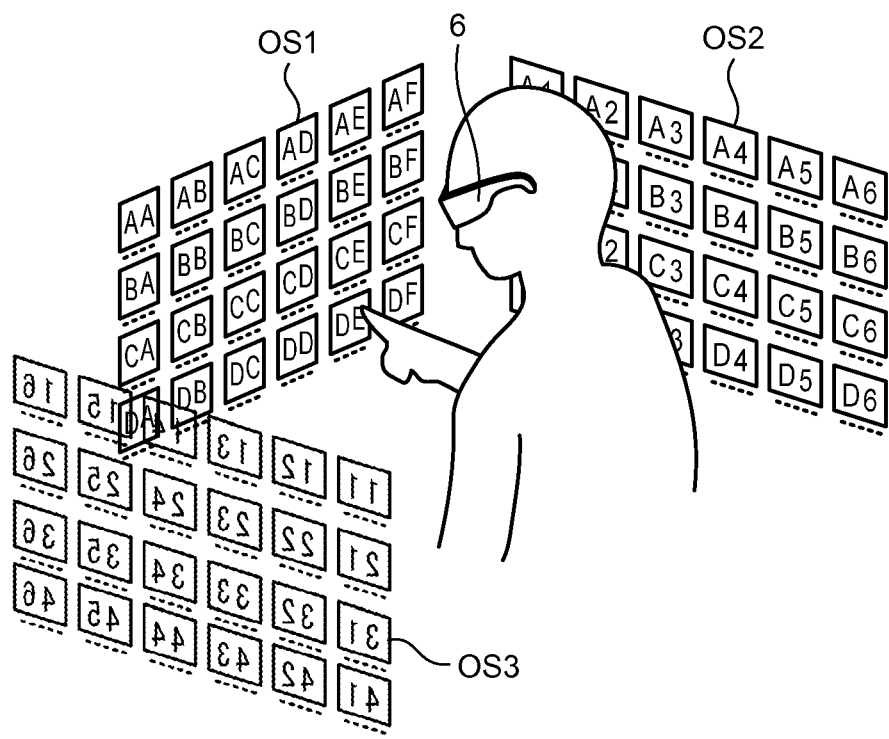
FIG. 45 is a diagram conceptually illustrating operation screens arranged around a user.
Figure 46:
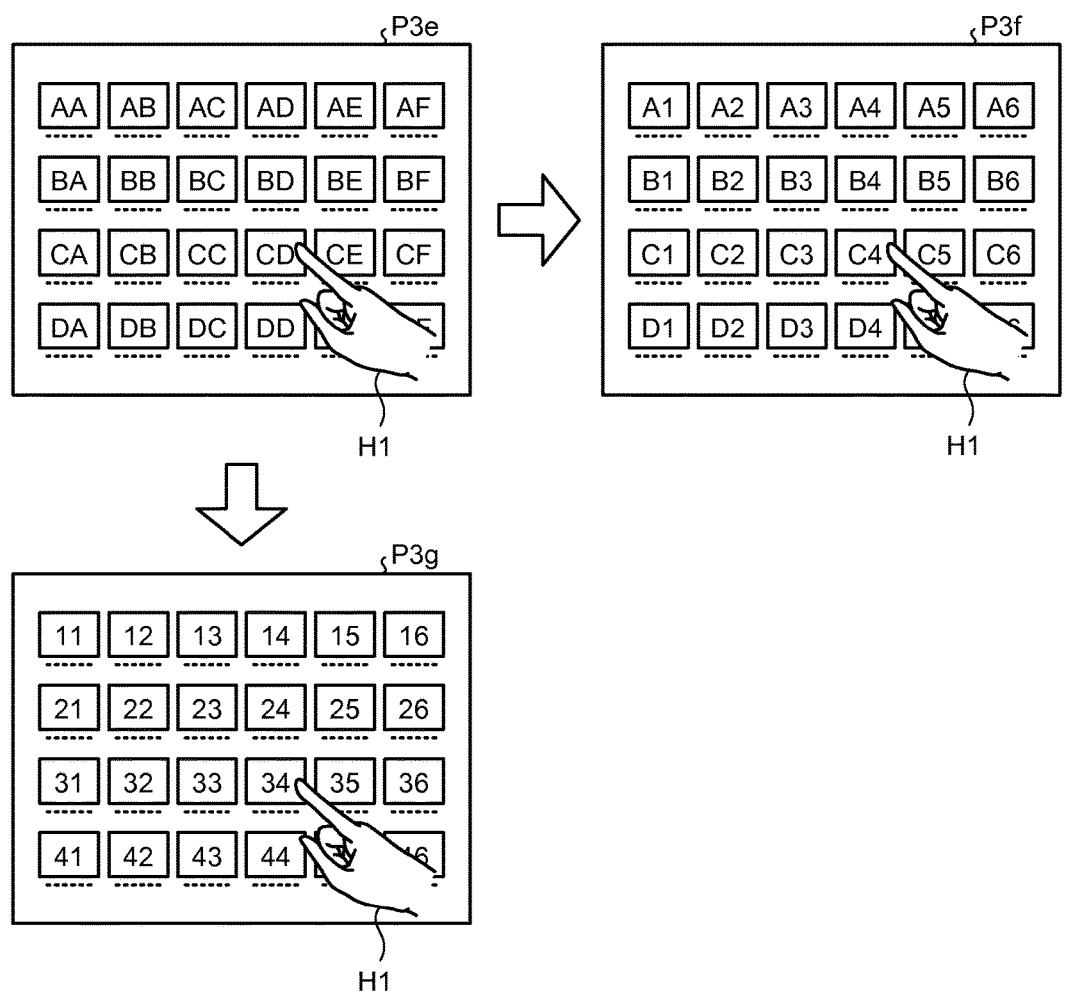
FIG. 46 is a diagram illustrating one of examples of changing the three-dimensional object in conjunction with change of a direction.

The display device 6 may integrate the amount of the change of a position, that is, the amount of movement, and change the three-dimensional object according to an integrated value. For example, the display device 6 may convert the integrated value of the amount of movement into an arrival point of when walking from Tokyo to Kyoto, and display distinctive buildings and scenery at the arrival point, on the scene in the real space, as the three-dimensional objects in a superimposed manner. For example, when the arrival point corresponds to Yokohama, the display device 6 may display a three-dimensional object of a gate of China town on a part of a real scene in a superimposed manner. For example, when the arrival point corresponds to Shizuoka, the display device 6 may display a three-dimensional object of Mt. Fuji that is seen from the arrival point on the background of the real scene in a superimposed manner FIG. 45 is a diagram conceptually illustrating operation screens arranged around the user. FIG. 46 is a diagram illustrating one of examples of changing the three-dimensional object in conjunction with the change of a direction. In the example illustrated in FIGS. 45 and 46, the virtual space data 24*d* holds information related to states of three-dimensional objects of operation screens OS1 to OS3, and the object data 24*b* holds information related to shapes and properties of the three-dimensional objects of the operation screens OS1 to OS3.

The operation screen OS1 is arranged at a position corresponding to the front of the user in the virtual space. The operation screen OS2 is arranged at a position corresponding to the right side of the user in the virtual space. The operation screen OS3 is arranged at a position corresponding to the left side of the user in the virtual space. A plurality of icons is arrayed on the operation screens OS1 to OS3.

When the user who wears the display device 6 faces the front, the display device 6 displays the operation screen OS1, as illustrated in an image P3*e*. In this state, when the user performs operation to press an icon on the operation screen OS1 with a finger of the hand H1, the display device 6 executes processing associated with the icon.

When the user turns to the right, the display device 6 changes the direction of the view point in the virtual space to the right according to the detected change of the direction. For example, when the head of the user who wears the display device 6 turns to the right by 90 degrees, the display device 6 changes the direction of the view point of the user in the virtual space to the right by 90 degrees. As a result, the display device 6 displays the operation screen OS2 arranged on the right side of the user in the virtual space, as illustrated in an image P3*f*. In this state, when the user performs operation to press an icon on the operation screen OS2 with a finger of the hand H1, the display device 6 executes processing associated with the icon.

When the user turns to the left, the display device 6 changes the direction of the view point in the virtual space to the left according to the detected change of the direction. For example, when the head of the user who wears the display device 6 turns to the left by 90 degrees, the display device 6 changes the direction of the view point of the user in the virtual space to the left by 90 degrees. As a result, the display device 6 displays the operation screen OS3 arranged on the left side of the user in the virtual space, as illustrated in an image P3*g*. In this state, when the user performs operation to press an icon on the operation screen OS3 with a finger of the hand H1, the display device 6 executes processing associated with the icon.

As described above, the user can change the three-dimensional object displayed in the display device 6 by changing the direction of the display device 6 without performing the operation with the hand. That is, the display device 6 accepts the change of the direction of the display device 6 by the user, as the operation to change the three-dimensional object. Such operation to change the three-dimensional object with the change of the direction is operation in line with a phenomenon experienced in an actual space, and thus is intuitive and easy to understand for the user. Further, the operation with the change of a direction can be combined with operation using the hand, and thus can realize various types of change of the three-dimensional object and is highly convenient.

In the example illustrated in FIGS. 45 and 46, the plurality of operation screens is displayed around the user. Therefore, the user can easily switch the operation screen to be operated, by simply changing the direction into which the face is turned.

In FIGS. 45 and 46, one of examples of displaying the operation screens on three faces around the user has been illustrated. However, the display device 6 may display the operation screens on four faces around the user including the rear side of the user. Alternatively, a continuous face such as an inner surface of a cylinder surrounding the user may be employed as the operation screen. Alternatively, the operation screen may be provided on a face over the head of the user, that is, a face that can be seen when the direction of the view point is turned upward.

When the operation screens are provided on a plurality of flat faces surrounding the user, the display device 6 may adjust the direction of the view point or the three-dimensional object in the virtual space such that a face that exists in the direction into which the user faces, and an angle of which with respect to a line of sight of the user is closest to 90 degrees, of the faces on which the operation screens are provided, becomes perpendicular to the line of sight of the user. By such adjustment of the direction of the view point or the three-dimensional object, visibility of the operation screens can be improved.

The three-dimensional object changed in conjunction with the change of a direction is not limited to the operation screen. For example, it may be configured such that three-dimensional objects of products are displayed on shelves around the user, and the products that the user can see and pick up are changed, in conjunction with the change of the direction of the head of the user who wears the display device 6. Three-dimensional maps including three-dimensional objects of buildings may be arranged around the user, and the displayed map may be changed to a map in a direction into which the user faces, in conjunction with the change of the direction of the head of the user who wears the display device 6. The display device 6 may display weather forecast, an event, principal facilities of a region into which the line of sight of the user faces, as the three-dimensional objects, in conjunction with the change of the direction of the head of the user who wears the display device 6.

The display device 6 may associate a direction into which the user turns his/her head with some sort of processing. For example, when the user turns his/her head in the right direction, the display device 6 carries a page of a three-dimensional object of a displayed book over to a next page, and when the user turns his/her head in the left direction, the display device 6 puts the page of the three-dimensional object of the book back. In this case, processing is not performed in conjunction with the change of the direction for putting the turned head back.

Figure 47:
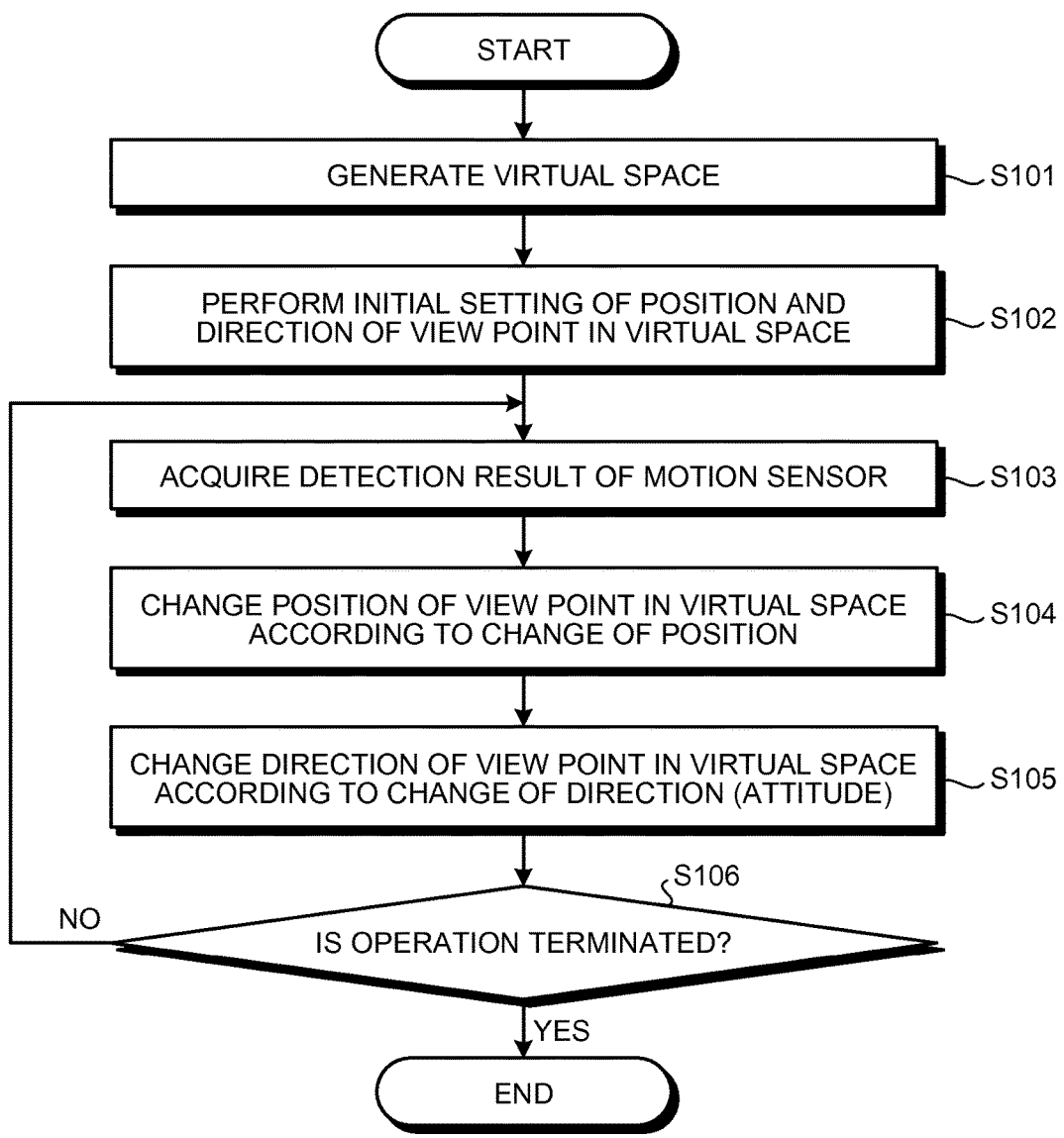
FIG. 47 is a flowchart illustrating a processing procedure of control of changing the three-dimensional object in conjunction with change of a position and the direction.

FIG. 47 is a flowchart illustrating a processing procedure of control of changing the three-dimensional object in conjunction with the change of a position and a direction. The processing procedure illustrated in FIG. 47 is realized by the control unit 22 executing the control program 24f. First of all, at Step S101, the control unit 22 generates a virtual space based on the virtual space data 24d and the object data 24b. Then, at Step S102, the control unit 22 performs initial setting of a position and a direction of a view point in the virtual space. The initial setting of the position and the direction of the view point in the virtual space is performed based on a rule of association between the real space and the virtual space, which is defined in advance, for example.

Subsequently, at Step S103, the control unit 22 acquires a detection result of the motion sensor 48. Then, at Step S104, the control unit 22 changes the position of the view point in the virtual space according to the change of a position of the display device 6, and at Step S105, the control unit 22 changes the direction of the view point in the virtual space according to the change of a direction of the display device 6.

Then, at Step S106, the control unit 22 determines whether the display of the three-dimensional object(s) is terminated. When the display of the three-dimensional object(s) is not terminated (No at Step S106), the control unit 22 returns to Step S103. When the display of the three-dimensional object(s) is terminated (Yes at Step S106), the control unit 22 terminates the processing procedure illustrated in FIG. 47.

Embodiment 4

One of examples of applying a display device 6 to product sale using an electronic catalogue will be described. FIGS. 48 to 52 are diagrams for describing one of examples of applying the display device 6 to a sale of household electric appliances and furniture using an electronic catalogue.

Figure 48:
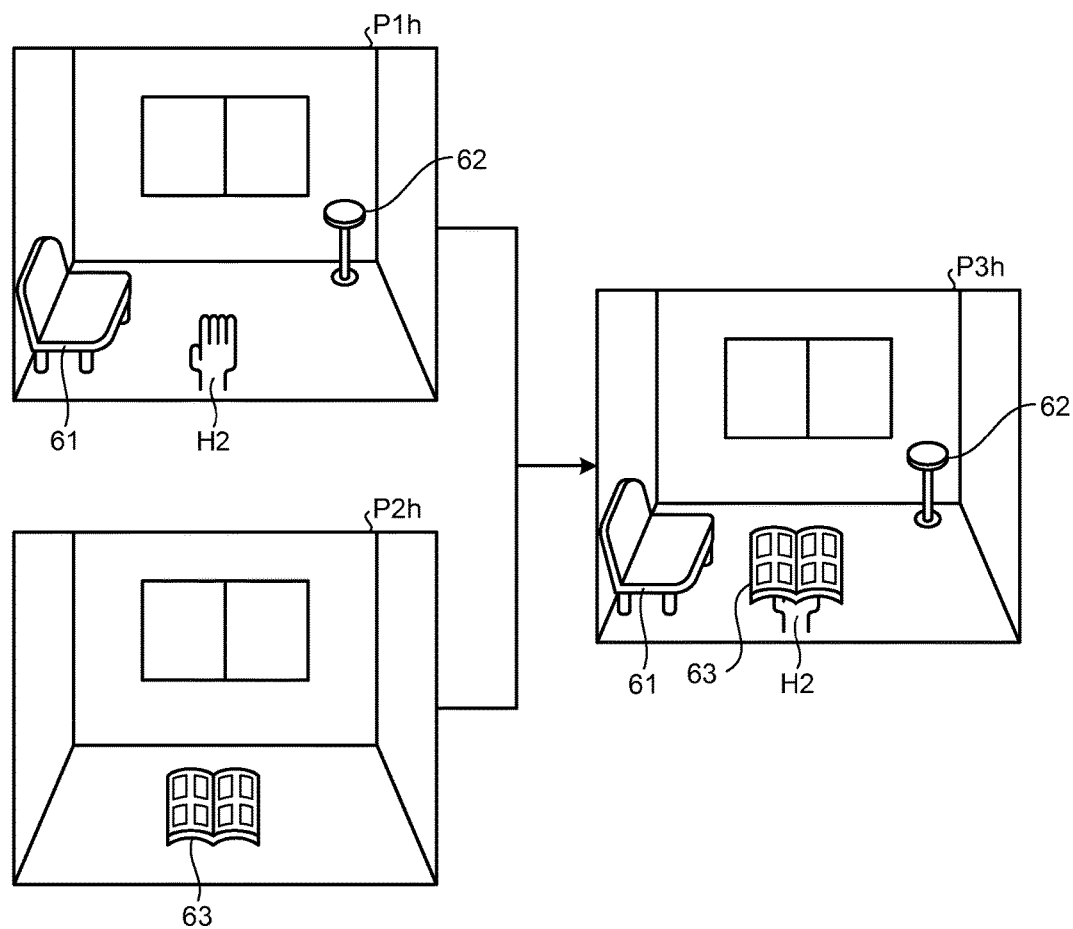
FIG. 48 is a diagram illustrating one of examples of displaying an electronic catalogue in a room in which products to be purchased are installed.

FIG. 48 is a diagram illustrating one of examples of displaying the electronic catalogue in a room in which products to be purchased are arranged. An image P1h is an image obtained by an imaging unit 40 when a user extends a hand H2 forward in order to hold the electronic catalogue in the room, that is, an image corresponding to a scene of a real space viewed by a right eye. In the image P1h, a sofa 61 arranged against a wall of the room, a table 62 arranged at a corner beside the wall at an opposite side to the sofa, and the hand H2 of the user appear. The display device 6 also acquires an image of the same scene imaged by an imaging unit 42, that is, an image corresponding to a scene of the real space viewed by a left eye.

An image P2h is an image for the right eye generated based on virtual space data 24d and object data 24b. In this example, the virtual space data 24d holds information related to states of three-dimensional objects corresponding to the walls, a floor, and a ceiling of the room, and information related to a state of a three-dimensional object of a catalogue 63 arranged at the position of the hand H2 of the user. The object data 24b holds information related to shapes and properties of the respective three-dimensional objects. Similarly, the display device 6 generates an image of the virtual space viewed by a view point of the left eye.

The display device 6 composites the image P1h and the image P2h to generate an image P3h. In the image P3h, the three-dimensional object of the catalogue 63 is displayed such that the catalogue 63 is opened on the hand H2. The three-dimensional objects corresponding to the wall, the floor, and the ceiling are arranged in the virtual space such that respective surfaces are matched with surfaces of real walls, floor, and ceiling. Further, the three-dimensional objects corresponding to the wall, the floor, and the ceiling are configured to have the surfaces having similar appearance to the real wall, floor, and ceiling. Therefore, in the image P3h, as to the walls, the floor, and the ceiling of the room, the user cannot distinguish which of the real surfaces and the surfaces of the three-dimensional objects are displayed in front.

Similarly, the display device 6 composites the image captured by the imaging unit 42 and the image of the virtual space as viewed from the view point of the left eye to generate an image to be displayed in a display unit 32b for the left eye. The display device 6 displays the composite images generated as described above, in the display units 32a and 32b. As a result, the user can see the scene as if the user opened the three-dimensional object of the catalogue 63 on the hand H2 in the room.

Figure 49:
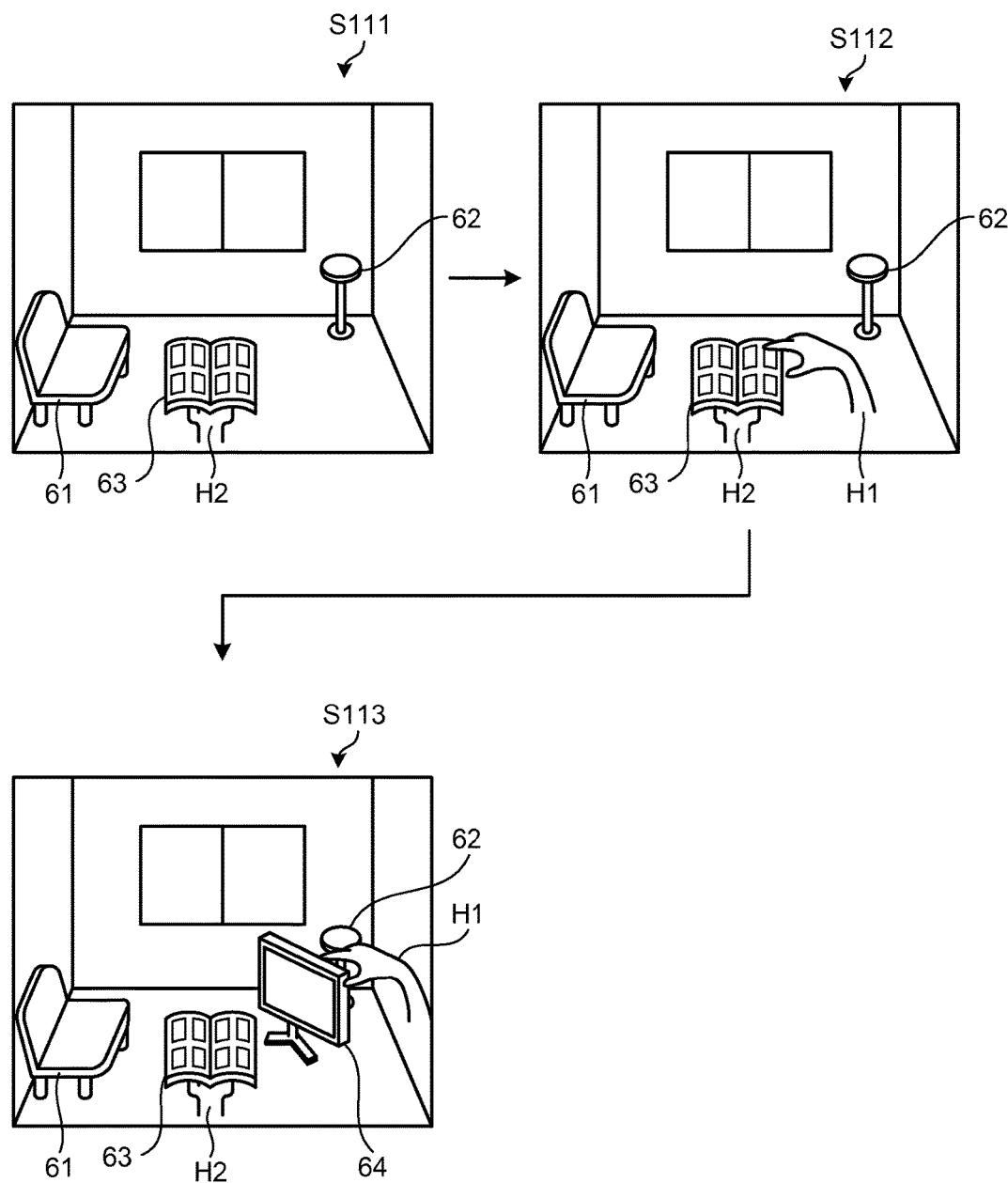
FIG. 49 is a diagram for describing a scene of selecting a product from the catalogue.

FIG. 49 is a diagram for describing a scene of selecting a product from the catalogue. At Step S111 of FIG. 49, the user has the three-dimensional object of the catalogue 63 on the hand H2 in a state where pages on which a desired product appears are opened. In each of the catalogue 63, three-dimensional objects of products are arranged in a state of being reduced in size, and squashed in a planar manner. At Step S112, the user holds the three-dimensional object of the desired product on the page, with two fingers of the hand H1. By being held with the two fingers, the three-dimensional object becomes in a state of being selected, and moved according to movement of the hand H1.

At Step S113, the user separates the hand H1 from the catalogue 63 while holding the three-dimensional object. As a result, the reduced three-dimensional object is torn off from the page of the catalogue 63. The torn three-dimensional object is enlarged to a size that is the same as an actual product, and becomes the three-dimensional object of a television set 64. The three-dimensional object of a product appearing on the catalogue is defined to have a weight of 0. Therefore, the user can treat the three-dimensional object of the television set 64 without considering the effect of the gravity.

Figure 50:
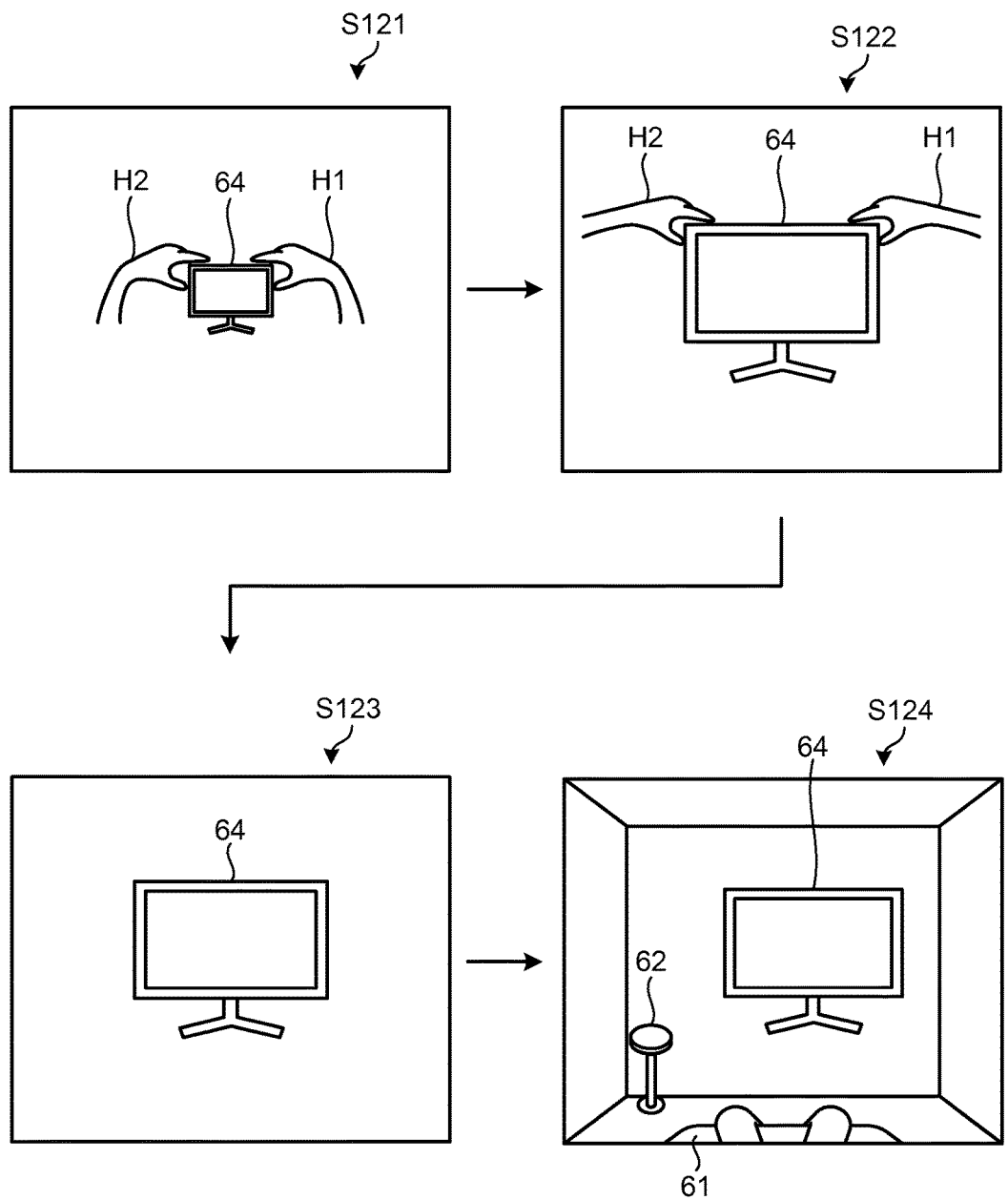
FIG. 50 is a diagram for describing a scene of examining the size and an installation place of a television set.

FIG. 50 is a diagram for describing a scene of examining the size and an installation place of the television set. A real television set corresponding to the television set 64 includes a plurality of types of the same design and different sizes. At the stage where the three-dimensional object of the television set 64 is torn off from the page of the catalogue 63, the three-dimensional object has the same size as the smallest type of the television set. At Step S121 of FIG. 50, the user holds one end portion of the three-dimensional object of the television set 64 with fingers of the hand H1, and holds the other end portion with fingers of the hand H2.

At Step S122, the user expands the distance between the hand H1 and the hand H2 while holding the three-dimensional object of the television set 64. The size of the three-dimensional object of the television set 64 is changed according to change of the distance between the hand H1 and the hand H2. When the size of the three-dimensional object of the television set 64 becomes a desired size, the user expands the interval between the fingers to release the three-dimensional object of the television set 64. The display device 6 resizes the three-dimensional object of the television set 64 into the size of the type closest to the size of the current three-dimensional object, of the corresponding types of the television set. As described above, the user can easily select the size of the product with simple operation.

Subsequently, the user moves the three-dimensional object of the television set 64 to a desired height of a desired position. Since the weight of a three-dimensional object of a product is defined to be 0, the moved three-dimensional object is stayed on site even if the user releases the three-dimensional object, as illustrated in Step S123. At Step S124, the user sits on the sofa 61, and confirms the height and the position of the three-dimensional object of the television set 64 floating against an opposing wall. The three-dimensional object of the television set 64 has the same size as the actual television set, and can be superimposed on the room of the user and float in an arbitrary position. Therefore, the user can examine how to install the television set in an environment where the television set is actually used, before purchasing the television set.

Figure 51:
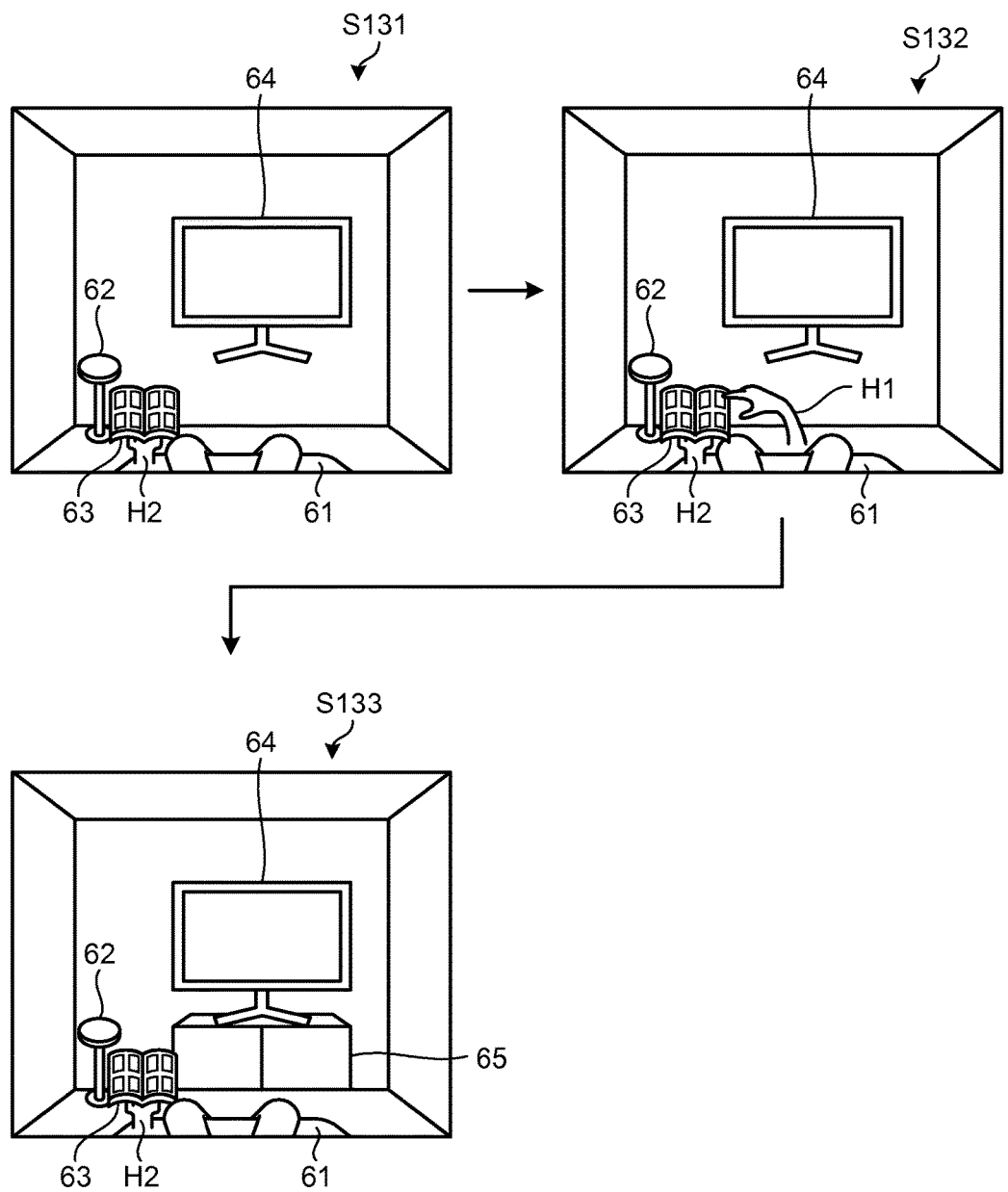
FIG. 51 is a diagram for describing a scene of selecting a television cabinet.

FIG. 51 is a diagram for describing a scene of selecting a television cabinet. At Step S131 of FIG. 51, the user holds the three-dimensional object of the catalogue 63 with the hand H2, and has pages of television cabinets open, while sitting on the sofa 61.

In the catalogue data 24g, the television sets and the television cabinets are defined to be related products. Further, in the catalogue data 24g, actual dimensions of respective television cabinets are registered. In the state of the three-dimensional object of the television set 64 illustrated in Step S131, the display device 6 extracts television cabinets having a height that accords with the distance from the floor to the three-dimensional object of the television set 64, of the television cabinets registered in the catalogue data 24g, based on the information, and displays the television cabinets on the page of the television cabinets. Therefore, the user can easily select a favorable television cabinet from among the television cabinets with which the television set can be installed to the height of the current three-dimensional object.

At Step S132, the user touches the three-dimensional object of the catalogue 63 with the finger of the hand H1 to select a desired television cabinet. At Step S133, the three-dimensional object of a selected television cabinet 65 is displayed below the three-dimensional object of the television set 64. Since the television sets and the television cabinets are defined to be related products, the display device 6 can display the three-dimensional object of the selected television cabinet 65 in association with the three-dimensional object of the already displayed television set 64.

FIG. 52 is a diagram for describing a scene of moving a real object. For example, assume that the user wishes to try layout change of moving the table 62 to another place. When having detected operation to select a real object, the display device 6 displays the three-dimensional object that is modeled on the real object, in a display space, instead of the real object. Then, when detecting operation to move the three-dimensional object, the display device 6 moves the three-dimensional object according to the operation.

The user can easily move the three-dimensional object without caring about the effect of the gravity, and can leave the three-dimensional object in the air so that the three-dimensional object does not get in the way. Further, while the real object is hidden in the display space, the real object is stayed in the original place in reality. Therefore, it is not necessary to put the real object back to the original place after the layout change is tried.

An image P1i illustrated in FIG. 52 is an image obtained by the imaging unit 40 when the user is about to hold the table 62, that is, an image corresponding to a scene of the real space viewed by the right eye. In the image P1i, the table 62 placed at a corner of the room, and the hand H1 of the user appear. The display device 6 also acquires an image of the same scene imaged by the imaging unit 42, that is, an image corresponding to a scene of the real space viewed by the left eye.

An image P2i is an image for the right eye generated based on the virtual space data 24d and the object data 24b. At this stage, only the three-dimensional objects of the walls and the floor are arranged at places in the virtual space corresponding to the place where the table 62 is placed in the real space. The display device 6 composites the image Phi and the image P2i to generate an image P3i. Similarly, the display device 6 composites the image captured by the imaging unit 42 and the image of the virtual space as viewed from the view point of the left eye to generate an image to be displayed in the display unit 32b, as an image for the left eye. The display device 6 displays the composite images generated in this way, in the display units 32a and 32b. As a result, the user can see the scene in which the user himself/herself is about to hold the table 62 in the room.

An image P1j illustrated in FIG. 52 is an image obtained by the imaging unit 40 when the user is about to hold up the table 62 after holding the table 62, that is, an image corresponding to a scene of the real space viewed by the right eye. At this time, the table 62 is not actually held up, and is stayed in the original place.

An image P2j is an image for the right eye generated based on the virtual space data 24d and the object data 24b. At this stage, the user has performed the operation to hold and select the table 62 as the real object, and thus the display device 6 generates a three-dimensional object 66 that is modeled on the table 62. The object data 24b for generating the three-dimensional object 66 may be stored in the storage unit 24 in advance, or may be dynamically generated based on the images imaged by the imaging units 40 and 42. In the image P2j, the three-dimensional object 66 is arranged at a position separated from the floor, according to the operation to hold up the three-dimensional object 66 by the user.

The display device 6 composites the image P1j and the image P2j to generate an image P3j. At this time, the display device 6 performs hiding processing so as not to display the table 62, for which the three-dimensional object 66 as a substitution has been generated. For example, the display device 6 performs processing such that the distance to the table 62 is infinite distance. As a result, the three-dimensional objects of the walls, the floor, and the ceiling are displayed in front of the table 62, and the table 62 is hidden behind these three-dimensional objects.

Figure 53:
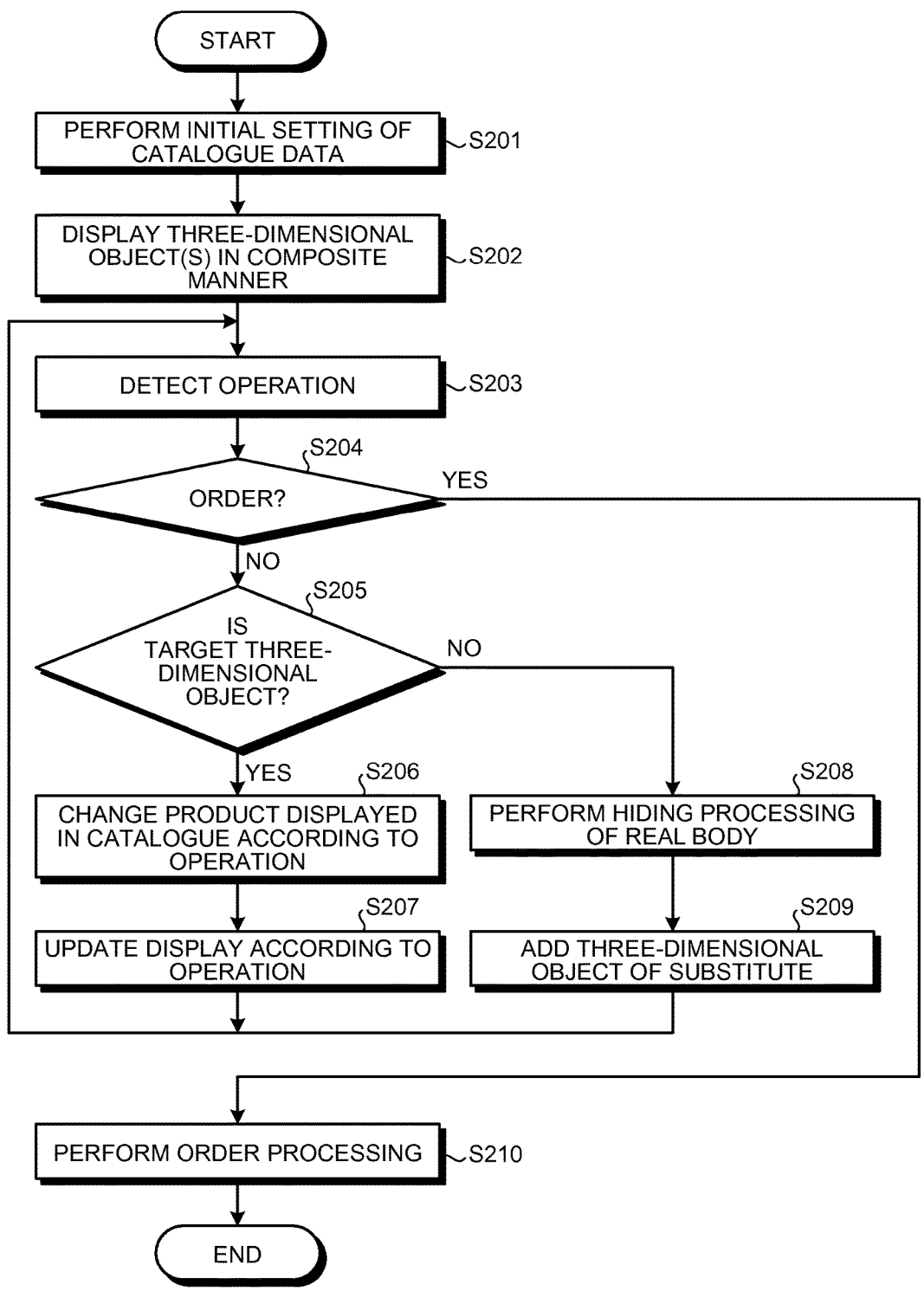
FIG. 53 is a flowchart illustrating a processing procedure of order processing.

Then, a processing procedure of order processing will be described with reference to FIG. 53. FIG. 53 is a flowchart illustrating a processing procedure of order processing. The order processing illustrated in FIG. 53 is realized by the control unit 22 executing the control program 24f.

As illustrated in FIG. 53, first of all, at Step S201, the control unit 22 performs initial setting of the catalogue data 24g. Subsequently, at Step S202, the control unit 22 composites and displays the image of the virtual space including the three-dimensional object(s) of the catalogue and the image of the real space.

At Step S203, the control unit 22 detects operation to the three-dimensional object. At Step S204, the control unit 22 determines whether the detected operation is operation for executing an order. When the detected operation is not the operation for executing an order (No at Step S204), the control unit 22 proceeds to Step S205.

At Step S205, the control unit 22 determines whether a target of the detected operation is the three-dimensional object. When the target of the detected operation is the three-dimensional object (Yes at Step S205), the control unit 22 proceeds to Step S206. When the target of the detected operation is not the three-dimensional object (No at Step S205), the control unit 22 proceeds to Step S208.

At Step S206, the control unit 22 changes the products to be displayed on the catalogue according to the operation. Further, at Step S207, the control unit 22 updates display according to the operation. Subsequently, the control unit 22 returns to Step S203.

At Step S208, the control unit 22 performs the hiding processing so as not to display the real object that is the target to be operated. Further, at Step S209, the control unit 22 adds the three-dimensional object that is a substitute of the real object that is the target to be operated, in the virtual space. Subsequently, the control unit 22 returns to Step S203.

When the operation detected at Step S203 is the operation for executing an order (Yes at Step S204), the control unit 22 proceeds to Step S210. At Step S210, the control unit 22 performs the order processing for ordering a product.

The product purchased using the catalogue is not limited to the television set or the television cabinet. For example, a calendar or a painting can be purchased. The three-dimensional objects of the calendar and the painting are configured to be hung at arbitrary positions on the walls of the room. For example, a curtain can be purchased. The display device 6 may reduce brightness of the display units 32a and 32b when the three-dimensional object of the curtain is hung over a window so that light blocking effect of an actual curtain can be reproduced.

The display device 6 may change scenery outside the window of the room with the three-dimensional object so that the user can confirm effect of change of the outside scenery according to a season, when the layout change of the room is tried. When the layout change of the room is tried, the display device 6 may be configured such that the user can arbitrarily set brightness and color balance of the display units 32a and 32b so that the user can confirm effect of change of the height of the sun according to a season and a time.

Embodiment 5

Figure 54:
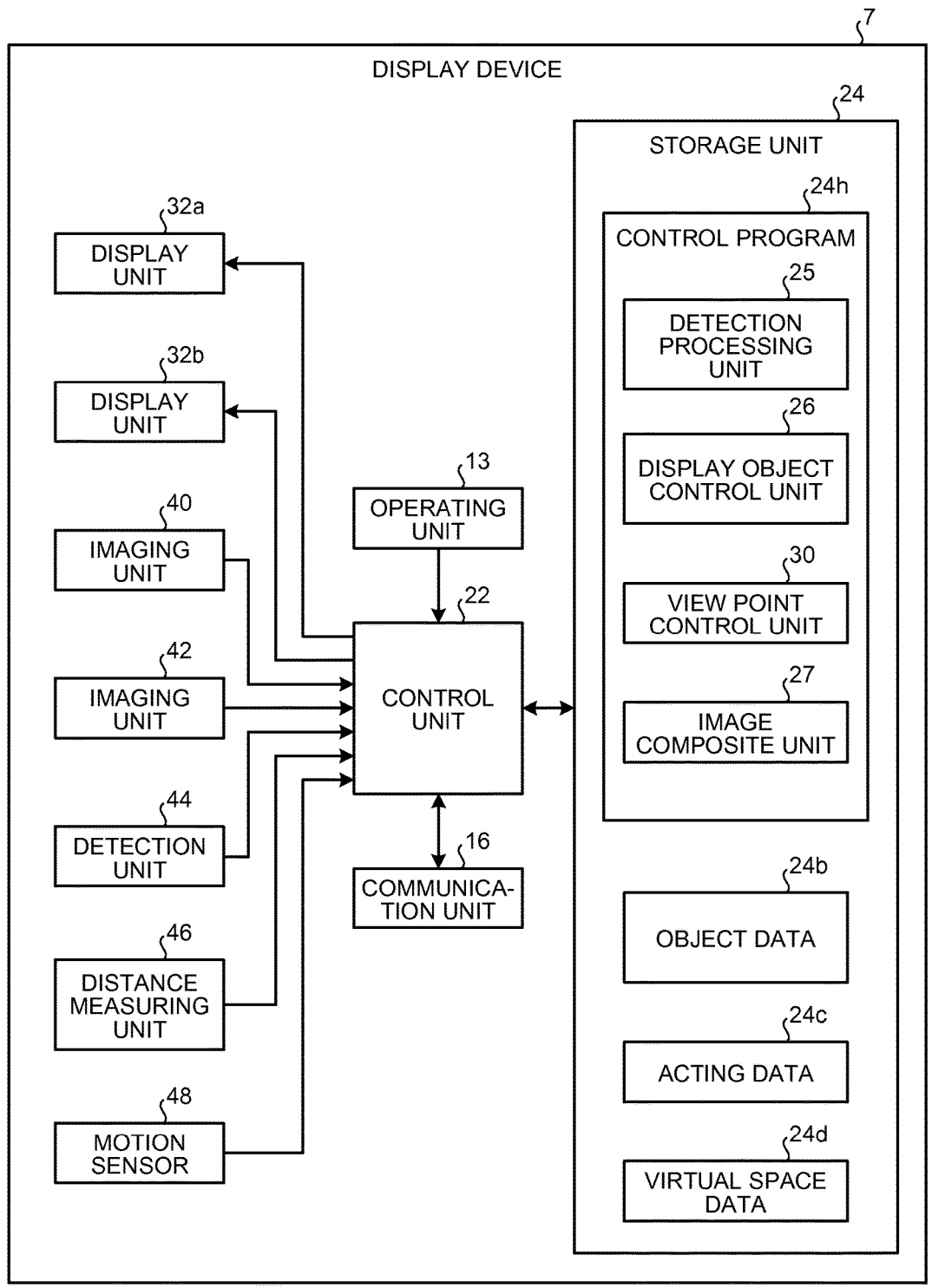
FIG. 54 is a block diagram of a display device according to a fifth embodiment.

A functional configuration of a display device 7 according to a fifth embodiment will be described with reference to FIG. 54. FIG. 54 is a block diagram of the display device 7. As illustrated in FIG. 54, the display device 7 includes an operating unit 13, a control unit 22, a storage unit 24, a communication unit 16, display units 32a and 32b, imaging units 40 and 42, a detection unit 44, a distance measuring unit 46, and a motion sensor 48. The operating unit 13 accepts basic operations such as activation and stop of the display device 7, and change of an operation mode.

The storage unit 24 is made of a non-volatile storage device such as a flash memory, and stores various types of programs and data. The programs stored in the storage unit 24 include a control program 24h. The data stored in the storage unit 24 includes object data 24b, acting data 24c, and virtual space data 24d. The storage unit 24 may be configured from a portable storage medium such as a memory card, and a writing/reading device that performs writing/reading to/from the storage medium. In this case, the control program 24h, the object data 24b, the acting data 24c, and the virtual space data 24d may be stored in the storage medium. The control program 24h, the object data 24b, the acting data 24c, and the virtual space data 24d may be acquired from another device such as a server by means of communication by the communication unit 16.

The control program 24h provides functions related to various types of control for operating the display device 7. The functions provided by the control program 24h include a function to superimpose a three-dimensional object on images acquired by the imaging units 40 and 42 and to display the superimposed images in the display units 32a and 32b, a function to detect operation to the three-dimensional object, and a function to change the three-dimensional object according to the detected operation.

The control program 24h includes a detection processing unit 25, a display object control unit 26, a view point control unit 30, and an image composite unit 27.

The view point control unit 30 provides a function to manage a position and a direction of a view point of a user in a virtual space. The function provided by the view point control unit 30 includes a function to change the position and the direction of the view point of the user in the virtual space according to change of a position and a direction of the display device 7 detected by the motion sensor 48. For example, when forward movement of the display device 7 is detected by the motion sensor 48, the view point control unit 30 moves the view point of the user in the virtual space forward. For example, when rightward rotation of the display device 7 is detected by the motion sensor 48, the view point control unit 30 rotates the view point of the user in the virtual space rightward. As described above, the position and the direction of the view point of the user in the virtual space is changed in accordance with the change of the position and the direction of the display device 7, whereby change of the image in the virtual space, which is superimposed on the image in the real space, can be matched with the change of the image in the real space.

Control based on the functions provided by the control program 24h is similar to the control based on the functions provided by the control program 24f described above, except control based on the functions provided by the order processing unit 29.

One of examples of applying the display device 7 to a product sale through a network will be described. FIGS. 55 to 59 are diagrams for describing one of examples in which the display device 7 is applied to a sale of pizza through a network.

FIG. 55 is a diagram for describing start of order processing of pizza. When starting an order of pizza, a user wears the display device 7, and looks at a plane having a certain level of space. For example, when the user looks at a table T2, the display device 7 displays an image P3k in which the actual table T2 appears. The display device 7 acquires the object data 24b, the acting data 24c, and the virtual space data 24d from a sale site of pizza through communication by the communication unit 16 according to an instruction of the user, and generates a virtual space based on the acquired data. The display device 7 superimposes an image of the generated virtual space and an image in the real space to display an image P3m.

In the image P3m, a plurality of three-dimensional objects is arranged on the table T2. The arranged three-dimensional objects include large dough 161L, medium dough 161M, small dough 161S, cases 162a to 162f which respectively contain toppings such as sesame, tomato, and cheese, a rolling pin 163, a ketchup tube 164, and an oven 165. The dough 161L is dough for a large-size pizza, the dough 161M is dough for a medium-size pizza, and the dough 161S is dough for a small-size pizza. By the start of the order processing of pizza as described above, the ingredients of pizza and the oven 165 are arranged on the plane, as the three-dimensional objects.

The display device 7 may display the ingredients of pizza and the oven 165, using the object data 24*b*, the acting data 24*c*, and the virtual space data 24*d* stored in the storage unit 24 in advance.

Figure 56:
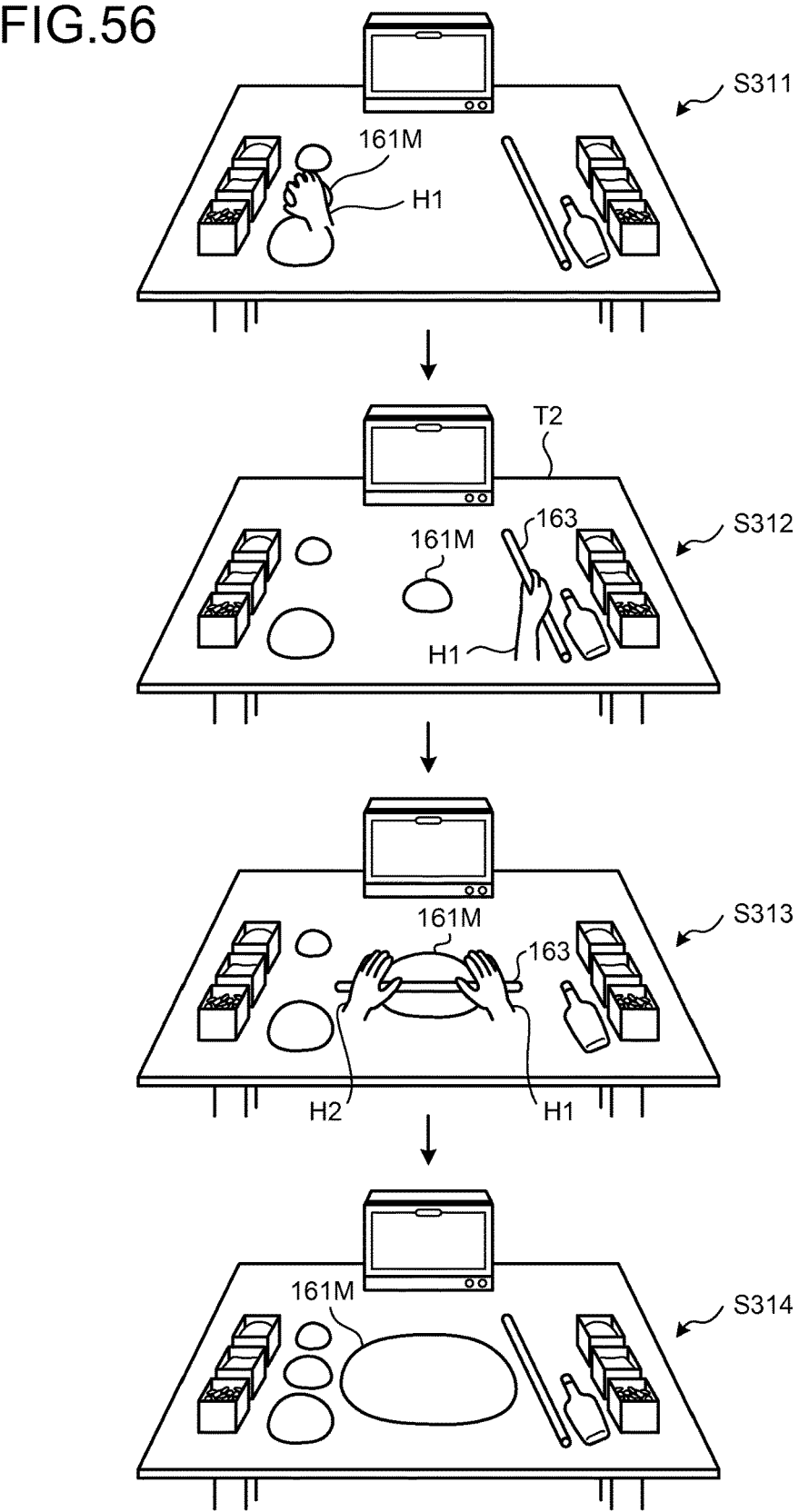
FIG. 56 is a diagram for describing a process of determining the size and the thickness of dough.

FIG. 56 is a diagram for describing a process of determining the size and the thickness of the dough. At Step S311 of FIG. 56, the user holds the dough 161M with a hand H1. By being held, the dough 161M is selected and becomes in a state of being moved according to movement of the hand H1. At Step S312, the user places the dough 161M in the almost center of the plane of the table T2, and holds the rolling pin 163 with the hand H1. By being held, the rolling pin 63 is selected, and becomes in a state of being moved according to the movement of the hand H1.

At Step S313, the user places the rolling pin 163 on the dough 161M, and rotates the rolling pin 163 with hands H1 and H2. In the object data 24*b*, the rolling pin 163 is defined as a rigid body, and the dough 161M is defined as a plastic body. In the acting data 24*c*, it is defined that, when the plastic body is pressed by the rigid body, a pressed portion is recessed. Therefore, when the user rotates the rolling pin 163 on the dough 161M, the dough 161M is circularly rolled out, and becomes thinner. The user rotates the rolling pin 163 on the dough 161M until the dough 161M becomes to have a desired size and thickness, as illustrated in Step S314.

The operation to determine the size and the thickness of the dough is not limited to the example illustrated in FIG. 56. For example, when the user expands the interval between the both hands after holding the dough 161M with the both hands, the dough 161M may be rolled out to a circle with a diameter of the interval of the both hands. Alternatively, when the user holds a part of the dough 161M with two fingers, the entire dough 161M may be deformed into a circular thin shape with the thickness of the interval of two fingers. In these operations, by adjustment of the interval of the hands or of the fingers, the size and the thickness of the dough can be easily adjusted.

Figure 57:
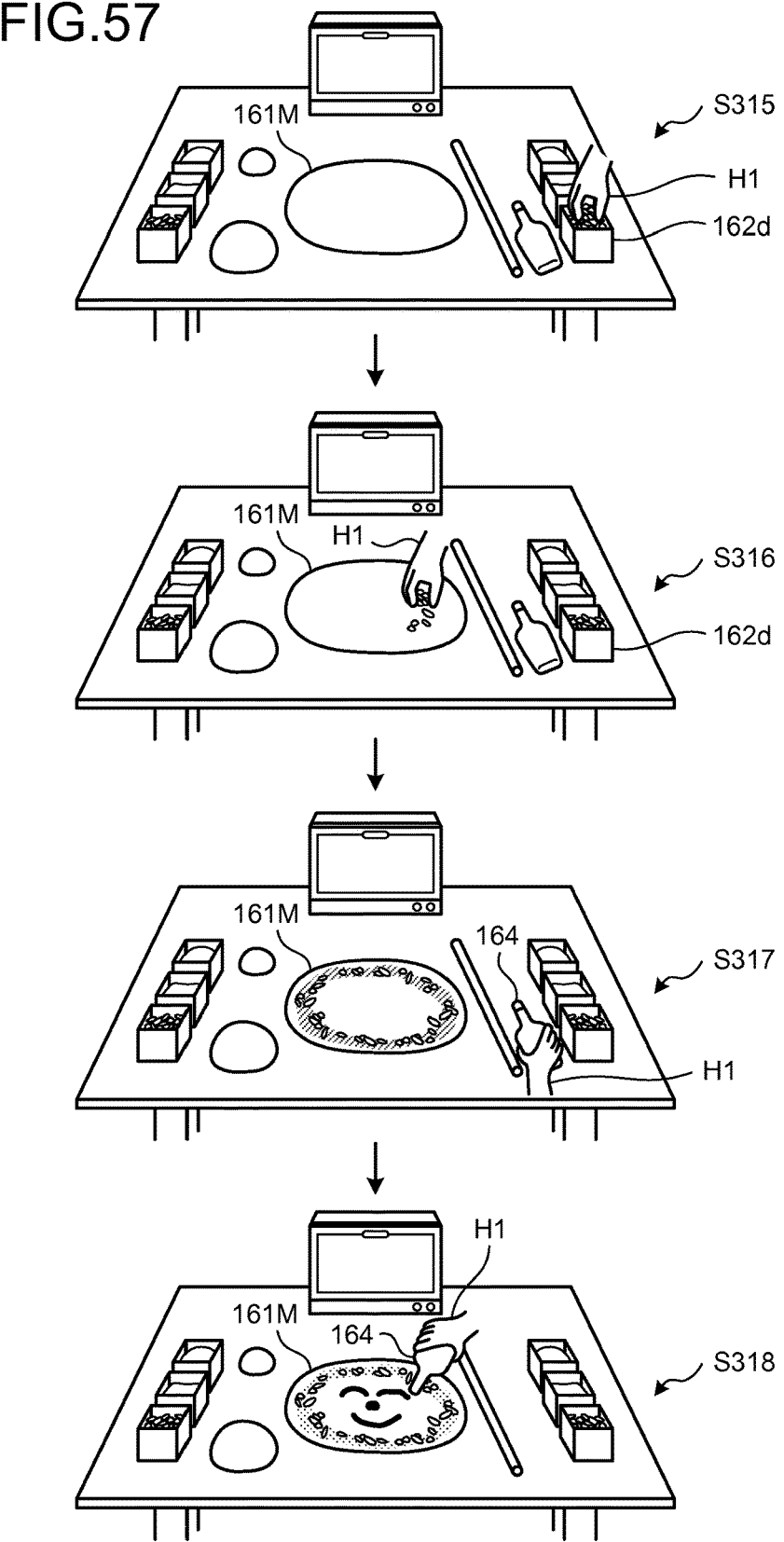
FIG. 57 is a diagram for describing a process of adding toppings.

FIG. 57 is a diagram for describing a process of adding toppings. At Step S315 of FIG. 57, the user holds sesame, which is put in the case 162*d*, with the fingers of the hand H1. By being held, the sesame is selected and becomes in a state of being moved according to the movement of the hand H1. At Step S316, the user moves the sesame to a desired position on the dough 161M, and then expands the interval of the fingers of the hand H1. As a result, the sesame is arranged on a desired position on the dough 161M.

By repetition of similar operation, the user arranges desired toppings as much as desired on desired positions.

At Step S317, the user holds the ketchup tube 164 with the hand H1. By being held, the ketchup tube 164 is selected and becomes in a state of being moved according to the movement of the hand H1. At Step S318, the user holds the ketchup tube 164 with an outlet down, and moves the ketchup tube 164 on the dough 161M while pressing a belly portion. In the acting data 24*c*, the tube is defined such that contents are pressed out through the outlet when the belly portion is pressed. By use of the action, at Step S318, a picture is drawn by the user on the dough 161M with the ketchup.

Figure 58:
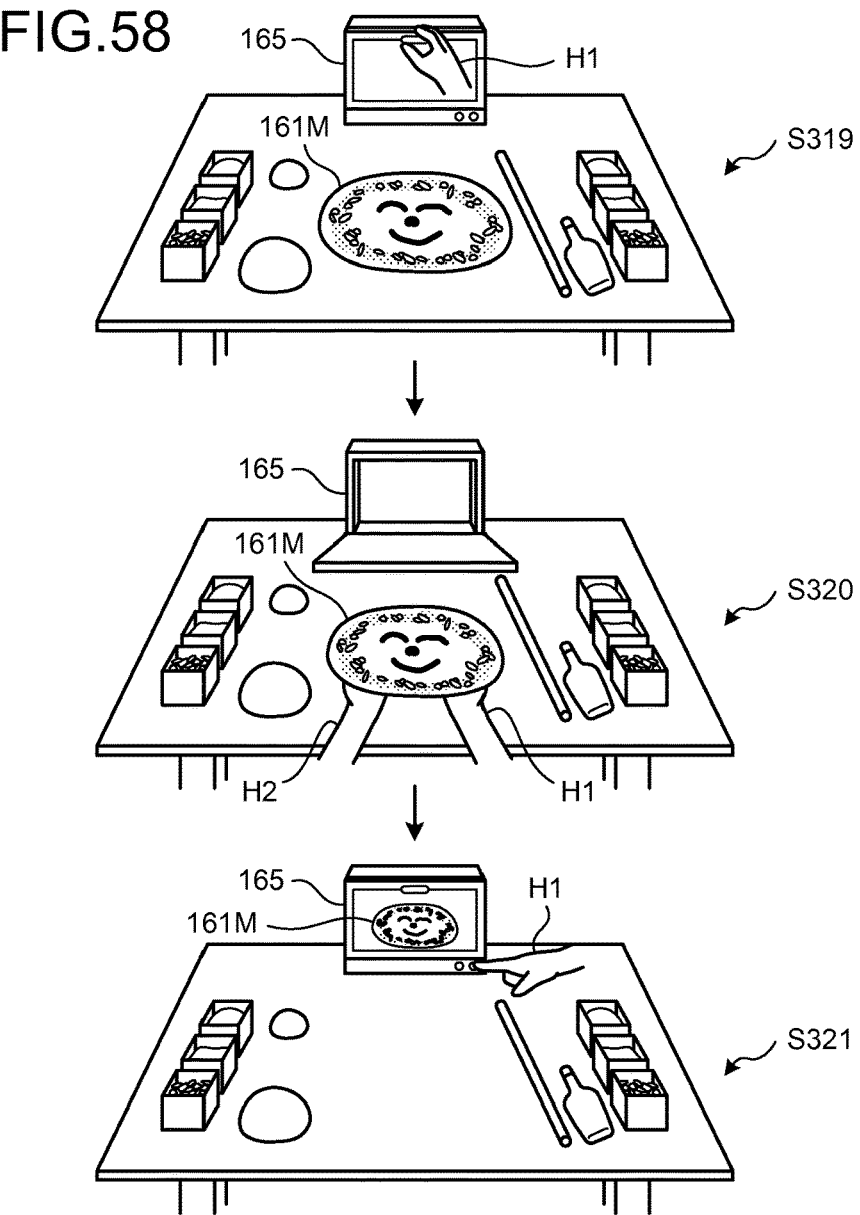
FIG. 58 is a diagram for describing a process of ordering a pizza.

FIG. 58 is a diagram for describing a process of ordering a pizza. At Step S319 of FIG. 58, the user opens a front door of the oven 165 with the hand H1. At Step S320, the user holds the dough 161M with the hands H1 and H2, and puts the dough 161M in the oven 165, and at Step S321, the user presses a switch of the oven 165 with a finger of the hand H1.

When the operation for heating the pizza is performed as described above, the order of the pizza is determined, and order data is transmitted to the sale site of pizza. The last process for making a product is associated with execution of an order, whereby the user can intuitively execute the order without performing unnecessary operation, while following the process of making the product. The operation for ordering a pizza may be another operation. For example, a three-dimensional object including a button for order, which is displayed together with the ingredients of pizza, is displayed, and operation to press the button may be employed as the operation for ordering a pizza.

The order data is used for the purpose of determining the price of the pizza, and for the purpose of reproducing the ordered pizza. The order data includes information related to the size of the selected dough, the size and the thickness of the rolled dough, the types, the amounts, the positions of the toppings, and the like. The order data may include an image of the three-dimensional object of the pizza made by the user, or a history of the operation of when the user made the three-dimensional object of the pizza. These pieces of information are acquired in a process of reproducing a similar process of actually making a pizza by the user by operating the three-dimensional objects of the ingredients of the pizza. Therefore, the user can order the pizza with a method through which the user can easily imagine a pizza to be made, without performing troublesome operation such as inputting a quantity.

Figure 59:
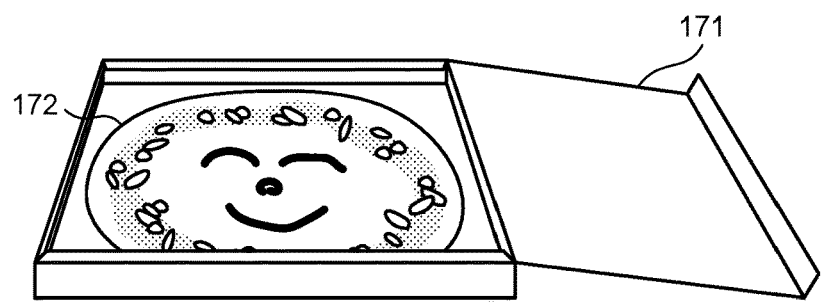
FIG. 59 is a diagram illustrating one of examples of a pizza to be delivered.

FIG. 59 is a diagram illustrating one of examples of a pizza to be delivered. Subsequently, as illustrated in FIG. 59, a pizza 172 put in a pizza box 171 is delivered according to the order data. The pizza 172 is cooked to reproduce the three-dimensional object of the pizza made in FIGS. 55 to 58 as accurate as possible. The reproduction of the pizza may be performed by a cook by reference to the order data. The cook may cook the pizza while looking at the image of the pizza made in the three-dimensional object by the user, or by looking at a video that reproduces the operation history of the user. Alternatively, a cooking machine (robot) may cook the pizza based on the order data.

As described above, the order data is created based on the operation with respect to the three-dimensional object, whereby customizing and ordering the product to user's taste can be easily realized.

Figure 60:
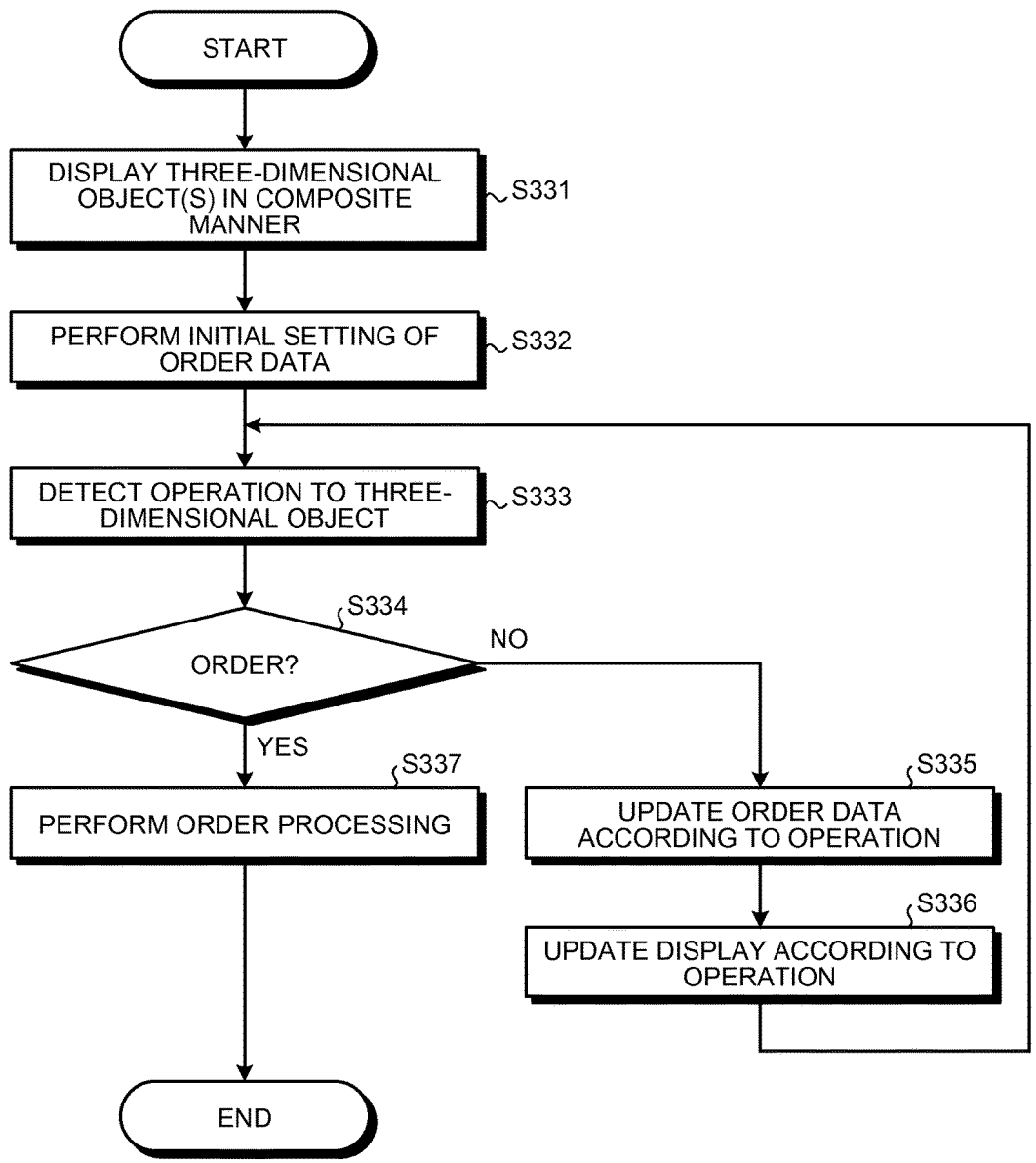
FIG. 60 is a flowchart illustrating a processing procedure of the order processing.

Then, a processing procedure of the order processing will be described with reference to FIG. 60. FIG. 60 is a flowchart illustrating a processing procedure of the order processing. The order processing illustrated in FIG. 60 is realized by the control unit 22 executing the control program 24*h*.

As illustrated in FIG. 60, first of all, at Step S331, the control unit 22 composites and displays an image of the virtual space including the three-dimensional object(s) related to the product, and an image of the real space. Subsequently, at Step S332, the control unit 22 performs initial setting of the order data. To be specific, the control unit 22 causes a state of the product indicated by the current three-dimensional object(s), and a state of the product indicated by the order data to accord with each other.

At Step S333, the control unit 22 detects operation with respect to the three-dimensional object. Then, at Step S334, the control unit 22 determines whether the detected operation is operation associated with execution of the order. When the detected operation is not the operation associated with the execution of the order (No at Step S334), the control unit 22 proceeds to Step S335. At Step S335, the control unit 22 updates the order data according to the detected operation. Then, at Step S336, the control unit 22 updates display of the display units 32a and 32b according to the detected operation. Subsequently, the control unit 22 returns to Step S333.

When the detected operation is operation associated with the execution of the order at Step S334 (Yes at Step S334), then at Step S337, the control unit 22 executes the order processing. To be specific, the control unit 22 transmits the order data to an order destination through communication by a communication unit 16. Subsequently, the control unit 22 terminates the order processing.

The above order system can be used when the user orders other foods through the network. For example, when ordering a noodle, the user reproduces a process of boiling a noodle, a process of making a soup, and a process of adding toppings, using the three-dimensional objects, whereby the user can specify the amount of noodle, how long the noodle is boiled (hardness), the strength of a flavor, the types, the amounts, and arrangement of the toppings. For example, when ordering a bento box, the user reproduces a process of packing dishes in the bento box and a process of packing rice in the bento box, using the three-dimensional objects, whereby the user can specify the types, the amounts, and arrangement of the dishes, and the amount of the rice. For example, when ordering sushi, the user reproduces a process of making a sushi by hand, using the three-dimensional objects, whereby the user can specify the types of sushi ingredients, and how to arrange sushi in a sushi oke (wooden bowl).

In the above order system, the virtual space may be shared by a plurality of users. In this case, the virtual space is managed by one of display devices 7 owned by a plurality of users or another device such as a server, and information related to operation detected by each display device 7 is transmitted to the device that manages the virtual space by communication. The device that manages the virtual space updates the three-dimensional objects in the virtual space and the order data, based on the transmitted information related to the operation. By sharing of the virtual space by the plurality of users in this way, the work of making a pizza in the virtual space can be performed in cooperation with each other.

The above order system can be applied to when a product other than foods is ordered through the network. For example, when a bouquet or a flower arrangement is ordered, flowers in stock in a flower shop may be displayed as the three-dimensional objects. In this case, the user can purchase a bouquet or a flower arrangement made by combination of favorite flowers in favorable arrangement, by reproducing a process of combining the three-dimensional objects of favorite flowers to make the bouquet or the flower arrangement. In this case, an interior of the flower shop may be reproduced with the three-dimensional object, and the order may be performed by bringing the finished bouquet or flower arrangement to a cash register. The bouquet or the flower arrangement may be delivered to a home or a shipping address, or the user may visit the flower shop and receive the product by asking the shop to inform the user of the timing of the product ready, or by being notified by the shop.

The above order system may be applied to when clothes and accessories are ordered through the network. In this case, the user can purchase products after combining the three-dimensional objects of the clothes and the accessories, and confirming the coordinate. Items to be combined may be the three-dimensional objects of the products in different shops. Further, the user can combine the three-dimensional object of the product with real clothes or accessories that the user has already purchased. In this way, the clothes and the accessories are displayed as the three-dimensional objects to which operation such as movement can be performed, whereby the user can purchase the product while confirming various combinations.

The clothes and the accessories are displayed in a manner superimposed with in the real space, as the three-dimensional objects, whereby the user can accurately grasp the size of the product.

When ordering the clothes and the accessories through the network, the products may be displayed in a virtual shopping mall that is modeled on an actual shop. In this case, a display that cannot be performed in reality can be performed, such as floating the product in the air. Further, unlike a paper catalogue, the stock and the display can be associated with each other, such that the product is not displayed if there is no stock. Further, the products are merely virtually displayed, and thus the user may be able to perform payment of all purchased products in one shop, regardless of which shop the products are sold at. In this case, distribution of the sales of each shop is executed in background processing.

The order of the product is executed by bringing the three-dimensional object of the product to the cash register, for example. Alternatively, the order of the product is realized by performing operation to take out a three-dimensional object that is modeled on a credit card from a wallet, or by performing operation to present a three-dimensional object that is modeled on the credit card. Actual payment is executed by an actual credit card, which is registered in advance.

The virtual space including the shopping mall may be shared by a plurality of users. In this case, the three-dimensional object that indicates each user, such as an avatar, may be displayed at a position corresponding to a view point of the user in the virtual space. By display of the three-dimensional objects that indicate the users, popularity of the shops and the products can be easily recognized.

The forms of the present invention described in the above embodiments can be arbitrarily changed without departing from the gist of the present invention. Further, the above embodiments may be appropriately combined. For example, the control program described in the embodiments may be divided into a plurality of modules, or may be integrated with another program.

In the above-described embodiments, examples in which the user himself/herself operates the three-dimensional object have been described. However, the display device may detect movement of other persons, animals, machines, and the like in the imaging range of the imaging units, as the real body. The display device may share the virtual space with other devices. In other words, the display device may be configured such that the three-dimensional object in the virtual space can be seen and operated by a person other than the user of the display device through another device.

In the above-described embodiments, the display device has detected the operation to the three-dimensional object by itself. However, the display device may detect the operation to the three-dimensional object in cooperation with a server. In this case, the display device sequentially transmits images captured by the imaging units or information detected by the detection units to the server, and the server detects the operation, and notifies the display device of the detection result. With such a configuration, the load of the display device can be reduced.

The invention claimed is:

1. A display device, comprising:
a display configured to three-dimensionally display a predetermined object, by displaying images respectively corresponding to both eyes of a user when the display device is worn;
a sensor configured to detect displacement of a real body in a display space of the object; and
a processor configured to
determine a material of the object, and
cause the display to display the object according to the displacement of the real body detected by the sensor and the determined material of the object,
wherein
in response to that movement of the real body in which the real body comes in contact with the object at a contact position and then moves away therefrom without maintaining contact with the object is detected by the sensor, the processor is configured to execute processing corresponding to the contact position of the object.

2. The display device according to claim 1, wherein, when the displacement of the real body moving along the object is detected by the sensor,
the processor is configured to rotate the object corresponding to a moving direction of the real body.

3. The display device according to claim 2, wherein the processor is configured to rotate the object by an angle corresponding to an amount of the displacement.

4. The display device according to claim 1, further comprising:
a projector configured to project an image, wherein
the processor is configured to cause the projector to project an image related to the object.

5. The display device according to claim 1, further comprising:
a second display, wherein
the processor is configured to cause in the second display to display an image related to the object.

6. The display device according to claim 1, wherein the sensor is an infrared sensor.

7. The display device according to claim 1, wherein the sensor is an imaging sensor configured to capture an image.

8. The display device according to claim 1, wherein the processor is configured to perform an operation based on a control method comprising:
three-dimensionally displaying the predetermined object, by displaying images respectively corresponding to both eyes of the user;
detecting the real body that operates the predetermined object;
changing a position of the predetermined object according to the operation by the real body; and
causing the predetermined object to stay on site when the real body stops operating the predetermined object.

9. A control method executed by a display device that three-dimensionally displays a predetermined object, by displaying images respectively corresponding to both eyes of a user when the display device is worn, the control method comprising:
three-dimensionally displaying, by a display of the display device, the predetermined object;
detecting, by a sensor of the display device, displacement of a real body in a display space of the object;
determining a material of the object; and
causing the display to display the object according to the detected displacement of the real body and the determined material of the object,
wherein
in response to that movement of the real body in which the real body comes in contact with the object at a contact position and then moves away therefrom without maintaining contact with the object is detected by the sensor, processing is executed corresponding to the contact position of the object.

10. A non-transitory storage medium that stores a control program that causes, when executed by a display device that three-dimensionally displays a predetermined object, by displaying images respectively corresponding to both eyes of a user when the display device is worn, the display device to execute:
three-dimensionally displaying, by a display of the display device, the predetermined object;
detecting, by a sensor of the display device, displacement of a real body in a display space of the object;
determining a material of the object; and
causing the display to display the object according to the detected displacement of the real body and the determined material of the object,
wherein
in response to that movement of the real body in which the real body comes in contact with the object at a contact position and then moves away therefrom without maintaining contact with the object is detected by the sensor, processing is executed corresponding to the contact position of the object.

11. A display device, comprising:
a display configured to stereoscopically display a predetermined object, by displaying images respectively corresponding to both eyes of a user when the display device is worn;
a sensor configured to detect a body in a display space where the object is stereoscopically displayed; and
a processor configured to change, when movement of the body is detected in the display space, the object in the display space according to the movement of the body,
wherein
the sensor is configured to detect a first state in which the body contacts the object, and a second state in which the body is moved further to an inside of the object,
in response to a determination that
(i) a time period of a contact between the body and the object is a first predetermined time or more, or
(ii) an elapsed time from the contact between the body and the object is a second predetermined time or more,
the processor is configured to change a display style of the object in the display space to indicate that the object is selected to be deformed, and
in response to that the second state is detected by the sensor and the object is selected, the processor is configured to deform the object in the display space according to the movement of the body.

12. The display device according to claim 11, wherein in response to (i) the time period of the contact between the body and the object is the first predetermined time or more, the processor is configured to change the display style of the object in the display space to indicate that the object is selected to be deformed.

13. The display device according to claim 11, wherein in response to (ii) the elapsed time from the contact between the body and the object is the second predetermined time or more, the processor is configured to change the display style of the object in the display space to indicate that the object is selected to be deformed.

14. The display device according to claim 11, wherein
the sensor is configured to detect the second state in which the body is continuously moved further to the inside of the object, and
in response to that the object is selected, the processor is configured to start deforming the object from when the movement of the body to the inside of the object is detected.

15. The display device according to claim 14, wherein, when the movement of the body to the inside of the object is no more detected before a lapse of the second predetermined time and after starting deforming the object, the processor is configured to perform display of reverse change of putting the deformation of the object back in place.

16. The display device according to claim 15, wherein the processor is configured to perform the display of the reverse change in a shorter time than a time required for the deformation.

17. The display device according to claim 11, wherein the processor is configured to change the object, by moving or rotating the object, or combining the moving and the rotating, with the movement of the body.

18. The display device according to claim 11, wherein the processor is configured to change the object, by causing the object to disappear, with the movement of the body.

19. A display device, comprising:
a display configured to stereoscopically display a predetermined object, by displaying images respectively corresponding to both eyes of a user when the display device is worn; and
a processor configured to
in response to a determination that
(i) a time period of a contact between a body and the object is a predetermined time or more, or
(ii) an elapsed time from the contact between the body and the object is a predetermined time or more,
change a display style of the object to indicate that the object is selected to be deformed, and
in response to a determination that the body contacts the object and is moved further to an inside of the object in a display space in which the object is stereoscopically displayed,
deform the object in the display space according to the movement of the body.

* * * * *